US012625525B2

(12) United States Patent

Xu et al.

(10) Patent No.: US 12,625,525 B2

(45) Date of Patent: May 12, 2026

(54) ROTATING SHAFT APPARATUS, FOLDABLE HOUSING AND ELECTRONIC DEVICE

(71) Applicant: GUANGDONG OPPO MOBILE TELECOMMUNICATIONS CORP., LTD., Dongguan (CN)

(72) Inventors: Yaxing Xu, Dongguan (CN); Changchun Shi, Dongguan (CN); Qiuliang Chen, Dongguan (CN); Xinbo Li, Dongguan (CN); Hongdong Huang, Dongguan (CN); Bingyue Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 119 days.

(21) Appl. No.: 18/816,841

(22) Filed: Aug. 27, 2024

(65) Prior Publication Data

US 2024/0419221 A1 Dec. 19, 2024

Related U.S. Application Data

(63) Continuation of application No. PCT/CN2022/140346, filed on Dec. 20, 2022.

(30) Foreign Application Priority Data

Mar. 3, 2022 (CN) .......................... 202210210781.1

(51) Int. Cl.
*G06F 1/16* (2006.01)
*G09F 9/30* (2006.01)

(52) U.S. Cl.
CPC .......... *G06F 1/1681* (2013.01); *G06F 1/1652* (2013.01); *G09F 9/301* (2013.01)

(58) Field of Classification Search
CPC .... G06F 1/1652; G06F 1/1681; G06F 1/1616; G06F 1/1641; G06F 1/16; G06F 1/1637;
(Continued)

(56) References Cited

U.S. PATENT DOCUMENTS 11,294,431 B2 * 4/2022 Torres ................... G06F 1/1681
11,336,759 B2 * 5/2022 Liao ...................... H04M 1/022
(Continued)

FOREIGN PATENT DOCUMENTS

CN 211370996 U 8/2020
CN 112333308 A 2/2021
(Continued)

OTHER PUBLICATIONS

International Search Report and Written Opinion, International Patent Application No. PCT/CN2022/140346, mailed Mar. 14, 2023 (17 pages).
(Continued)

*Primary Examiner* — Abhishek M Rathod

(74) *Attorney, Agent, or Firm* — Ladas & Parry LLP

(57) ABSTRACT

A rotating shaft apparatus includes: a support assembly, including a side support member; a rotating assembly, including a rotating member and a connecting member, the rotating member is rotatably connected to the connecting member, and the side support member is rotatably connected to the connecting member; and a linkage assembly, including a linkage member, the linkage member is slidably connected to the connecting member; the side support member and the rotating member are connected to each other through a cooperation of a sliding-guiding portion and a sliding-limiting groove, the side support member and the linkage member are connected to each other through a cooperation of a sliding-stopping groove and a position-stopping portion, or the side support member and the rotat- (Continued)

ing member are connected to each other through the cooperation of the sliding-stopping groove and the position-stopping portion.

17 Claims, 22 Drawing Sheets

(58) Field of Classification Search
CPC ........... E05Y 2999/00; E05Y 2800/244; E05Y 2201/604; H04M 1/0268; H05K 5/00226
See application file for complete search history.

(56) References Cited

U.S. PATENT DOCUMENTS

| | | | | |
|---|---|---|---|---|
| 2019/0268456 A1* | 8/2019 | Park | | H04M 1/0216 |
| 2021/0181808 A1* | 6/2021 | Liao | | H04M 1/0216 |
| 2022/0137676 A1* | 5/2022 | Tian | | G06F 1/1616 |
| | | | | 361/679.27 |
| 2022/0303371 A1* | 9/2022 | Liao | | H04M 1/0216 |
| 2024/0340365 A1 | 10/2024 | Liao et al. | | |

FOREIGN PATENT DOCUMENTS

| | | | |
|---|---|---|---|
| CN | 112995368 | A | 6/2021 |
| CN | 113446303 | A | 9/2021 |
| CN | 214756425 | U | 11/2021 |
| CN | 114135567 | A | 3/2022 |
| CN | 115163655 | A | 10/2022 |
| WO | 2020186889 | A1 | 9/2020 |
| WO | 2021031694 | A1 | 2/2021 |
| WO | 2021115462 | A1 | 6/2021 |

OTHER PUBLICATIONS

European Search Report, European Application No. 22929651.2, mailed May 21, 2025 (34 pages).
Chinese First Office Action, Chinese Application No. 202210210781.1, mailed Oct. 18, 2025 (17 pages).

* cited by examiner

ROTATING SHAFT APPARATUS, FOLDABLE HOUSING AND ELECTRONIC DEVICE

CROSS REFERENCE TO RELATED APPLICATIONS

The present disclosure is a continuation of International Patent Application No. PCT/CN2022/140346, filed on Dec. 20, 2022, which claims priority to Chinese Patent Application NO. 202210210781.1 filed on Mar. 3, 2022, the entire contents of which are herein incorporated by reference in their entireties.

TECHNICAL FIELD

The present disclosure relates to the field of flexible member supporting, in particular to a rotating shaft apparatus supporting a flexible member, a foldable housing including the rotating shaft apparatus, and an electronic device including the foldable housing.

BACKGROUND

With the development of display devices, foldable flexible display screens have emerged. Currently, folding solutions for foldable flexible display screens include inner folding and outer folding, and foldable screens are becoming increasingly popular among people. The foldable screens in the related art are generally supported by hinge mechanisms. However, currently, most hinge structures are complex and do not meet mass-production requirements.

SUMMARY

In some embodiments of the present disclosure, a rotating shaft apparatus is provided. The rotating shaft apparatus includes: a support assembly, including a side support member on each of two opposite sides of the rotating shaft apparatus; a rotating assembly, including a rotating member on each of the two opposite sides of the rotating shaft apparatus and a connecting member on each of the two opposite sides of the rotating shaft apparatus, wherein the rotating member is rotatably connected to the connecting member, and the side support member is rotatably connected to the connecting member; and a linkage assembly, including a linkage member on each of the two opposite sides of the rotating shaft apparatus, wherein the linkage member is slidably connected to the connecting member; the side support member and the linkage member are connected to each other through a cooperation of a sliding-guiding portion and a sliding-limiting groove, the side support member and the rotating member are connected to each other through a cooperation of a sliding-stopping groove and a position-stopping portion, or the side support member and the rotating member are connected to each other through the cooperation of the sliding-stopping groove and the position-stopping portion; wherein a rotation of the connecting member is able to drive the rotating member and the linkage member to rotate, rotations of the rotating member and the linkage member are able to drive the side support member to move, and the side support members on the two opposite sides of the rotating shaft apparatus are configured to be synchronously folded or synchronously unfolded with respect to each other.

In some embodiments of the present disclosure, a foldable housing is provided. The foldable housing includes two frames and a rotating shaft apparatus disposed between the two frames. Each of the two frames is connected to the connecting member on a corresponding one of the two opposite sides of the rotating shaft apparatus.

In some embodiments of the present disclosure, an electronic device is provided. The electronic device includes a flexible member and a foldable housing. The flexible member is arranged on the foldable housing.

BRIEF DESCRIPTION OF THE DRAWINGS

In order to more clearly illustrate technical solutions of embodiments of the present disclosure, a brief introduction will be made below to the drawings required to be used in the embodiments. Evidently, the drawings in the following description are only some embodiments of the present disclosure. Those skilled in the art may further obtain other drawings without any creative work according to these drawings.

DETAILED DESCRIPTION

Figures 1, 2:
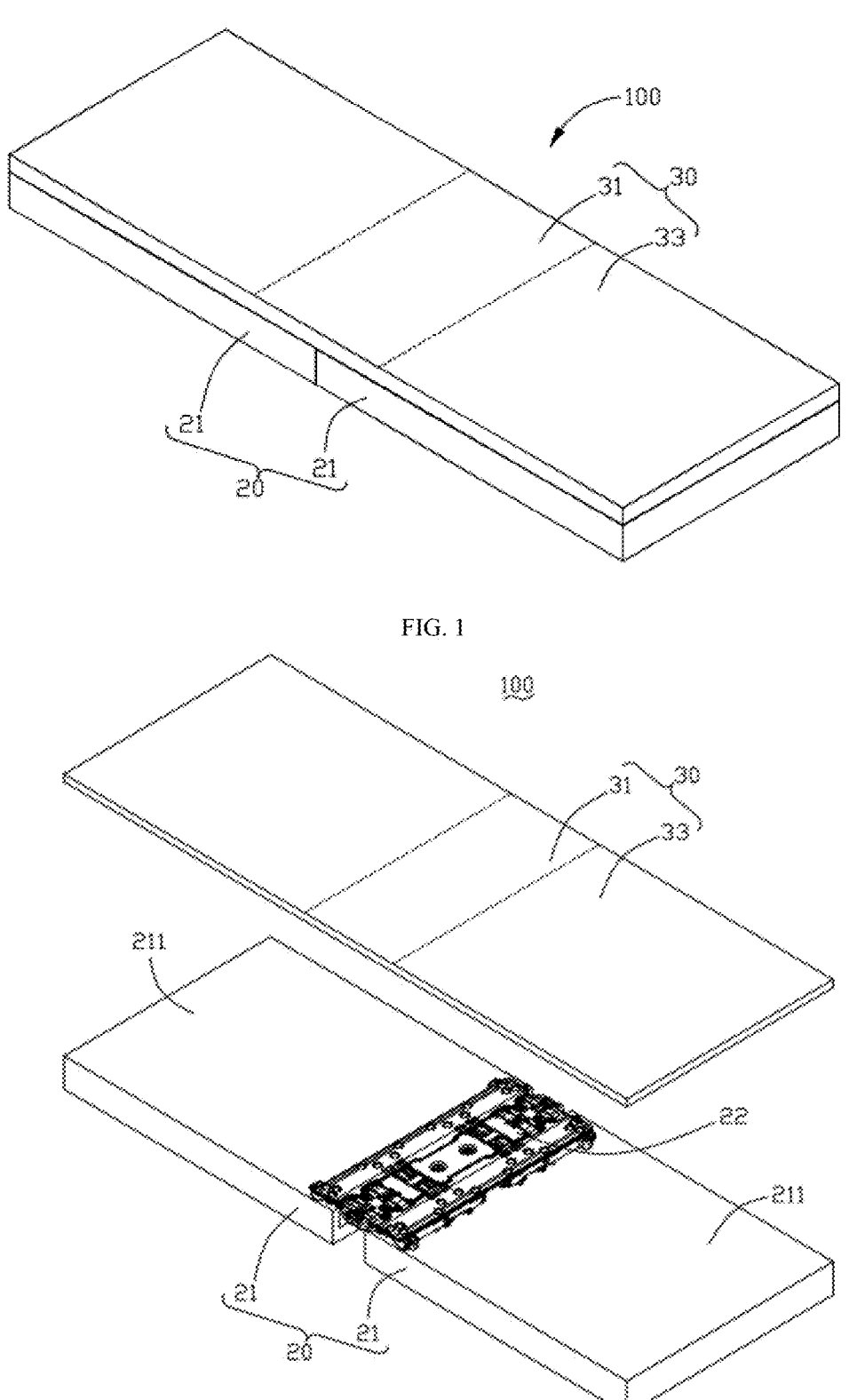
FIG. 1 is a schematic perspective structural view of an electronic device according to some embodiments of the present disclosure.
FIG. 2 is a schematic exploded perspective structural view illustrating a foldable housing and a flexible member of the electronic device shown in FIG. 1.

In some embodiments, a rotating shaft apparatus is provided. The rotating shaft apparatus includes:

a support assembly, including a side support member on each of two opposite sides of the rotating shaft apparatus;

a rotating assembly, including a rotating member on each of the two opposite sides of the rotating shaft apparatus and a connecting member on each of the two opposite sides of the rotating shaft apparatus, wherein the rotating member is rotatably connected to the connecting member, and the side support member is rotatably connected to the connecting member; and a linkage assembly, including a linkage member on each of the two opposite sides of the rotating shaft apparatus, wherein the linkage member is slidably connected to the connecting member; the side support member and the rotating member are connected to each other through a cooperation of a sliding-guiding portion and a sliding-limiting groove, the side support member and the linkage member are connected to each other through a cooperation of a sliding-stopping groove and a position-stopping portion, or the side support member and the rotating member are connected to each other through the cooperation of the sliding-stopping groove and the position-stopping portion; wherein a rotation of the connecting member is able to drive the rotating member and the linkage member to rotate, rotations of the rotating member and the linkage member are able to drive the side support member to move, and the side support members on the two opposite sides of the rotating shaft apparatus are configured to be synchronously folded or synchronously unfolded with respect to each other.

In some embodiments, the sliding-stopping groove is defined on the side support member, the sliding-stopping groove includes a first stopping section and a second stopping section, and the position-stopping portion is arranged on the linkage member; in response to the side support members on the two opposite sides of the rotating shaft apparatus being in a fully folded state, the position-stopping portion is positioned at the first stopping section; and in response to the side support members on the two opposite sides of the rotating shaft apparatus being in a flattened state, the position-stopping portion is positioned at the second stopping section.

In some embodiments, the sliding-stopping groove is defined on the side support member, the sliding-stopping groove includes a first stopping section and a second stopping section, and the position-stopping portion is arranged on the rotating member; in response to the side support members on the two opposite sides of the rotating shaft apparatus being in a fully folded state, the position-stopping portion is positioned at the first stopping section; and in response to the side support members on the two opposite sides of the rotating shaft apparatus being in a flattened state, the position-stopping portion is positioned at the second stopping section.

In some embodiments, the sliding-stopping groove includes a first sliding-stopping groove and a second sliding-stopping groove parallel to each other, the first sliding-stopping groove includes the first stopping section, and the second sliding-stopping groove includes the second stopping section; the position-stopping portion includes a first position-stopping portion and a second position-stopping portion, the first position-stopping portion is slidably received in the first sliding-stopping groove, and the second position-stopping portion is slidably received in the second sliding-stopping groove; and in response to the first position-stopping portion being positioned at the first stopping section, the side support members on the two opposite sides of the rotating shaft apparatus are in the fully folded state, and in response to the second stopping section being positioned at the second stopping section, the side support members on the two opposite sides of the rotating shaft apparatus are in the flattened state.

In some embodiments, the rotating assembly includes a positioning seat, an end of the rotating member away from the connecting member is rotatably connected to the positioning seat, and the first stopping section is disposed closer to the positioning seat than the second stopping section.

In some embodiments, the side support member includes a side support plate, a limiting portion protrudes from a back surface of the side support plate, an interval is defined between the first position-stopping portion and the second position-stopping portion, the limiting portion is slidably inserted in the interval, the first sliding-stopping groove is defined on one of two opposite sides of the limiting portion, and the second sliding-stopping groove is defined on the other of the two opposite sides of the limiting portion.

In some embodiments, the first sliding-stopping groove and the second sliding-stopping groove are arc-shaped grooves, each of two opposite ends of the first sliding-stopping groove passes through a corresponding one of two opposite end surfaces of the limiting portion, and the limiting portion and an end of the first sliding-stopping groove close to the limiting portion cooperatively form the first stopping section; and an end of the second sliding-stopping groove close to the positioning seat passes through one of the two end surfaces of the limiting portion, and the other end of the second sliding-stopping groove away from the positioning seat extends close to the other of the two end surfaces of the limiting portion to form the second stopping section.

In some embodiments, the linkage member includes a sleeve and a connecting rod connected to an outer peripheral wall of the sleeve, the position-stopping portion includes a first position-stopping portion and a second position-stopping portion, and the first position-stopping portion and the second position-stopping portion are arranged on a side surface of the connecting rod facing the side support member.

In some embodiments, the connecting member defines a sliding-guiding space facing the linkage member, the sliding-guiding space extends along a direction perpendicular to an axis of rotation of the linkage member, an end of the connecting rod away from the sleeve is inserted in the sliding-guiding space, and the first position-stopping portion and the second position-stopping portion are received in the sliding-guiding space.

In some embodiments, the rotating member includes a positioning seat, an end of the rotating member away from the connecting member is rotatably connected to the positioning seat, and an end of the side support member away from the positioning seat is rotatably connected to the connecting member; and wherein a side of the side support member close to the positioning seat defines the sliding-limiting groove, and the rotating member is arranged with the sliding-guiding portion slidably passing through the sliding-limiting groove; or the sliding-guiding portion is provided on the side of the side support plate close to the positioning seat, the sliding-limiting groove is defined on the rotating member, and the sliding-guiding portion slidably passes through the sliding-limiting groove.

In some embodiments, the sliding-limiting groove extends obliquely away from the positioning seat, the sliding-guiding portion is a sliding-guiding column passing through the sliding-limiting groove, an axis of the sliding-guiding column is parallel to an axis of rotation between the rotating member and the positioning seat; the sliding-limiting groove includes a first limiting section and a second limiting section, the first limiting section is located on an end of the sliding-limiting groove, and the second limiting section is located on the other end of the sliding-limiting groove, the first limiting section is disposed farther away from the side support plate and the positioning seat than the second limiting section; and in response to the side support members on the two opposite sides of the rotating shaft apparatus being in a fully folded state, the sliding-guiding portion is positioned at the first limiting section, and in response to the side support members on the two opposite sides of the rotating shaft apparatus being in a flattened state, the sliding-guiding portion is positioned at the second limiting section.

In some embodiments, the rotating assembly includes a positioning seat, a side of the side support member away from the positioning seat is connected to the connecting member through a cooperation of a first arc-shaped groove and a first arc-shaped rail, and an axis of the first arc-shaped groove is collinear with an axis of rotation between the rotating member and the positioning seat.

In some embodiments, the rotating assembly includes a positioning seat, the positioning seat and the rotating member are connected to each other through a cooperation of a second arc-shaped groove and a second arc-shaped rail, and an axis of the second arc-shaped rail is collinear with an axis of rotation between the rotating member and the positioning seat.

In some embodiments, the rotating assembly includes a positioning seat, the linkage assembly includes a linkage seat, the linkage seat is detachably connected to the positioning seat, and an axis of rotation between the rotating member and the positioning seat is parallel to an axis of rotation between the linkage member and the linkage seat.

In some embodiments, the rotating assembly includes two rotating shafts and a gear group arranged on the two rotating shafts, the linkage member on each of the two opposite sides of the rotating shaft apparatus is fixedly sleeved on a corresponding one of the two rotating shafts, the linkage member is configured to rotate around an axis of the corresponding rotating shaft and drive the corresponding rotating shaft to rotate, and the linkage members sleeved on the two rotating shafts are configured to be synchronously folded or synchronously flattened through the gear group.

In some embodiments, the rotating shaft apparatus includes a limiting mechanism, the limiting mechanism includes a pushing member arranged on the linkage member, an abutting member, and an elastic member, the elastic member is configured to provide an elastic force that enables the abutting member and the pushing member to abut against each other, in response to the connecting members on the two opposite sides of the rotating shaft apparatus rotating synchronously through the linkage assembly, the pushing member rotates with respect to the abutting member, the elastic member is elastically deformed by being squeezed by the abutting member, the linkage member is maintained at a position by a friction resistance between the pushing member and the abutting member, and the side support member on one of the two opposite sides of the rotating shaft apparatus is maintained at an angle from the side support member on the other of the two opposite sides of the rotating shaft apparatus.

In some embodiments, the pushing member includes a first cam, the abutting member includes a second cam, the first cam and the second cam rotatably abut against each other, and the elastic member elastically abuts against the abutting member.

In some embodiments, the abutting member and the elastic member are sleeved on each of the two rotating shafts, the limiting mechanism includes a positioning member sleeved on an end of each of the two rotating shafts away from the abutting member and a friction member sleeved on each of the two rotating shafts, the friction member is located between the positioning member and the elastic member, an end of the elastic member away from the abutting member elastically abuts against the friction member, the friction member abuts against the positioning member, and a rotation of each of the two rotating shafts is able to drive the corresponding friction member to rotate with respect to the positioning member.

In some embodiments, a foldable housing is provided. The foldable housing includes: two frames; and a rotating shaft apparatus, disposed between the two frames and including: a support assembly, including a side support member on each of two opposite sides of the rotating shaft apparatus; a rotating assembly, including a rotating member on each of the two opposite sides of the rotating shaft apparatus and a connecting member on each of the two opposite sides of the rotating shaft apparatus, wherein the rotating member is rotatably connected to the connecting member, and the side support member is rotatably connected to the connecting member; and a linkage assembly, including a linkage member on each of the two opposite sides of the rotating shaft apparatus, wherein the linkage member is slidably connected to the connecting member; the side support member and the linkage member are connected to each other through a cooperation of a sliding-guiding portion and a sliding-limiting groove, the side support member and the linkage member are connected to each other through a cooperation of a sliding-stopping groove and a position-stopping portion, or the side support member and the rotating member are connected to each other through the cooperation of the sliding-stopping groove and the position-stopping portion; wherein a rotation of the connecting member is able to drive the rotating member and the linkage member to rotate, rotations of the rotating member and the linkage member are able to drive the side support member to move, and the side support members on the two opposite sides of the rotating shaft apparatus are configured to be synchronously folded or synchronously unfolded with respect to each other; wherein each of the two frames is connected to the connecting member on a corresponding one of the two opposite sides of the rotating shaft apparatus.

In some embodiments, an electronic device is provided. The electronic device includes: a flexible member; and a foldable housing, wherein the flexible member is arranged on the foldable housing and the foldable housing including: two frames; and a rotating shaft apparatus, disposed between the two frames and including: a support assembly, including a side support member on each of two opposite sides of the rotating shaft apparatus; a rotating assembly, including a rotating member on each of the two opposite sides of the rotating shaft apparatus and a connecting member on each of the two opposite sides of the rotating shaft apparatus, wherein the rotating member is rotatably connected to the connecting member, and the side support member is rotatably connected to the connecting member; and a linkage assembly, including a linkage member on each of the two opposite sides of the rotating shaft apparatus, wherein the linkage member is slidably connected to the connecting member; the side support member and the linkage member are connected to each other through a cooperation of a sliding-guiding portion and a sliding-limiting groove, the side support member and the linkage member are connected to each other through a cooperation of a sliding-stopping groove and a position-stopping portion, or the side support member and the rotating member are connected to each other through the cooperation of the sliding-stopping groove and the position-stopping portion; wherein a rotation of the connecting member is able to drive the rotating member and the linkage member to rotate, rotations of the rotating member and the linkage member are able to drive the side support member to move, and the side support members on the two opposite sides of the rotating shaft apparatus are configured to be synchronously folded or synchronously unfolded with respect to each other; wherein each of the two frames is connected to the connecting member on a corresponding one of the two opposite sides of the rotating shaft apparatus.

A clear and complete description of technical solutions of embodiments of the present disclosure will be given below in conjunction with the accompanying drawings in the embodiments of the present disclosure. Apparently, the embodiments described below are merely a part of the embodiments of the present disclosure, rather than all of the embodiments. All other embodiments obtained by those skilled in the art without creative efforts on the basis of the embodiments of the present disclosure shall fall within the protection scope of the present disclosure.

In addition, the following embodiments are illustrated with reference to the attached drawings, and are configured to illustrate specific embodiments that can be implemented in the present disclosure. The directional terms mentioned in the present disclosure, such as "up", "down", "front", "back", "left", "right", "inside", "outside", "side", etc., are only referring to the direction of the attached drawings. Therefore, the directional terms are employed for explaining and understanding the embodiments of present disclosure, rather than indicating or implying that the apparatus or element referred to must have a specific orientation, be constructed and operated in a specific orientation, and cannot be understood as restrictions on the embodiments of present disclosure. The term "natural state" means that the apparatus or element is in a state free from an external force, such as a pulling force or a pressing force.

In the embodiments of present disclosure, unless otherwise specified or limited, terms "mount/mounted", "connect/connected", "couple/coupled", "dispose/disposed on", and the like are used in a broad sense, may include, for example, fixed connections, detachable connections, or integral connections, may also include mechanical connections, may also include direct connections or indirect connections via intervening structures, and may also include inner communications between two elements, as can be understood by those skilled in the art depending on specific contexts.

As shown in FIGS. 1 to 7, an electronic device 100 provided by some embodiments of the present disclosure includes a foldable housing 20 and a flexible member 30 arranged on the foldable housing 20. The flexible member 30 may include various flexible components with corresponding functions such as a flexible display screen, a flexible touch screen, a flexible touch display screen, etc., or various flexible components fixedly attached with flexible support plates, such as a flexible display screen attached with a flexible steel plate, a flexible touch screen attached with a flexible steel plate, etc. The flexible member 30 may be folded or flattened along with the foldable housing 20. The foldable housing 20 includes two frames 21 and a rotating shaft apparatus 22 connected between the two frames 21. The flexible member 30 includes a foldable region 31 facing the rotating shaft apparatus 22 and a non-foldable region 33 connected to each of two opposite sides of the foldable region 31. The non-foldable region 33, which is on each of the two opposite sides of the foldable region 31, of the flexible member 30 is fixed to a front surface of a corresponding one of the two frames 21. The foldable region 31 may be attached to a front surface of the rotating shaft apparatus 22. The foldable region 31 of the flexible member 30 may be folded or flattened along with the rotating shaft apparatus 22. The rotating shaft apparatus 22 includes a support assembly 23, a rotating assembly 25, a folding-assisting assembly, and a back cover 28. The folding-assisting assembly includes a linkage assembly 26 and a limiting mechanism 27. The linkage assembly 26 is connected to the rotating assembly 25, and the limiting mechanism 27 is connected to the linkage assembly 26. In some embodiments, the linkage assembly 26 is located between the rotating assembly 25 and the limiting mechanism 27. The support assembly 23 includes a middle support member 231 and a side support member 233 arranged on each of two opposite sides of the middle support member 231. The flexible member 30 is attached to a front surface of the middle support member 231 and a front surface of the side support member 233. The rotating assembly 25 includes a positioning seat 251 and a rotating mechanism 253 arranged on each of two opposite sides of the positioning seat 251. The rotating mechanism 253 includes a rotating member 254 and a connecting member 256. One end of the rotating member 254 is rotatably connected to the positioning seat 251, and the other end of the rotating member 254 is rotatably connected to the connecting member 256. The linkage assembly 26 includes a linkage seat 261 and a linkage mechanism 263 connected to the linkage seat 261. The linkage mechanism 263 includes a linkage member 264 rotatably arranged on each of two opposite sides of the linkage seat 261. One end of the linkage member 264 away from the linkage seat 261 is slidably connected to the connecting member 256. The side support member 233 and the linkage member 264 are connected to each other through a cooperation of a sliding-limiting groove 2330 and a first sliding-guiding portion 2640. The connecting member 256 is rotatable with respect to the positioning seat 251, so as to drive the rotating member 254 to rotate with respect to the positioning seat 251 and drive the linkage member 264 to rotate with respect to the linkage seat 261. Rotations of the rotating member 254 and the linkage member 264 may drive the side support member 233 to move, in this way, the two side support members 233 arranged on the two opposite sides of the middle support member 231 are able to be folded synchronously with respect to each other or unfolded synchronously with respect to each other.

Each frame 21 of the electronic device 100 is connected to the corresponding connecting member 256 of the rotating shaft apparatus 22. Each frame 21 drives the corresponding rotating member 254 to rotate with respect to the positioning seat 251 through the corresponding connecting member 256. The rotations of the connecting member 256 and the rotating member 254 drive the linkage member 264 to rotate with respect to the linkage seat 261. In this way, the two side support members 233 of the support assembly 23 may be folded or unfolded synchronously along with the rotating mechanism 253 and the linkage mechanism 263. The flexible member 30 is folded or flattened along with the side support members 233. The foldable region 31 may be folded into a waterdrop shape.

In some embodiments, the front surface refers to a surface facing the same orientation as a light-emitting surface of the flexible member 30. The back surface refers to a surface facing an opposite orientation with the light-emitting surface of the flexible member 30. The electronic device 100 may include any product and component with display function, such as a mobile phone, a tablet, a display, a Liquid Crystal Display (LCD) panel, an Organic Light-Emitting Diode (OLED) panel, a television, a smartwatch, a Virtual Reality (VR) head-mounted display, a in-vehicle display, and so on. The term "connect/connected" in the description of the embodiments of the present disclosure includes a direct connection and an indirect connection. For example, "A being connected to B" include the situation that A and B are directly connected to each other, or A and B are connected through a third element C or more other elements. The term "connect/connected" may also include an integrated connection and a non-integrated connection. The integrated connection means that A and B are integrated with each other and are connected to each other. The non-integrated connection means that A and B are connected to each other but are not integrated with each other.

The rotating shaft apparatus 22 of the electronic device 100 provided by some embodiments of the present disclosure includes the support assembly 23, the rotating assembly 25, and the linkage assembly 26. One end of the rotating member 254 of the rotating assembly 25 is rotatably connected to the positioning seat 251, and the other end of the rotating member 254 is rotatably connected to the connecting member 256. One end of the linkage member 264 of the linkage assembly 26 away from the linkage seat 261 is slidably connected to the connecting member 256. The side support member 233 and the linkage member 264 are connected to each other through the cooperation of the sliding-limiting groove 2330 and the first sliding-guiding portion 2640. The side support member 233 is rotatably connected to the corresponding connecting member 256. In the process of the two frames 21 moving towards or moving away from each other, the connecting member 256 drives the rotating member 254 to rotate with respect to the positioning seat 251, and the two connecting members 256 on the two opposite sides of the positioning seat 251 drive the two linkage members 264 on the two opposite sides of the positioning seat 251 to rotate synchronously with respect to the linkage seat 261. The connecting members 256 and the linkage members 264 drive the two side support members 233 to be synchronously folded with respect to each other or synchronously unfolded with respect to each other. In this way, the flexible member 30 may be folded or flattened. The rotating shaft apparatus 22 may be synchronously folded or unfolded through the support assembly 23, the rotating assembly 25, and the linkage assembly 26. Compared with the related art in which a hinge mechanism supports the flexible member, the rotating shaft apparatus 22 in the embodiments of the present disclosure has a simple structure, the manufacturing cost is low, the reliability of connections between components is high, and the overall strength may be improved. In addition, in the embodiments of present disclosure, the side support member 233 and the linkage member 264 are connected to each other through the cooperation of the first sliding-guiding portion 2640 and the sliding-limiting groove 2330. The overall width of the rotating shaft apparatus 22 may be reduced, the internal space of the housing 20 occupied by the rotating shaft apparatus 22 may be reduced, and the layout of other components such as a mainboard or a battery may be improved.

In some embodiments, the rotating shaft apparatus 22 includes one support assembly 23, two rotating assemblies 25, two linkage assemblies 26, and two limiting mechanisms 27. One of the two rotating assemblies 25, one of the two linkage assemblies 26, and one of the two limiting mechanisms 27 are connected to each other to form a combined structure. The other of the two rotating assemblies 25, the other of the two linkage assemblies 26, and the other of the two limiting mechanisms 27 are connected to form another combined structure. Two combined structures are connected to the back surface of the support assembly 23 and are spaced apart from each other.

In some embodiments, the rotating shaft apparatus 22 may also include one support assembly 23, one rotating assembly 25, one linkage assembly 26, and one limiting mechanism 27. The rotating assembly 25, the linkage assembly 26, and the limiting mechanism 27 are connected to each other to form a combined structure. The combined structure is connected to the back surface of the support assembly 23.

In some embodiments, the rotating shaft apparatus 22 may also include one support assembly 23, three or more rotating assemblies 25, three or more linkage assemblies 26, and three or more limiting mechanisms 27. The three or more rotating assemblies 25 are arranged on the back surface of the support assembly 23 and are spaced apart from each other along a lengthwise direction of the support assembly 23. The linkage assemblies 26 and the rotating assemblies 25 are connected in one-to-one correspondence. The limiting mechanisms 27 and the linkage assemblies 26 are connected in one-to-one correspondence.

Figure 3:
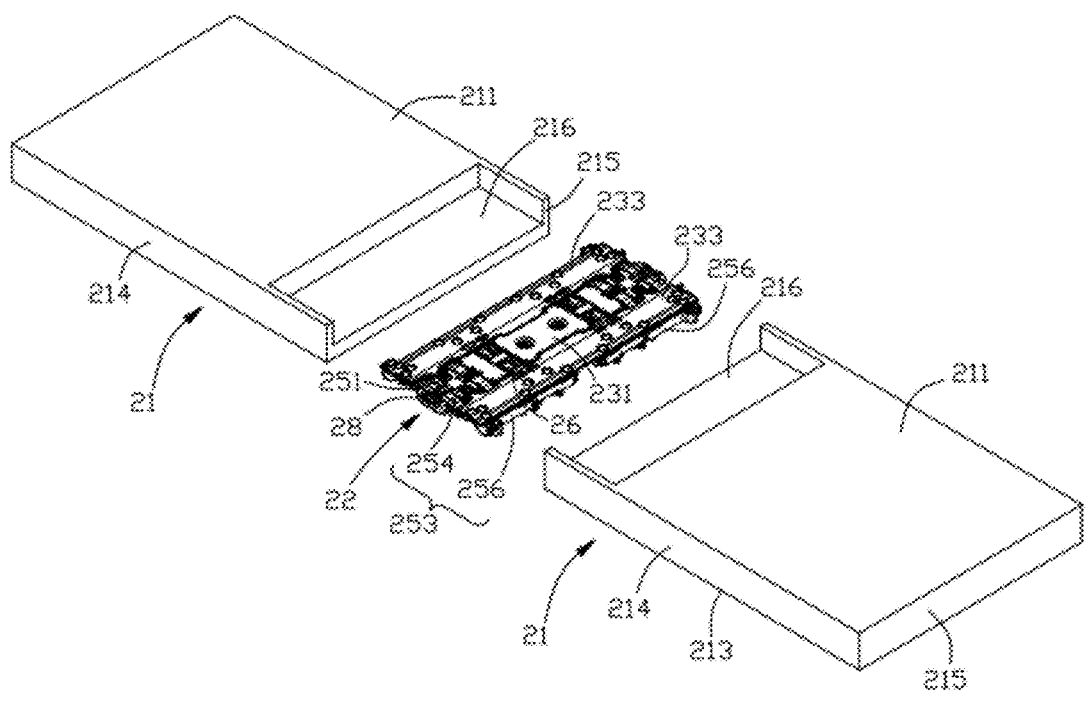
FIG. 3 is a schematic exploded perspective structural view of the foldable housing shown in FIG. 2.
Figure 4:
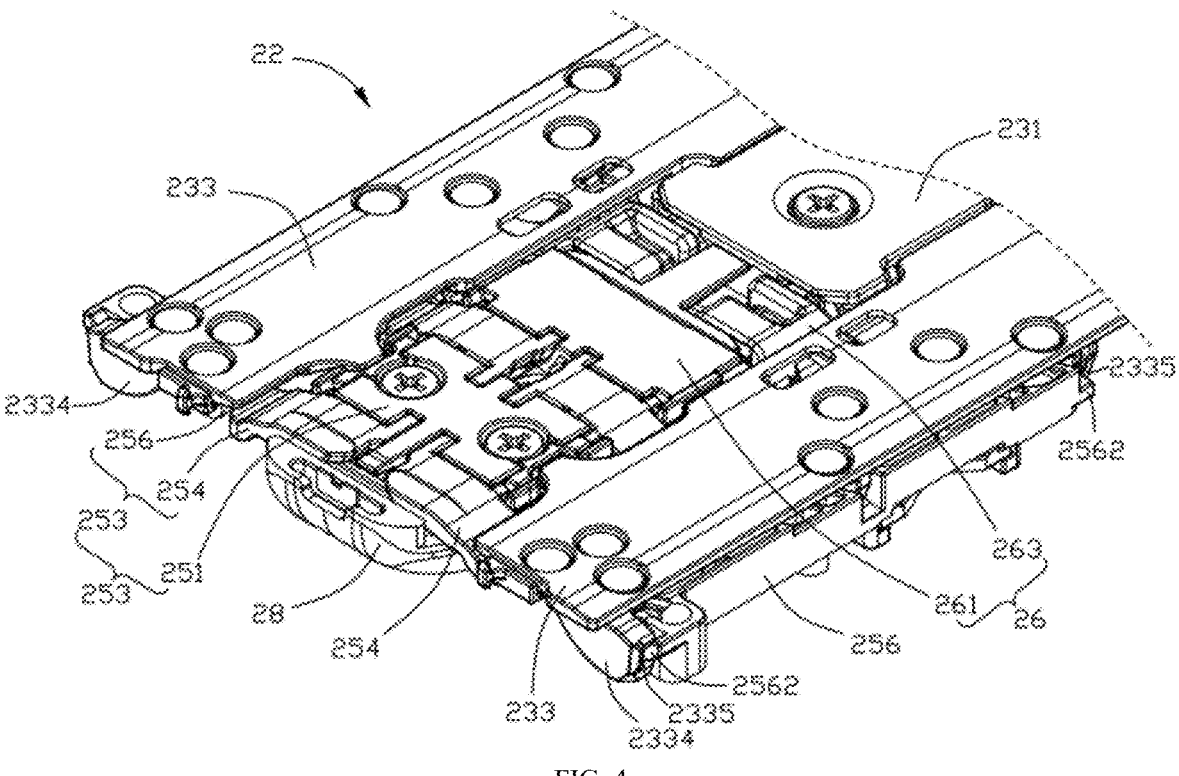
FIG. 4 is a schematic perspective structural view of a part of a rotating shaft apparatus shown in FIG. 3.
Figure 5:
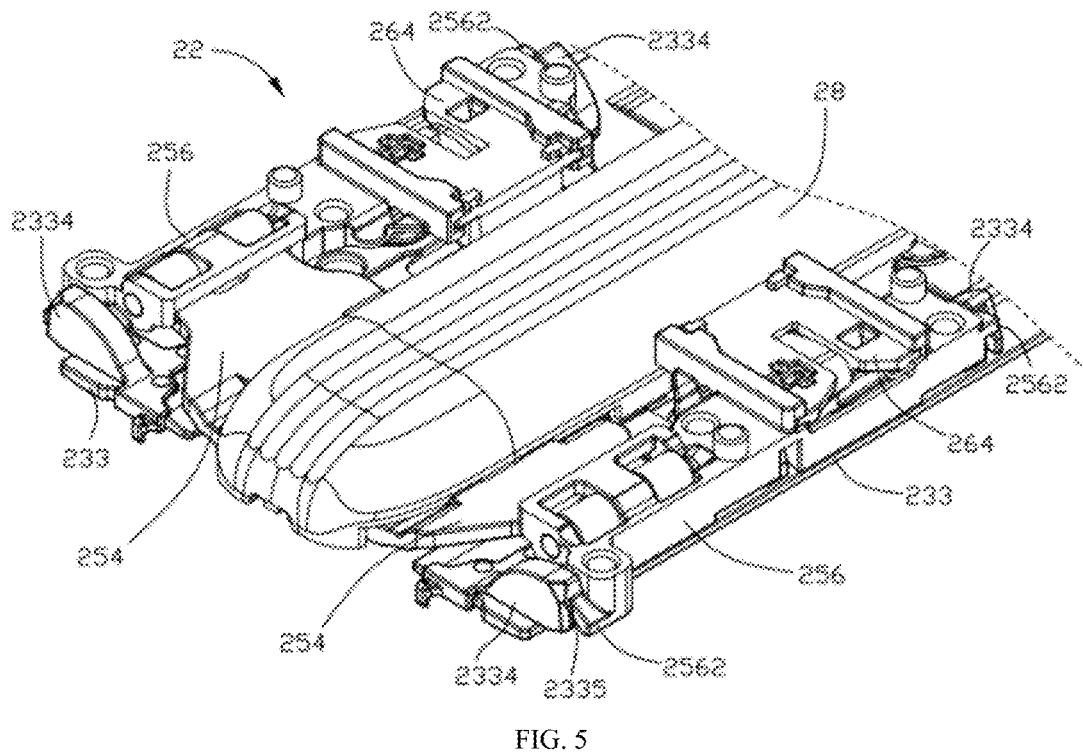
FIG. 5 is another schematic perspective structural view of the rotating shaft apparatus shown in FIG. 4, when viewed from another viewing angle.

As shown in FIGS. 1 to 3, the connecting member 256 on each of the two opposite sides of the rotating shaft apparatus 22 is fixedly connected to a corresponding one of the two frames 21. The connecting member 256 and the corresponding frame 21 may be fixed to each other by means of, but is not limited to, snapping, bonding, and so on. When one of the two frames 21 is folded or flattened with respect to the other of the two frames 21, the corresponding rotating mechanism 253 is driven to rotate with respect to the positioning seat 251. The rotating mechanisms 253 on the two opposite sides of the positioning seat 251 drive the two side support members 233 to rotate and slide synchronously with respect to the positioning seat 251 through the linkage assembly 26, until the two side support members 233 and the middle support member 231 are synchronously folded into a waterdrop shape or synchronously unfolded to form a flat shape. The flexible member 30 is folded into a waterdrop shape or unfolded into a flat shape along with the foldable region 31.

As shown in FIG. 3, each frame 21 includes a front surface 211, a back surface 213, two opposite side surfaces 214, and two end surfaces 215. The rotating shaft apparatus 22 is connected between two end surfaces 215 of the two frames 21. The non-foldable region 33 of the flexible member 30 is connected to the front surface 211 of the corresponding frame 21. One of the two end surfaces 215 of each frame 21 facing the rotating shaft apparatus 22 defines a receiving groove 216. The receiving groove 216 passes through the front surface 211 of the corresponding frame 21. Each of two opposite ends of the receiving groove 216 extends to a corresponding one of the two opposite side surfaces 214 of the frame 21. Each of the two opposite sides of the rotating shaft apparatus 22 is received in the receiving groove 216 of the corresponding frame 21. Each connecting member 256 is fixedly connected to the corresponding frame 21. The back surface 213 of the frame 21 defines several receiving spaces (not shown in the drawings) configured to receive electronic components such as a circuit board, a battery, and so on.

As shown in FIGS. 4-7, the middle support member 231 is a rectangular support plate. The rectangular support plate includes a front surface 2311 and a back surface 2312 opposite to the front surface 2311. The front surface 2311 of the middle support member 231 defines a countersunk hole 2313. The countersunk hole 2313 passes through the back surface 2312. A convex ring or protruding ring 2315 is disposed around the countersunk hole 2313 and protrudes from the back surface 2312 of the middle support member 231. Each of the two opposite sides of middle support member 231 defines an avoidance recess 2316.

The side support member 233 includes a side support plate 2331. A side of the side support plate 2331 away from the positioning seat 251 is rotatably connected to the connecting member 256. The sliding-limiting groove 2330 is arranged on the other side of the side support plate 233 close to the positioning seat 251. The linkage member 264 is arranged with the first sliding-guiding portion 2640 slidably passing through the sliding-limiting groove 2330. In some embodiments, the side support plate 2331 is rectangular. The side of the side support member 233 away from the positioning seat 251 is connected to the connecting member 256 through a cooperation of a first arc-shaped groove and a first arc-shaped rail. The side support member 233 includes a front surface 2332 and a back surface 2333 opposite to the front surface 2332. The side support member 233 is arranged with a rotating portion 2334. In some embodiments, the rotating portion 2334 defines the first arc-shaped groove 2335, and the connecting member 256 is arranged with the first arc-shaped rail 2562 slidably inserted in the first arc-shaped groove 2335. An axis of the first arc-shaped groove 2335 is collinear with an axis of rotation between the side support member 233 and the connecting member 256. The rotating portion 2334 protrudes from a side of the back surface 2333 of the side support member 233 away from the middle support member 231, and is provided at each of two opposite ends of the connecting member 256. The rotating portion 2334 is an arc-shaped block. The first arc-shaped groove 2335 is defined on a side surface of the rotating portion 2334 facing the connecting member 256. One end of the first arc-shaped groove 2335 passes through a surface of the rotating portion 2334 away from the middle support member 231, and the other end of the first arc-shaped groove 2335 extends to the back surface 2333 of the side support member 233. The first arc-shaped groove 2335 is curved in a direction away from the back surface 2333, that is, the middle of the first arc-shaped groove 2335 is curved in the direction away from the back surface 2333.

In some embodiments, the rotating portion 2334 is a convex block fixedly connected to the side support plate 233 by means of, but is not limited to, snapping, bonding, and so on. Each of two side surfaces of two rotating portions 2334 facing each other provided at the two opposite ends of the connecting member 256 defines the first arc-shaped groove 2335. The axes of two first arc-shaped grooves 2335 defined on the two surfaces of the two rotating portions 2334 facing each other are collinear with each other. One end of the first arc-shaped groove 2335 passes through a surface of the rotating portion 2334 away from the middle support member 231. In some embodiments, the rotating portion 2334 and the side support plate 2331 may be integrated with each other.

In some embodiments, a side surface of each of the two rotating portion 2334, which faces away from a side surface of the other of the two rotating portions 2334 defines the first arc-shaped groove 2335. The axes of two first arc-shaped grooves 2335 defined on the two surfaces opposite to each other are collinear with each other. One end of the first arc-shaped groove 2335 passes through the surface of the rotating portion 2334 away from the middle support member 231. The first arc-shaped groove 2335 is curved in the direction away from the back surface 2333, that is, the middle of the first arc-shaped groove 2335 is curved in the direction away from the back surface 2333. Each of two opposite ends of the connecting member 256 is arranged with the first arc-shaped rail 2562 rotatably received in the corresponding first arc-shaped groove 2335.

In some embodiments, one of two opposite side surfaces of one rotating portion 2334 defines one first arc-shaped groove 2335, and one of two opposite side surfaces of the other rotating portion 2334 defines another first arc-shaped groove 2335. The axes of the one first arc-shaped groove and the another first arc-shaped groove 2335 are collinear with each other. Each of the two opposite ends of the connecting member 256 is arranged with the first arc-shaped rail 2562 rotatably received in the corresponding first arc-shaped groove 2335.

In some embodiments, each of two opposite ends at the side of the connecting member 256 away from the positioning seat 251 defines the first arc-shaped groove. The first arc-shaped groove is curved in a direction away from the side support plate 2331. The axes of the two first arc-shaped grooves 2335 defined on two opposite ends of the connecting member 256 are collinear with each other. The first arc-shaped rail is provided on the side of the side support member 233 away from the positioning seat 251 at a position facing each of two opposite ends of the connecting member 256, and is configured to be rotatably received in the corresponding first arc-shaped groove.

Figure 7:
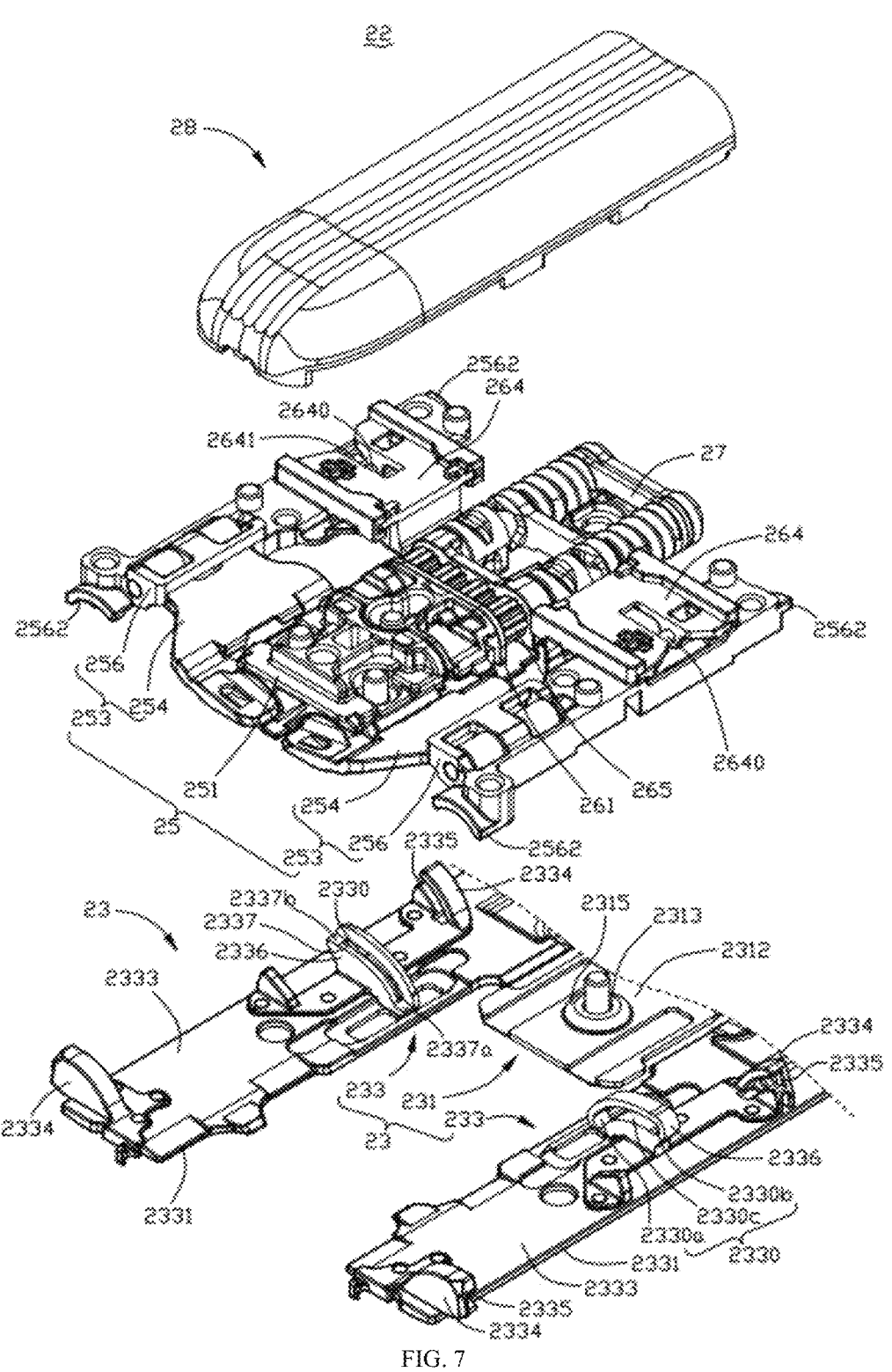
FIG. 7 is a schematic exploded perspective structural view illustrating a support assembly, a rotating assembly, a folding-assisting assembly, and a back cover of the rotating shaft apparatus shown in FIG. 5.
Figure 8:
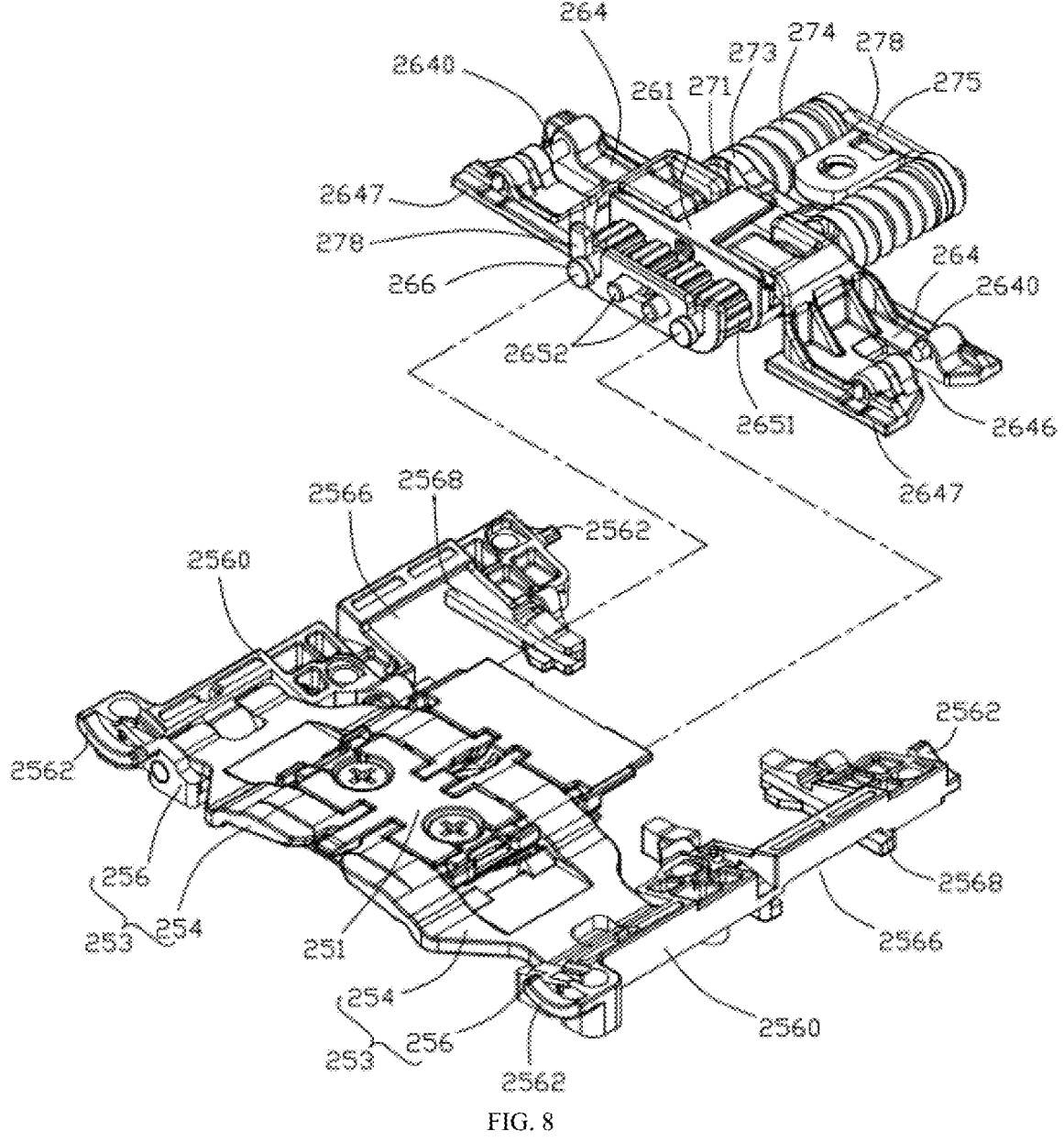
FIG. 8 is a schematic exploded perspective structural view illustrating the rotating assembly and the folding-assisting assembly shown in FIG. 6.
Figure 9:
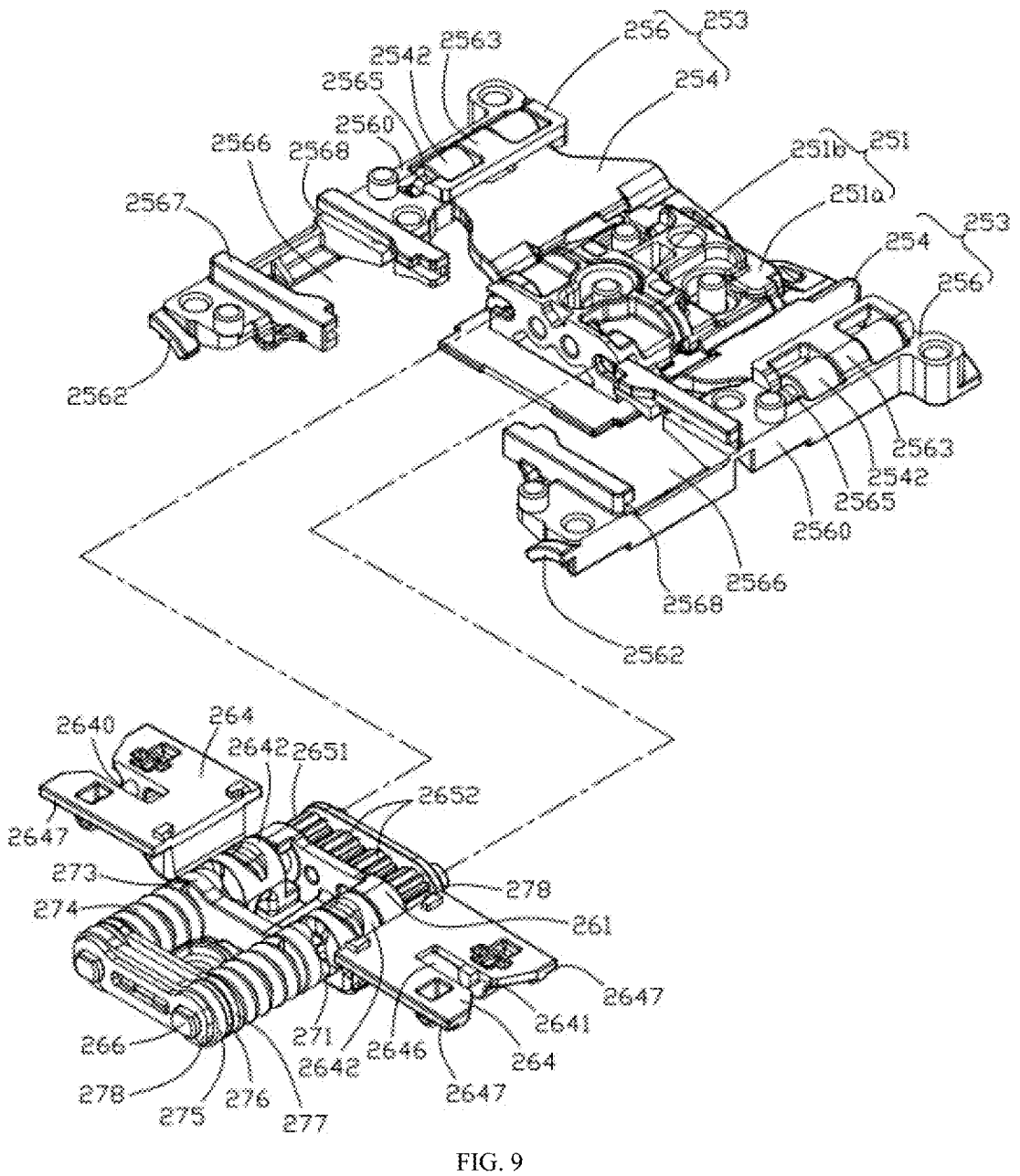
FIG. 9 is another schematic perspective structural view of the rotating assembly and the folding-assisting assembly shown in FIG. 8, when viewed from another viewing angle.
Figure 10:
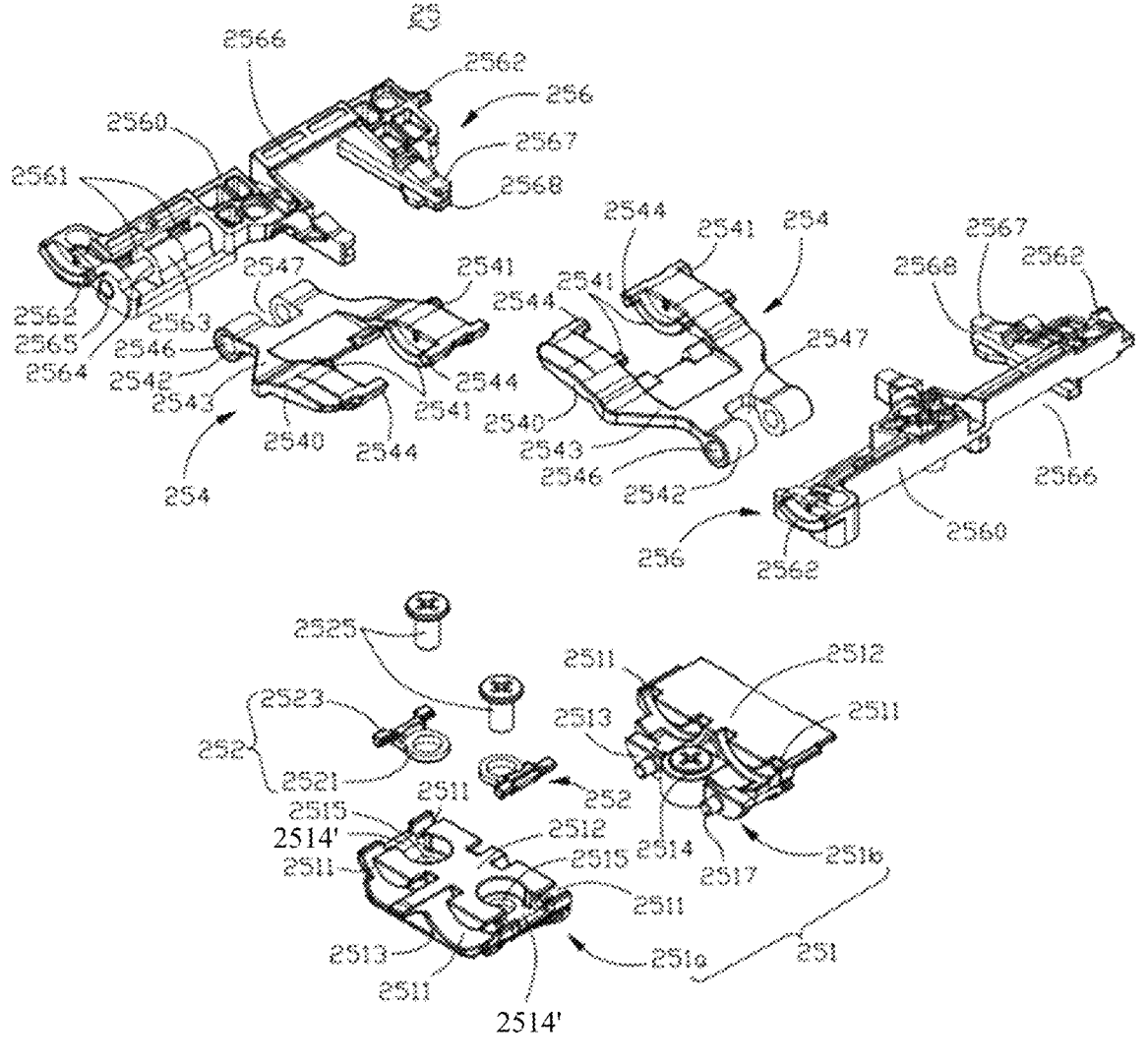
FIG. 10 is a schematic exploded perspective structural view of the rotating assembly shown in FIG. 8.
Figure 11:
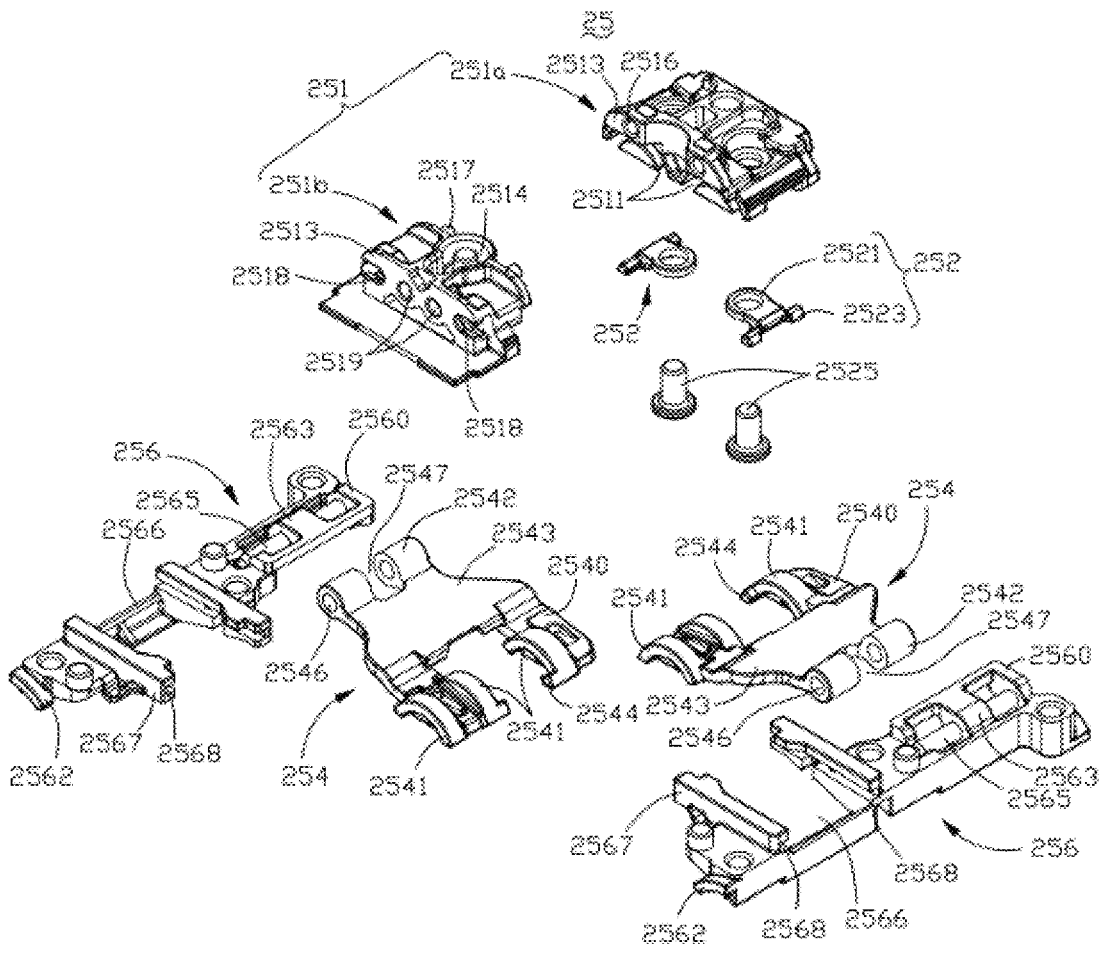
FIG. 11 is another schematic perspective structural view of the rotating assembly shown in FIG. 10, when viewed from another viewing angle.

As shown in FIG. 7, a limiting portion 2336 is provided between the two rotating portions 2334, and is provided on the side of the back surface 2333 of the side support member 233 close to the middle support member 231. The sliding-limiting groove 2330 is defined on the limiting portion 2336. The sliding-limiting groove 2330 may pass through two opposite sides of the limiting portion 2336 or not pass through the two opposite sides of the limiting portion 2336. In some embodiments, the limiting portion 2336 is arc-shaped. The sliding-limiting groove 2330 is defined on a side surface of the limiting portion 2336. In some embodiments, the sliding-limiting groove 2330 on the limiting portion 2336 of one side support member 233 passes through the two opposite sides of the limiting portion 2336, and the sliding-limiting groove 2330 on the limiting portion 2336 of the other side support member 233 does not passes through the two opposite sides of the limiting portion 2336. The sliding-limiting groove 2330 extends from the side of the limiting portion 2336 close to the middle support member 231 to the side of the limiting portion 2336 away from the middle support member 231. That is, a first end of the sliding-limiting groove 2330 is close to the middle support member 231, a second end of the sliding-limiting groove 2330 opposite to the first end is away from the middle support member 231, and the first end is disposed closer to the back surface 2333 than the second end. The first sliding-guiding portion 2640 of the linkage member 264 may slide in the sliding-limiting groove 2330. The first sliding-guiding portion 2640 may be positioned at the first end or the second end of the sliding-limiting groove 2330. In some embodiments, the limiting portion 2336 and the rotating portion 2334 close to the linkage member 264 are integrated as a one-piece structure, and the one-piece structure is configured as a support frame of the side support member 233. The limiting portion 2336 may be fixed to the side support member 233 by means of, but is not limited to, snapping, bonding, and so on. In some embodiments, the limiting portion 2336 and the side support member 233 may be integrated with each other.

The sliding-limiting groove 2330 includes a first limiting section 2330a and a second limiting section 2330b located at two opposite ends of the sliding-limiting groove 2330 and a sliding-guiding section 2330c located between the first limiting section 2330a and the second limiting section 2330b. The first limiting section 2330a is located at a side of the sliding-limiting groove 2330 close to the middle support member 231, and the second limiting section 2330b is located at a side of the sliding-limiting groove 2330 away from the middle support member 231. The first limiting section 2330a, the sliding-guiding section 2330c, and the second limiting section 2330b are in communication with each other. When the two side support members 233 are in a fully folded state, the first sliding-guiding portion 2640 is positioned at the first limiting section 2330a, so as to prevent the side support members 231 from being further folded. When the two side support members 233 are in a flattened state, the first sliding-guiding portion 2640 is positioned at the second limiting section 2330b, so as to prevent the side support members 231 from being further flattened. In some embodiments, the sliding-limiting groove 2330 is an arc-shaped groove. The sliding-limiting groove 2330 is curved in a direction away from the back surface 2333, that is, the sliding-guiding section 2640c is curved in the direction away from the back surface 2333.

As shown in FIG. 7, an outer peripheral surface, which is away from the back surface 2333, of the limiting portion 2336 of one side support plate 2331 defines a sliding-guiding groove 2337. Each of two opposite ends of the sliding-guiding groove 2337 passes through a corresponding one of two opposite end surfaces of the limiting portion 2336. The sliding-guiding groove 2337 is parallel to the sliding-limiting groove 2330. The limiting portion 2336 forms a first stopping portion 2337a at one of the two opposite ends of the sliding-guiding groove 2337 and a second stopping portion 2337b at the other of the two opposite ends of the sliding-guiding groove 2337. The first stopping portion 2337a is close to the middle support member 231, and the second stopping portion 2337b is away from the middle support member 231. The linkage member 264 is arranged with a second sliding-guiding portion 2641 facing the sliding-guiding groove 2337. When the two side support members 233 are in the fully folded state, the second sliding-guiding portion 2641 is positioned at the first stopping portion 2337a, so as to prevent the side support members 231 from being further folded. When the two side support members 233 are in the flattened state, the second sliding-guiding portion 2641 is positioned at the second stopping portion 2337b, so as to prevent the side support members 231 from being further flattened.

In some embodiments, the limiting portion 2336 of each side support member 233 defines the sliding-limiting groove 2330 and the sliding-guiding groove 2337. The linkage member 264 includes the first sliding-guiding portion 2640 facing the sliding-limiting groove 2330 and the second sliding-guiding portion 2641 facing the sliding-guiding groove 2337. That is, the first sliding-guiding portion 2640 is slidably received in the sliding-limiting groove 2330, and the second sliding-guiding portion 2641 is slidably received in the sliding-guiding groove 2337. When the two side support members 233 are in the fully folded state, the first sliding-guiding portion 2640 is positioned at the first limiting section 2330a, and the second sliding-guiding portion 2641 is positioned at the first stopping portion 2337a, so as to prevent the side support members 231 from being further folded. When the two side support members 233 are in the flattened state, the first sliding-guiding portion 2640 is positioned at the second limiting section 2330b, and the second sliding-guiding portion 2641 is positioned at the second stopping portion 2337b, so as to prevent the side support members 231 from being further flattened.

In some embodiments, one of the sliding-limiting groove 2330 and the sliding-guiding groove 2337 on the limiting portion 2336 of the side support member 233 is omitted, and one of the first sliding-guiding portion 2640 and the second sliding-guiding portion 2641 of the linkage member is omitted. That is, if the limiting portion 2336 defines the sliding-limiting groove 2330, the linkage member 264 is arranged with the first sliding-guiding portion 2640 slidably received in the sliding-limiting groove 2330. If the limiting portion 2336 defines the sliding-guiding groove 2337, the linkage member is arranged with the second sliding-guiding portion 2641 slidably received in the sliding-guiding groove 2337.

As shown in FIGS. 6-11, an end of the rotating member 254 away from the connecting member 256 is rotatably connected to the positioning seat 251. A side of the side support member 233 away from the middle support member 231 is rotatably connected to the connecting member 256. The linkage assembly 26 is connected between the positioning seat 251 and the connecting member 256. The side support member 233 and the connecting member 256 are rotatably connected to each other through a cooperation of the first arc-shaped groove 2335 and the first arc-shaped rail 2562. The positioning seat 251 and the rotating member 254 are rotatably connected to each other through a cooperation of the second arc-shaped groove 2511 and the second arc-shaped rail 2541. In some embodiments, the first arc-shaped rail 2562 on each end of the connecting member 256 is rotatably inserted in the corresponding first arc-shaped groove 2335 of the side support member 233. In this way, the connecting member 256 and the side support member 233 may rotate with respect to each other along the first arc-shaped grooves 2335, axes of the first arc-shaped rail 2562 and the first arc-shaped groove 2335 are colinear with each other, and the axis of the first arc-shaped rail 2562 and an axis of rotation between the side support member 233 and the connecting member 256 are colinear with each other. The positioning seat 251 defines the second arc-shaped groove 2511. The rotating member 254 is arranged with the second arc-shaped rail 2541 facing the second arc-shaped groove 2511. In this way, the connecting member 256 and the positioning seat 251 may rotate with respect to each other along the second arc-shaped groove 2511, axes of the second arc-shaped groove 2511 and the second arc-shaped rail 2541 are collinear with each other, and the axis of the second arc-shaped rail 2541 is collinear with an axis of rotation between the rotating member 254 and the positioning seat 251.

In some embodiments, the positioning seat 251 includes a first seat body 251a and a second seat body 251b connected to the first seat body 251a. An end of the rotating member 254 away from the connecting member 256 is rotatably connected between the first seat body 251a and the second seat body 251b. In some embodiments, each of the first seat body 251a and the second seat body 251b defines the second arc-shaped groove 2511. The second arc-shaped rail 2541 of the rotating member 254 is rotatably received in the second arc-shaped groove 2511. The first seat body 251a includes a front surface 2512, a back surface opposite to the front surface 2512, two opposite side surfaces 2513, and two opposite end surfaces. Each of the two opposite side surfaces 2513 of the first seat body 251a defines two second arc-shaped grooves 2511. Each of two opposite ends of each second arc-shaped groove 2511 passes through the front surface 2512. Axes of the two second arc-shaped grooves 2511 on the same side surface 2513 are parallel to each other. Axes of two second arc-shaped grooves 2511, on the same end of the first seat body 251a, which are on the two opposite side surfaces 2513, are collinear with each other. Each of two opposite ends of the front surface 2512 of the first seat body 251a defines a positioning groove 2514'. The positioning groove 2514' is in communication with the two second arc-shaped grooves 2511 on the same end of the first seat body 251a. The bottom surface of the first seat body 251a defines a connecting hole 2515 at a position close to the middle of the positioning groove 2514'. The side surface 2513 of the first seat body 251a facing the second seat body 251b defines an engaging hole 2516. The second seat body 251b includes a front surface 2512, a back surface opposite to the front surface 2512, two opposite side surfaces 2513, and two opposite end surfaces. The side surface 2513 of the second seat body 251b facing the first seat body 251a defines a receiving space at a side close to the front surface 2512. The receiving space is configured to receive the first seat body 251a. The second seat body 251b defines two second arc-shaped grooves 2511 on a side surface of the receiving space. Axes of the two second arc-shaped grooves 2511 on the side surface of the receiving space are parallel to each other. After the first seat body 251a is connected to the second seat body 251b, the two second arc-shaped grooves 2511 defined on the second seat body 251b directly face two second arc-shaped grooves 2511 defined at the same side of the first seat body 251a in one-to-one correspondence. The second seat body 251b defines a connecting hole 2514 on a bottom surface of the receiving space. A locking member, such as a screw, passes through the connecting hole 2514 and is connected to the back cover 28. In this way, the positioning seat 251 may be connected to the back cover 28. The side surface 2513 of the second seat body 251b facing the first seat body 251a is arranged with an engaging column 2517. Each of two opposite ends of the side surface 2513 of the second seat body 251b away from the first seat body 251a defines a connecting groove 2518. The middle of the side surface 2513 of the second seat body 251b away from the first seat body 251a defines a connecting hole 2519. A cover plate extends from the front surface 2512 of the second seat body 251b in a direction away from the engaging column 2517.

The positioning seat 251 also includes two stopping members 252. Each stopping member 252 is configured to prevent the second arc-shaped rail 2541 from being disengaged from the corresponding second arc-shaped groove 2511. Each stopping member 252 includes a positioning portion 2521 and a stopping portion 2523 connected to an end of the positioning portion 2521. The positioning portion 2521 is a positioning ring. The stopping portion 2523 may be implemented as a stopping bar arranged on the outer periphery of the positioning ring. Each of two opposite ends of the stopping bar extends out of the positioning portion 2521. The positioning seat 251 also includes two locking members 2525, and each locking member 2525 is configured to connect the corresponding stopping member 252 to the first seat body 251a.

The rotating member 254 includes a first rotating portion 2540, a second rotating portion 2542, and a connecting portion 2543 connected between the first rotating portion 2540 and the second rotating portion 2542. The first rotating portion 2540 is rotatably connected to the positioning seat 251. The second rotating portion 2542 is rotatably connected to the corresponding connecting member 256. The first rotating portion 2540 is arranged with the second arc-shaped rail 2541. The second rotating portion 2542 is rotatably connected to the connecting member 256 through a pivot shaft. The first rotating portion 2540 includes a rotating strip protruding from a side of the connecting portion 2543 away from the second rotating portion 2542. The second arc-shaped rail 2541 is arranged on a side surface of the rotating strip. In some embodiments, the rotating strip protrudes from each of two opposite ends of the side of the connecting portion 2543 away from the second rotating portion 2542. The two rotating strips on the two opposite ends of the connecting portion 2543 are spaced apart from each other. Each of two side surfaces of the two rotating strips facing each other is arranged with the second arc-shaped rail 2541. Axes of two second arc-shaped rails 2541 provided on the two side surfaces of the two rotating strips facing each other are collinear with each other. A stopping block 2544 protrudes from an end of the second arc-shaped rail 2541 away from the connecting portion 2543 along an axis of the second arc-shaped rail 2541. A side of one of the two rotating strips away from the other of the two rotating strips is arranged with another second arc-shaped rail 2541. Three second arc-shaped rails 2541 of the rotating member 254, which includes the two second arc-shaped rails 2541 provided on the two side surfaces of the two rotating strips facing each other and the another second arc-shaped rail 2541 provided on the side of one of the two rotating strips away from the other of the two rotating strips, are collinear with each other. The second rotating portion 2542 defines a shaft hole 2546 along a direction parallel to the axis of the second arc-shaped rail 2541. In some embodiments, the second rotating portion 2542 is a rotating cylinder, and an axis of the rotating cylinder is parallel to the axis of the second arc-shaped rail 2541. The middle of the second rotating portion 2542 defines a mating groove 2547.

In some embodiments, the second arc-shaped groove 2511 on the positioning seat 251 and the second arc-shaped rail 2541 on the rotating member 254 may be interchanged with each other. For example, the arc-shaped groove may be defined on the side surface of the first rotating portion 2540, and the arc-shaped rail facing the arc-shaped groove may be arranged on the positioning seat 251. The arc-shaped rail may be rotatably inserted in the arc-shaped groove. The axis of the arc-shaped groove, the axis of the arc-shaped rail, and the axis of rotation between the rotating member 254 and the positioning seat 251 may be collinear with each other.

The connecting member 256 is strip-shaped. In some embodiments, the connecting member 256 includes a rectangular connecting plate 2560. Each of two opposite ends of the connecting plate 2560 is arranged with the first arc-shaped rail 2562. One end of the front surface of the connecting plate 2560 defines two receiving openings 2561 spaced apart from each other. The connecting plate 2560 includes a mating block 2563 between the two receiving openings 2561. The mating block 2563 is configured to be received in the mating groove 2547 of the rotating member 254, so that the second rotating portion 2542 is rotatably connected to the mating block 2563. The mating block 2563 defines a shaft hole 2564 in a direction parallel to the axis of the first arc-shaped rail 2562. The shaft hole 2564 passes through an end of the connecting plate 2560 close to the mating block 2560. A pivot shaft 2565 is configured to be inserted in the shaft hole 2564. The other end of the connecting plate 2560 away from the mating block 2563 defines a sliding-guiding space 2566 along a direction substantially perpendicular to the axis of the first arc-shaped rail 2562. The sliding-guiding space 2566 passes through two opposite side surfaces of the connecting plate 2560. The connecting plate 2560 is arranged with a sliding-guiding bar 2567 on each of two opposite sides of the sliding-guiding space 2566. A side surface of the sliding-guiding bar 2567 facing the sliding-guiding space 2566 defines a sliding-guiding groove 2568 in a direction perpendicular to the axis of the first arc-shaped rail 2562. That is, the sliding-guiding groove 2568 extends in a direction perpendicular to an axis of rotation between the linkage member 264 and the linkage seat 261.

As shown in FIGS. 6-9 and 12-13, the linkage assembly 26 further includes a gear group 265 and two rotating shafts 266. The gear group 265 is arranged on the two rotating shafts 266. Each linkage member 264 is fixedly sleeved on a corresponding one of the two rotating shafts 266. Each rotating shaft 266 is rotatably inserted in a corresponding one of two opposite ends of the linkage seat 261. Each linkage member 264 and the corresponding rotating shaft 266 rotate together. The linkage member 264 rotates around an axis of the corresponding rotating shaft 266 to drive the corresponding rotating shaft to rotate. The two linkage members 264 sleeved on the two rotating shafts 266 are synchronously folded or synchronously unfolded through the gear group 265. The linkage seat 261 includes a rectangular connecting plate 2610 and an extending plate 2611 connected to the connecting plate 2610. The extending plate 2611 extends from the middle of a front surface of the connecting plate 2610 along a direction perpendicular to a lengthwise direction of the connecting plate 2610. Each of two opposite ends of the connecting plate 2610 defines a shaft hole 2613. The shaft hole 2613 passes through two opposite side surfaces of the connecting plate 2610 along the axis of the rotating shaft 266. The connecting plate 2610 defines two connecting holes 2615 spaced apart from each other between two shaft holes 2613 defined on the two opposite ends of the connecting plate 2610. An axis of the connecting hole 2615 is parallel to an axis of the shaft hole 2613. A side surface, of the connecting plate 2610, which is arranged with the extending plate, is arranged with an arc-shaped stopping bar 2616 around the shaft hole 2613.

The linkage member 264 includes a sleeve 2642 and a connecting rod 2643 connected to an outer peripheral wall of the sleeve 2642. The sleeve 2642 defines a connecting hole 2644 along an axial direction thereof. Each rotating shaft 266 is inserted in the connecting hole 2644 of the corresponding linkage member 264. In some embodiments, the connecting hole 2644 passes through two opposite ends of the sleeve 2642. A radial cross section of the connecting hole 2644 is waist-shaped. In some embodiments, the radial cross section of the connecting hole 2644 may be in shape of a rectangle, a polygon, and so on, which is not limited by embodiments of the present disclosure. A stopping block 2645 protrudes from an end surface of the sleeve 2642 facing the connecting plate 2610, and the stopping block 2645 is above the connecting hole 2644. The stopping block 2645 is configured to cooperate with the corresponding arc-shaped stopping bar 2616. The connecting rod 2643 is a rectangular plate. An end of the connecting rod 2643 away from the sleeve 2642 defines a sliding-guiding opening 2646 along a direction perpendicular to the axial direction of the sleeve 2642. The connecting rod 2643 of one linkage member 264 is arranged with the first sliding-guiding portion 2640 on an inner side wall of the sliding-guiding opening 2646, and another inner side wall of the sliding-guiding opening 2646 opposite to the inner side wall is arranged with the second sliding-guiding portion 2641. The connecting rod 2643 of the other linkage member 264 is arranged with the first sliding-guiding portion 2640 on each of two inner side walls of the sliding-guiding opening 2646 opposite to each other. In some embodiments, the first sliding-guiding portion 2640 is a connecting shaft inserted in the connecting rod 2643. The second sliding-guiding portion 2641 is a sliding-guiding block. An end of the linkage member 264 away from the linkage seat is slidably passing through the sliding-guiding groove 2568. In some embodiments, each of two opposite sides of the connecting rod 2643 is arranged with a sliding-guiding bar 2647. The sliding-guiding bar 2647 extends along a direction parallel to the lengthwise direction of sliding-guiding opening 2646. The sliding-guiding bar 2647 may be slidably inserted in the sliding-guiding groove 2568 of the connecting member 256.

Each linkage member 264 is connected to a pushing member 271. In some embodiments, the pushing member 271 is another sleeve connected to an end surface of the sleeve 2642 away from the linkage seat 261. The pushing member 271 includes a first cam 2710, and the first cam 2710 is provided on an end surface of the another sleeve away from the linkage seat 261. The first cam 2710 is sleeved on the corresponding rotating shaft 266. An axis of the first cam 2710 is collinear with an axis of the sleeve 2642. An axis of a first gear 2651 is collinear with an axis of the sleeve 2642. The first cam 2710 includes a concave-convex surface arranged on an end of the another sleeve. The concave-convex surface includes a first convex portion 2712 and a first concave portion 2714. The first convex portion 2712 and the first concave portion 2714 are successively and alternately arranged at intervals along the peripheral direction of the another sleeve. The number of first convex portions 2712 and the number of first concave portions 2714 may be set as required. For example, the first cam 2710 may include one first convex portion 2712 and one first concave portion 2714, two first convex portions 2712 and two first concave portions 2714, three first convex portions 2712 and three first concave portions 2714, or four first convex portions 2712 and four first concave portions 2714, etc. In some embodiments, the first cam 2710 includes three first convex portions 2712 and three first concave portions 2714 arranged at intervals along the peripheral direction of the another sleeve.

The gear group 265 includes two first gears 2651 and two second gears 2652. Each first gear 2651 is fixedly sleeved on the corresponding rotating shaft 266, and the two first gears 2651 are fixedly sleeved on the same end of the two rotating shafts 266. The two second gears 2652 are meshed with each other. Each second gear 2652 is meshed with a corresponding one of the two first gears 2651. The pivot shaft of each second gear 2652 extends out of two opposite end surfaces of the second gear 2652 respectively. In some embodiments, the two second gears 2652 are located between the two first gears 2651. The outer diameter and the number of teeth of each second gear 2652 are the same as those of the corresponding first gear 2651. The axis of each first gear 2651 is parallel to the axis of each second gear 2652. In some embodiments, axes of the two first gears 2651 and the two second gears 2652 are coplanar with each other. In some embodiments, the outer diameter of the second gear 2652 is smaller than that of the corresponding first gear 2651. The number of teeth of the second gear 2652 enclosed into a ring or a circle is less than that of the corresponding first gear 2651 enclosed into a ring or a circle. In this way, the overall width of the linkage assembly 26 may be reduced, the overall width of the rotating shaft apparatus 22 may be reduced, the internal space of the housing 20 occupied by the rotating shaft apparatus 22 may be reduced, thereby facilitating the layout of other components such as the main board, the battery, and so on.

Figure 12:
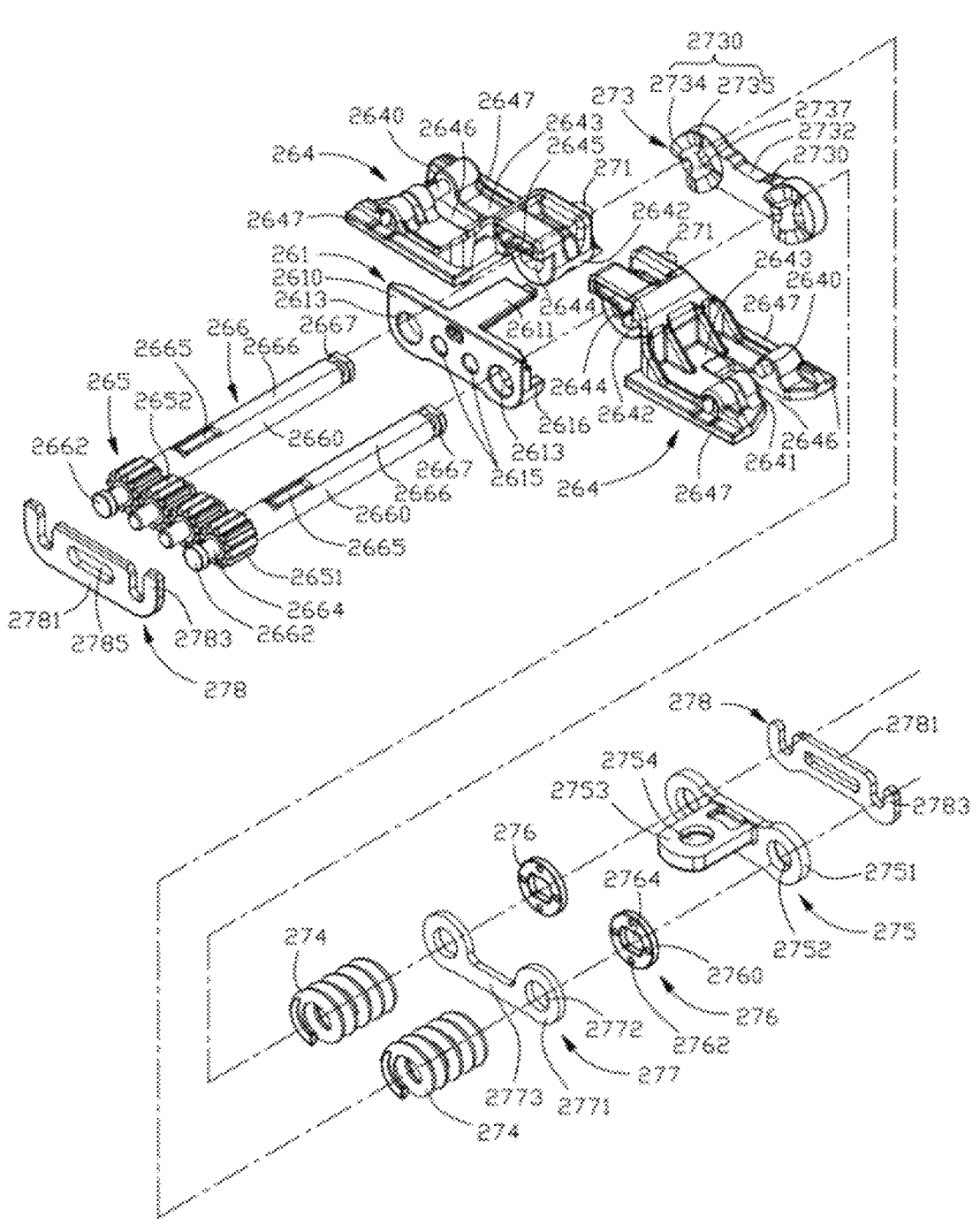
FIG. 12 is a schematic exploded perspective structural view of the folding-assisting assembly shown in FIG. 8.
Figure 13:
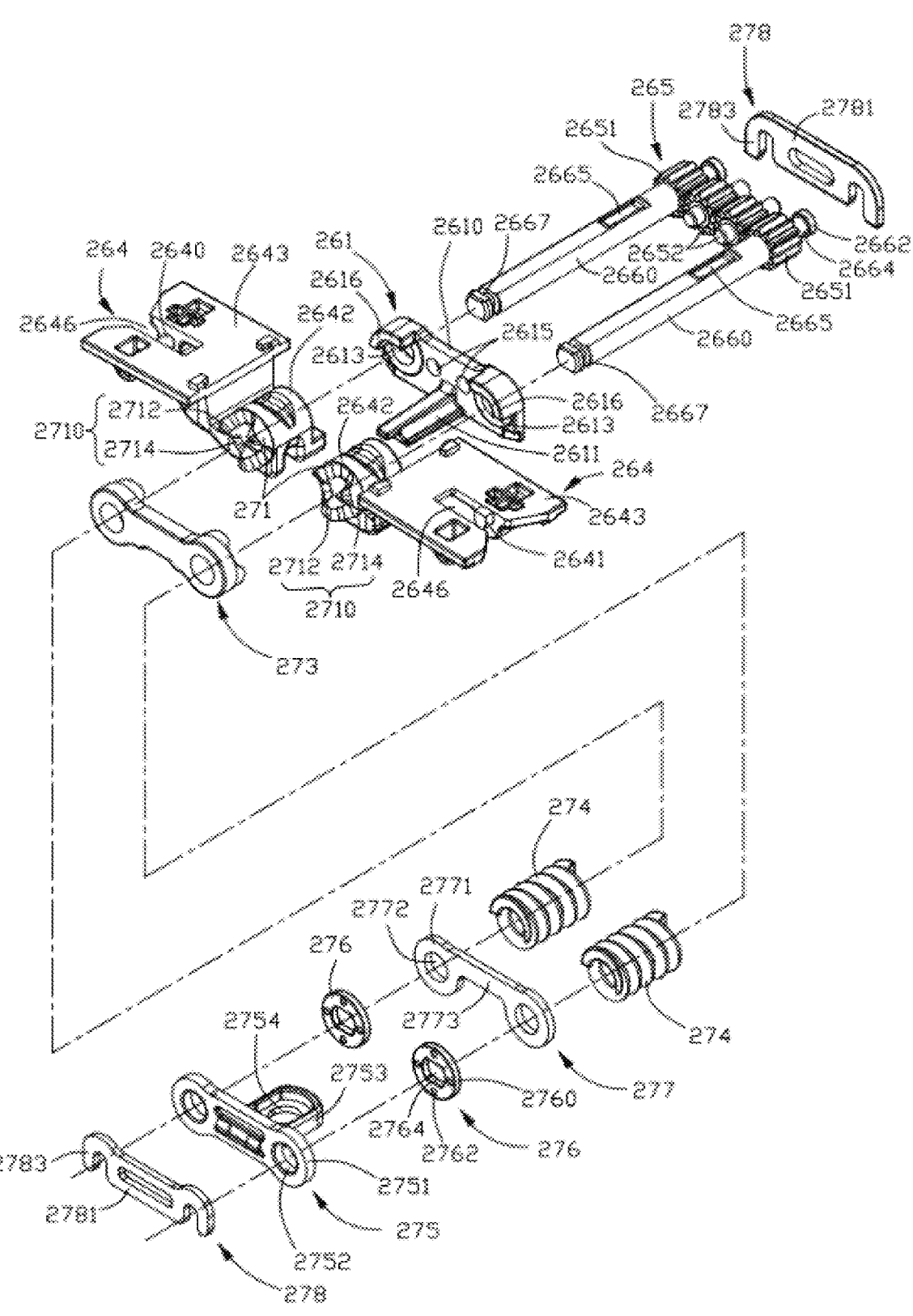
FIG. 13 is a schematic exploded perspective structural view of the folding-assisting assembly shown in FIG. 9.
Figure 14:
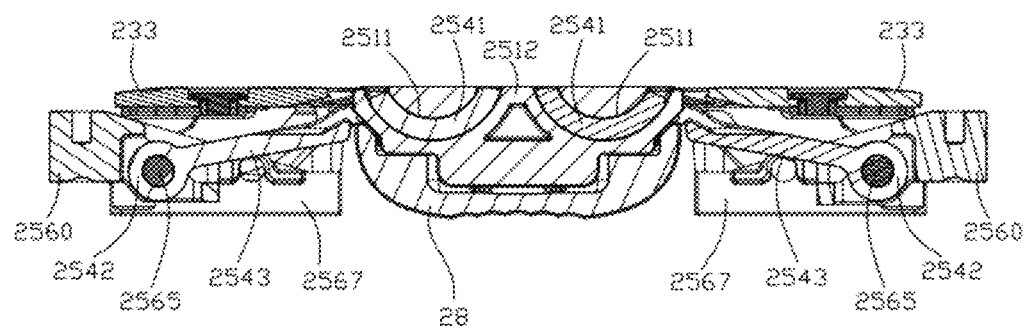
FIG. 14 is a perspective cross-section view of a portion of the rotating shaft apparatus shown in FIG. 4.
Figure 15:
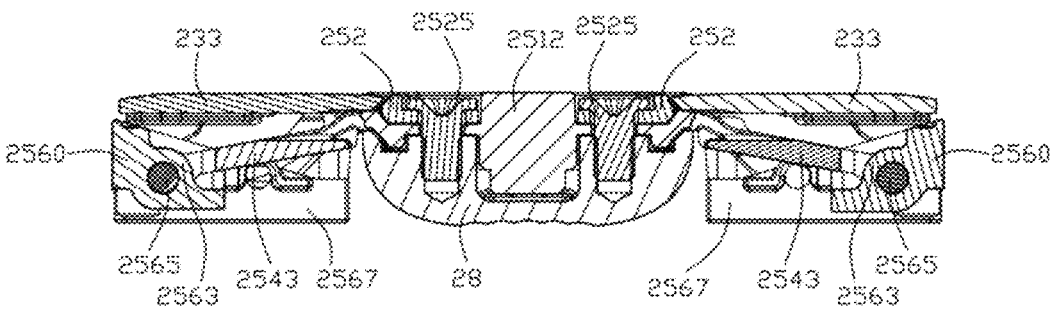
FIG. 15 is a perspective cross-section view of a portion of the rotating shaft apparatus shown in FIG. 4.
Figure 16:
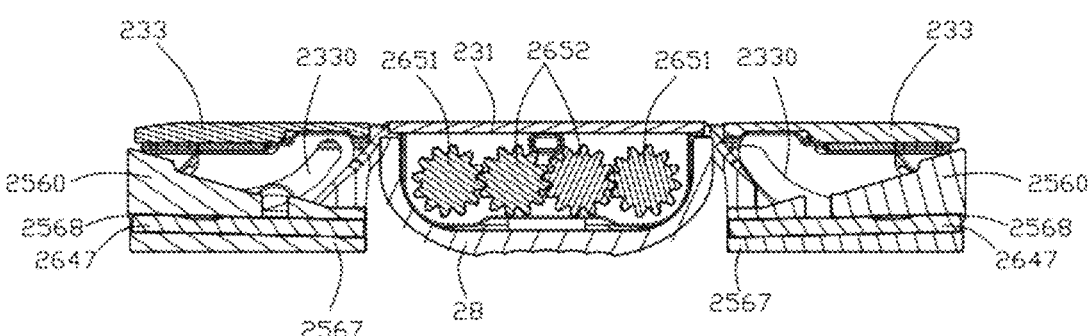
FIG. 16 is a perspective cross-section view of a portion of the rotating shaft apparatus shown in FIG. 4.
Figure 17:
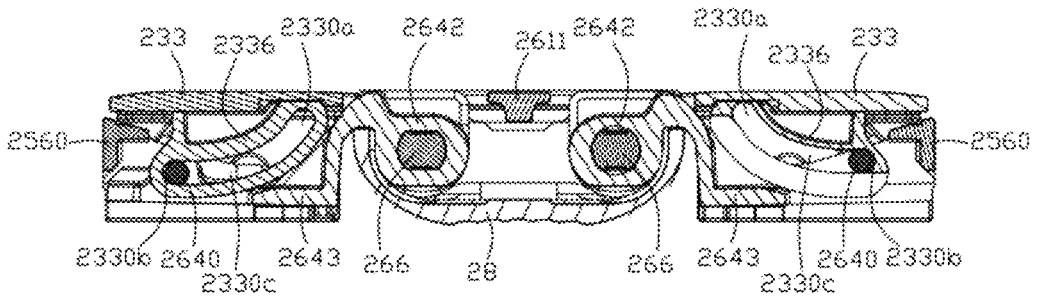
FIG. 17 is a perspective cross-section view of a portion of the rotating shaft apparatus shown in FIG. 4.

As shown in FIGS. 12 and 13, each rotating shaft 266 includes a shaft body 2660 and a positioning cover 2662 located on an end of the shaft body 2660. For each rotating shaft 266, the first gear 2651 is fixedly sleeved on an end of the shaft body 2660 that is arranged with the positioning cover 2662. A connecting rod 2664 is arranged between the positioning cover 2662 and the first gear 2651. A positioning portion 2665 is provided on the outer peripheral surface of the shaft body 2660 close to the first gear 2651. A positioning surface 2666 is provided on the outer peripheral surface of the other end of the shaft body 2660 away from the first gear 2651. The positioning portion 2665 is configured to position the sleeve 2642 of the linkage member 264, i.e., keep the position of the sleeve 2642 unchanged. In some embodiments, a radial cross section of the end of the shaft body 2660 away from the first gear 2651 is waist-shaped, and the positioning surface 2666 is a flat surface on the end of the shaft body 2660 away from the first gear 2651. In some embodiments, the radial cross section of the end of the shaft body 2660 away from the first gear 2651 may be in shape of a rectangle, a polygon, and so on, which is not limited by some embodiments of the present disclosure. The end of the shaft body 2660 away from the positioning cover 2662 defines an engaging groove 2667. The engaging groove 2667 is defined on the outer peripheral wall of the shaft body 2660 and enclosed into a ring or a circle along the peripheral direction of the shaft body 2660.

The limiting mechanism 27 also includes an abutting member 273 and an elastic member 274 sleeved on each rotating shaft 266. The elastic member 274 provides an elastic force to enable the abutting member 273 and the pushing member 271 to abut against each other. The rotating assembly 25 rotates with respect to the positioning seat 251 through the linkage mechanism 263. The pushing member 271 is rotatable with respect to the abutting member 273. The elastic member 274 is elastically deformed by being squeezed or pressed by the abutting member 273. The friction resistance between the pushing member 271 and the abutting member 273 enables the linkage member 264 to be maintained at a position or positioned with respect to the linkage seat 261. In this way, the side support member 233 is positioned or maintained at a position with respect to the middle support member 231, one of the two side support members 233 is maintained at an angle from the other of the two side support members 233, and the angle between the two side support members 233 is between 70 degrees and 130 degrees. In some embodiments, when the two side support members 233 of the rotating shaft apparatus 22 are synchronously unfolded with respect to each other or synchronously folded with respect to each other through the rotating assembly 25 and the linkage assembly 26 and the angle between the two side support members 233 is greater than or equal to 70 degrees and less than or equal to 130 degrees, the side support members 233 are maintained at positions under the friction resistance between the pushing member 271 and the abutting member 273. That is, the two side support members 233 do not rotate with respect to each other in the absence of an external force. It should be noted that, the term "sleeve/sleeved" in some embodiments of the present disclosure means that one component is inserted into another component. For example, the another component defines a through hole, a shaft hole, a groove, etc., and a part of or all of the one component is inserted in the through hole, the shaft hole, or the groove. For example, the linkage member 264 being sleeved on the rotating shaft 266 means that the linkage member 264 defines a shaft hole, and the rotating shaft 266 is inserted in the shaft hole. For another example, the abutting member 273 being sleeved on the rotating shaft 266 means that the abutting member 273 defines a shaft hole and the rotating shaft 261 is inserted in the shaft hole.

In some embodiments, the abutting member 273 includes a second cam 2730. The elastic member 274 elastically pushes and abuts against the abutting member 273, so that the second cam 2730 and the first cam 2710 may rotatably abut against each other. When the first cam 2710 rotates with respect to the second cam 2730, the first cam 2710 rotatably pushes the second cam 2730 to slide away from or close to the linkage seat 261, the elastic member 274 is squeezed or pressed, and the pushing member 271 may be maintained at an angle from the abutting member 273 under the friction resistance between the first cam 2710 and the second cam 2730. In some embodiments, the abutting member 273 includes a connecting portion 2732 and two second cams 2730 arranged on two opposite ends of the connecting portion 2732. That is, each second cam 2730 is located on a corresponding one of the two opposite ends of the connecting portion 2732. Each second cam 2730 is slidably sleeved on a corresponding one of the two rotating shafts 266. The second cam 2730 includes a circular sleeve and a concave-convex surface arranged on an end of the sleeve. The concave-convex surface includes a second convex portion 2734 and a second concave portion 2735. The second convex portion 2734 and the second concave portion 2735 are successively and alternately arranged at intervals in sequence along the peripheral direction of the sleeve. The number of second convex portions 2734 on the second cam 2730 is equal to the number of the first concave portions 2714 on the first cam 2710. The number of second concave portions 2735 is equal to the number of the first convex portions 2712 on the first cam 2710. In this way, the first convex portion 2712 may cooperate with the second concave portion 2735, and the second convex portion 2734 may cooperate with the first concave portion 2714. The connecting portion 2732 defines two sliding-guiding holes 2737 spaced apart from each other. Each sliding-guiding hole 2737 extends along an axial direction of the sleeve of the corresponding second cam 2730. In some embodiments, the elastic member 274 is a spring sleeved on the rotating shaft 266.

The limiting mechanism 27 further includes a positioning member 275 sleeved on the end of each rotating shaft 266 away from the abutting member 273 and a friction member 276 fixedly sleeved on each rotating shaft 266. The friction member 276 is located between the positioning member 275 and the elastic member 274. An end of the elastic member 274 away from the abutting member 273 elastically abuts against the friction member 276, the friction member 276 abuts against the positioning member 275, and the rotation of the rotating shaft 266 drives the friction member 276 to rotate with respect to the positioning member 275. Under the friction resistance between the friction member 276 and the positioning member 275, one of the two side support members 233 may be maintained at an angle from the other of the two side support members 233, and the angle is between 70 degrees and 130 degrees. The positioning member 275 includes a positioning plate 2751 and a connecting plate 2753 connected to the middle of a side of the positioning plate 2751. Each of two opposite ends of the positioning plate 2751 defines a through hole 2752. Two opposite end surfaces of the positioning plate 2751 are arc-shaped surfaces. The connecting plate 2753 extends from the middle of the side of the positioning plate 2751 along a direction perpendicular to the positioning plate 275. An end of the connecting plate 2753 defines a connecting hole 2754. In some embodiments, an end surface of the connecting plate 2753 away from the positioning plate 2751 is an arc-shaped surface. The friction member 276 includes a friction sheet 2760. Each of two opposite side surfaces of the friction sheet 2760 is arranged with a friction structure 2762. The friction structure 2762 may include a friction hole, a friction protrusion, or a friction pattern, which is not limited by embodiments of the present disclosure. In some embodiments, the friction sheet 2760 is a circular sheet. The middle of the circular sheet defines a positioning hole 2764 along an axial direction of the circular sheet. The positioning hole 2764 is a waist-shaped hole. In some embodiments, the friction sheet 2760 may be in the shape of a rectangle, a polygon, an ellipse, etc., which is not limited by embodiments of the present disclosure. The positioning hole 2764 may be in the shape of a rectangle, a polygon, etc., which is not limited by embodiments of the present disclosure.

In some embodiments, the limiting mechanism 27 further includes a spacer 277 sleeved on each rotating shaft 266. The spacer 277 is located between the elastic member 274 and the friction member 276. The spacer 277 includes a connecting portion 2771 and an abutting portion 2773 arranged on each of two opposite ends of the connecting portion 2771. The abutting portion 2773 defines a through hole 2772 along the axial direction of the rotating shaft 266. In some embodiments, the connecting portion 2771 is a rectangular sheet, the abutting portion 2773 is a circular sheet, and the through hole 2772 defined in the middle of the circular sheet.

The limiting mechanism 27 further includes two engaging members 278. Each engaging member 278 is arranged on a corresponding one of two opposite ends of the rotating shaft 266. The engaging member 278 includes an engaging sheet 2781 and a snapping member 2783 arranged on each of two opposite ends of the engaging sheet 2781. Two end surfaces of the engaging sheet 2781 are arc-shaped surfaces. The snapping member 2783 is a C-shaped snapping ring. A positioning groove 2785 is defined on the middle of the engaging sheet 2781.

Figure 6:
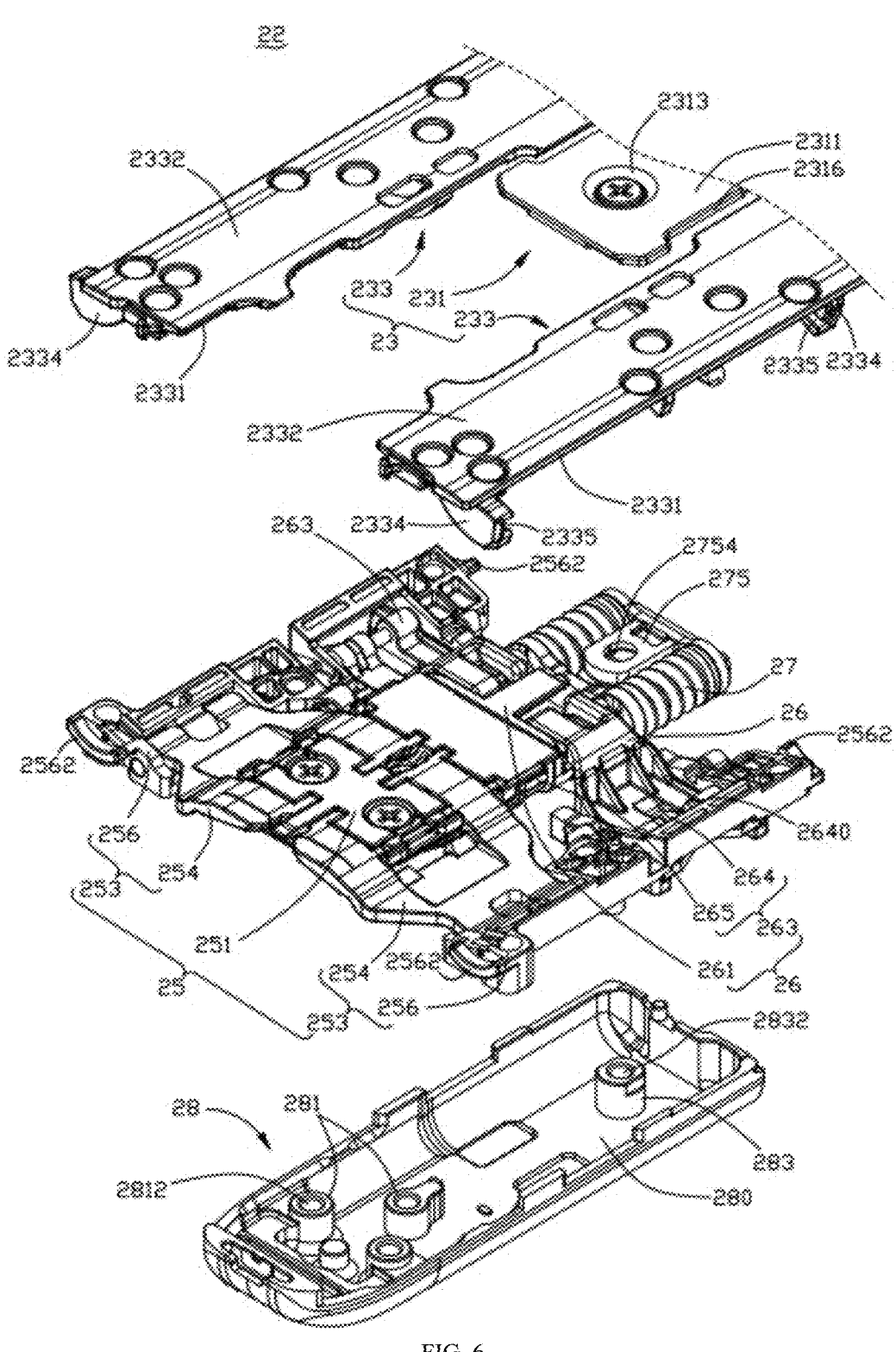
FIG. 6 is a schematic exploded perspective structural view illustrating a support assembly, a rotating assembly, a folding-assisting assembly, and a back cover of the rotating shaft apparatus shown in FIG. 4.

As shown in FIGS. 6 and 7, the back cover 28 is a strip-shaped frame. The back cover 28 defines a receiving groove 280. The positioning seat 251, the linkage seat 261, and the positioning member 275 are received in the receiving groove 280 and are fixedly connected to the back cover 28. In some embodiments, the back cover 28 is arranged with several first support columns 281 and a second support column 283 on the bottom surface of the receiving groove 280. The first support columns 281 are configured to be connected to the positioning seat 251 and the linkage seat 261. The second support column 283 is configured to be connected to the positioning member 275. In some embodiments, the back cover 28 includes three first support columns 281 on an end of the bottom surface of the receiving groove 280. Each first support column 281 defines a first connecting hole 2812 along the axial direction thereof. The other end of the bottom surface of the receiving groove 280 defines one second support column 283. The second support column 283 defines a second connecting hole 2832 along the axial direction thereof. In some embodiments, the positioning seat 251, the linkage seat 261, and the positioning member 275 may be connected to the back cover 28 by means of, but is not limited to, snapping, bonding, and so on.

As shown in FIGS. 3 to 18, during the assembly of the rotating shaft apparatus, the gear group 265 is assembled on the ends of the two rotating shafts 266 that are arranged with the positioning covers 2662. In some embodiments, each first gear 2651 is fixedly sleeved on the end of the corresponding rotating shaft 266 arranged with the positioning cover 2662, then the two second gears 2652 meshed with each other are arranged between the two first gears 2651. Each second gear 2652 is meshed with the corresponding first gear 2651. The snapping member 2783 of one engaging member 278, which is on each of the two opposite ends of the engaging sheet 2781, is engaged to the connecting rod 2664 of the corresponding rotating shaft 266. Pivot shafts of the two second gears 2652 are respectively inserted in the positioning groove 2785 of the one engaging member 278. The end of each rotating shaft 266 away from the gear group 265 is inserted in the corresponding shaft hole 2613 of the linkage seat 261, until the pivot shaft of each second gear 2652 is inserted in the corresponding connecting hole 2615 of the linkage seat 261. The sleeve 2642 of each linkage member 264 is sleeved on the corresponding shaft body 2660, until the sleeve 2642 is positioned on the corresponding positioning portion 2665. At this time, the stopping block 2645 of each linkage member 264 cooperates with the corresponding arc-shaped stopping bar 2616 of the linkage seat 261. The abutting member 273 is sleeved on the two rotating shafts 266, until each second cam 2730 abuts against the first cam 2710 on the corresponding linkage member 264. At this time, the first convex portion 2712 is received in the second concave portion 2735, and the second convex portion 2734 is received in the first concave portion 2714. Two elastic members 274 are respectively sleeved on the ends of the two rotating shafts 266 away from the gear group 265, that is, each elastic member 274 is sleeved on the end of the corresponding rotating shaft 266 away from the gear group 265. The spacer 277 is sleeved on the ends of the two rotating shafts 266 away from the gear group 265. That is, the end of each rotating shaft 266 away from the positioning cover 2662 is inserted in the corresponding through hole 2772 of the spacer 277. Two friction members 276 are respectively sleeved on the ends of the two rotating shafts 266 away from the gear group 265, that is, each friction member 276 is sleeved on the end of the corresponding rotating shaft 266 away from the gear group 265. The positioning member 275 is sleeved on the ends of the two rotating shafts 266 away from the gear group 265. That is, the end of each rotating shaft 266 away from the positioning cover 2662 is inserted in the corresponding through hole 2752 of the positioning member 275. The snapping member 2783, of the other engaging member 278, which is on each of the two opposite ends of the engaging sheet 2781, is engaged to the engaging groove 2667 of the corresponding rotating shaft 266. At this time, the abutting member 273, the elastic member 274, the spacer 277, the friction member 276, and the positioning member 275 are respectively sleeved on each rotating shaft 266, that is, the abutting member 273, the elastic member 274, the spacer 277, the friction member 276, and the positioning member 275 may move along the axis of the rotating shaft 266. The elastic member 274 is located between the spacer 277 and the abutting member 273. The friction member 276 is positioned on the positioning surface 2666 of the corresponding rotating shaft 266 and is located between the spacer 277 and the positioning member 275. That is, each friction member 276 rotates along with the corresponding rotating shaft 266, while the abutting member 273, the positioning member 275, and the spacer 277 cannot rotate along with the rotating shaft 266. The end of the elastic member 274 away from the abutting member 273 elastically abuts against the spacer 277. The elastic member 274 is in the squeezed state, that is, the elastic member 274 has a pre-elastic force. If the elastic member 2731 has a pre-elastic force F0, the first cam 2710 on each linkage member 264 may rotatably abut against the corresponding second cam 2730. The axial force F between the first cam 2710 and the second cam 2720 on each rotating shaft 266 is equal to the pre-elastic force F0 of the corresponding elastic member 274, that is, F=F0. The axial force F between the friction member 276 and the spacer 277 on each rotating shaft 266 or the axial force F between the friction member 276 and positioning member 275 on each rotating shaft 266 is equal to the pre-elastic force F0 of the corresponding elastic member 274, that is, F=F0.

The first rotating portion 2540 of each rotating member 254 is rotatably connected to the positioning seat 251. In some embodiments, the two rotating members 254 are arranged between the first seat body 251a and the second seat body 251b, and the rotating strip with two second arc-shaped rails 2541 is arranged in the receiving space of the second seat body 251b. The first seat body 251a and the second seat body 251b are moved towards or approach each other, and each second arc-shaped rail 2541 of the rotating member 254 is received in the corresponding second arc-shaped groove 2511. Each stopping member 252 is arranged in the corresponding connecting hole 2514 of the first seat body 251a. Each locking member 2525 passes through the corresponding stopping member 252 and is connected to the corresponding connecting hole 2515. In this way, the stopping member 252 is fixed on the first seat body 251a, so as to prevent the second arc-shaped rail 2541 of the rotating member 254 from being disengaged from the second arc-shaped groove 2511. After the linkage assembly 26 and the limiting mechanism 27 are assembled with each other, the assembled structure formed by the linkage assembly 26 and the limiting mechanism 27 *i* arranged on the end of the second seat body 251b away from the first seat body 251a. The connecting rod 2664 of each rotating shaft 266 is engaged with the corresponding connecting groove 2518, and the end of the pivot shaft of each second gear 2652 is inserted in the corresponding connecting hole 2519. In this way, the linkage seat 261 is detachably connected to the positioning seat 251. Each connecting member 256 is arranged on a corresponding one of two opposite sides of the assembled structure formed by the linkage assembly 26 and the limiting mechanism 27. The connecting rod 2643 of each linkage member 264 is inserted in the sliding-guiding space 2566 of the corresponding connecting member 256. In some embodiments, the sliding-guiding bar 2647 on each of the two opposite sides of the connecting rod 2643 is slidably inserted in the corresponding sliding-guiding groove 2568. The second rotating portion 2542 of each rotating member 254 is received in the receiving opening 2561 of the corresponding connecting member 256, so that the mating block 2563 of each connecting member 256 is inserted in the mating groove 2547 of the corresponding second rotating portion 2542. Each pivot shaft 2565 is inserted in the corresponding shaft holes 2564 and 2546, so that the end of each rotating member 254 away from the positioning seat 251 is rotatably connected to the corresponding connecting member 256. Then each side support member 233 is arranged on a corresponding one of two opposite sides of the positioning seat 251. The two first arc-shaped rails 2562 on the two opposite ends of each connecting member 256 are respectively inserted in the two first arc-shaped grooves 2335 on the corresponding side support member 233 in one-to-one$_{correspondence}$. At the same time, the limiting portion 2336 of each side support member 233 is inserted in the sliding-guiding opening 2646 of the corresponding linkage member 264. Each first sliding-guiding portion 2640 is slidably received in the sliding-limiting groove 2330 of the corresponding limiting portion 2336. Each first sliding-guiding portion 2640 is connected to the corresponding linkage member 264. The second sliding-guiding portion 2641 on one linkage member 264 is received in the sliding-guiding groove 2337. The rotating assembly 25, the linkage assembly 26, and the limiting mechanism 27 are received in the receiving groove 280 of the back cover 28. Each locking member 2525 passes through the positioning seat 251 and is connected to the first connecting hole 2812 defined on the corresponding first support column 281. The middle support member 231 is arranged on the limiting mechanism 27. A locking member passes through the countersunk hole 2313 defined on the middle support member 231 and the connecting hole 2754 defined on the positioning member 275, and is connected to the second connecting hole 2832 on the second support column 283.

At this time, the axis of rotation between the rotating member 254 and the positioning seat 251 is parallel to the axis of rotation between the side support member 233 and the connecting member 256. The axis of rotation between the rotating member 254 and the positioning seat 251 is parallel to the axis of rotation between the linkage member 264 and the linkage seat 261. The axis of rotation between the rotating member 254 and the positioning seat 251 is parallel to the axis of the rotating shaft 266. When the side support members 233 and the middle support member 231 are in the flattened state, the side support members 233 and the middle support member 231 are arranged side by side. Each first arc-shaped rail 2562 is rotatably received in the corresponding first arc-shaped groove 2335. Each second arc-shaped rail 2541 is rotatably received in the corresponding second arc-shaped groove 2511. The first sliding-guiding portion 2640 is located at the second limiting section 2330b of the sliding-limiting groove 2330. The second sliding-guiding portion 2641 is stopped by the second stopping portion 2337b of the sliding-guiding groove 2337.

When the connecting member 256 drives the rotating member 254 to rotate with respect to the positioning seat 251, the linkage member 264 rotates with respect to the linkage seat 261, the rotating mechanism 253 drives the side support member 233 to rotate and slide with respect to the positioning seat 251. In this way, the side support members 233 may be folded synchronously with respect to each other or unfolded synchronously with respect to each other. In some embodiments, the rotating member 254 rotates with respect to the positioning seat 251 through the second arc-shaped rail 2541 and the second arc-shaped groove 2511. The linkage member 264 rotates along with the rotating mechanism 253 and drives the corresponding rotating shaft 266 to rotate together. The first gear 2651 on the corresponding rotating shaft 266 rotates, so as to drive the corresponding second gear 2652 to rotate, in this way, the two linkage members 264 of the linkage assembly 26 may rotate synchronously with respect to each other. The sliding-guiding bar 2647 of each linkage member 264 slides in the corresponding sliding-guiding groove 2568. Each first sliding-guiding portion 2640 slides and rotates in the corresponding sliding-limiting groove 2330. The second sliding-guiding portion 2641 slides in the sliding-guiding groove 2337. Each first arc-shaped rail 2562 of the connecting member 256 is rotatably connected in the corresponding first arc-shaped groove 2335. Each second arc-shaped rail 2541 of the rotating member 254 is rotatably connected in the corresponding second arc-shaped groove 2511. In this way, each of the two side support members 233 and the middle support member 231 may be folded with respect to each other or unfolded with respect to each other.

As shown in FIGS. 14 to 28, when the rotating shaft apparatus 22 is folded from the flattened state, one connecting member 256 is folded with respect to the positioning seat 251 and moves towards the other connecting member 256. The one connecting member 256 drives the second arc-shaped rail 2541 of the rotating member 254 to rotate in the second arc-shaped groove 2511 of the positioning seat 251. The one connecting member 256 drives the linkage member 264 and the corresponding rotating shaft 266 to rotate together with respect to the linkage seat 261. The sliding-guiding bar 2647 of the linkage member 264 slides in the sliding-guiding groove 2568. The first sliding-guiding portion 2640 slides from the second limiting section 2330b of the sliding-limiting groove 2330 to the first limiting section 2330a of the sliding-limiting groove 2330. The second sliding-guiding portion 2641 of the linkage member 264 slides from the second stopping portion 2337b to the first stopping portion 2337a in the sliding-guiding groove 2337. In this way, the corresponding linkage member 264 and the corresponding rotating shaft 266 rotate around the axis of the rotating shaft 266 with respect to the linkage seat 261. The rotation of the linkage member 264 drives the first gear 2651 on the corresponding rotating shaft 266 to rotate. The gear group 265 drives two first gears 2651 to rotate synchronously. The first gears 2651, which rotate synchronously, drive the two linkage members 264 to approach each other synchronously. The connecting member 256 drives the first arc-shaped rail 2562 to be rotatably connected in the corresponding first arc-shaped groove 2335. The rotating member 254 drives the second arc-shaped rail 2541 to be rotatably connected in the corresponding second arc-shaped groove 2551. The linkage members 264 on the two opposite sides of the linkage seat 261 rotate synchronously with respect to the linkage seat 261 and approach each other, so as to drive the two side support members 233 to synchronously approach or move towards each other, until the two side support members 233 and the middle support member 231 cooperatively form a structure having a waterdrop-shaped cross section.

Figure 22:
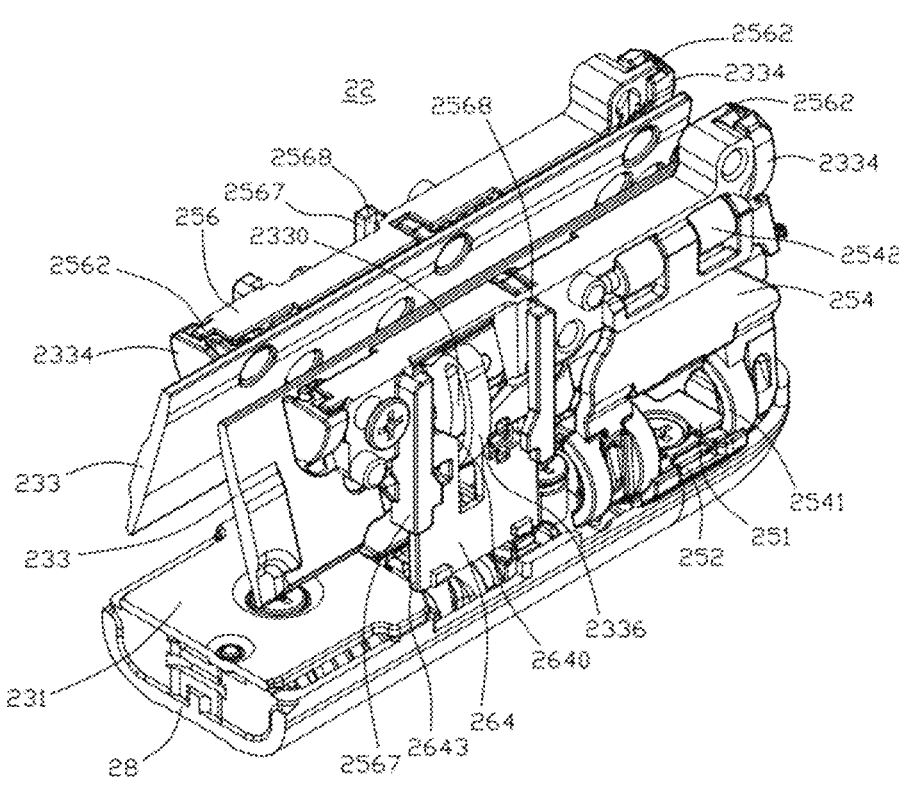
FIG. 22 is another enlarged perspective structural view of the rotating shaft apparatus shown in FIG. 21, when viewed from another viewing angle.
Figure 23:
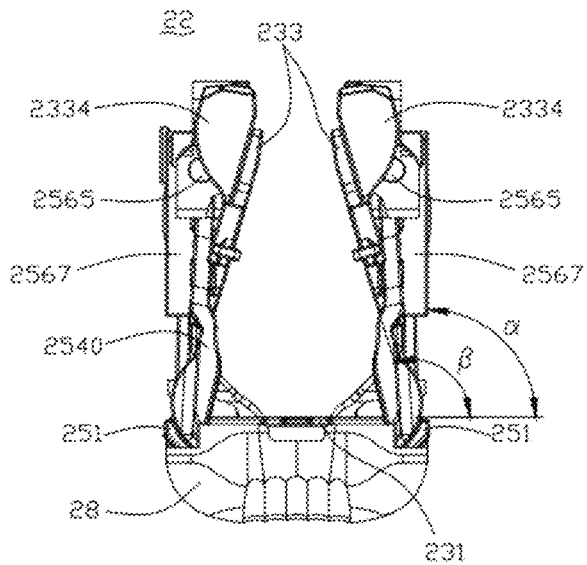
FIG. 23 is a schematic structural view of an end of the rotating shaft apparatus shown in FIG. 21.
Figure 24:
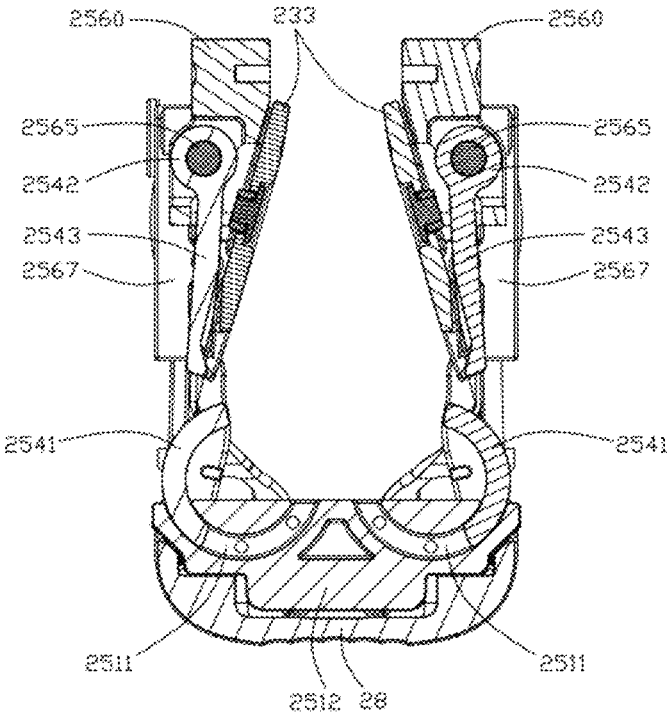
FIG. 24 is a perspective cross-section view of a portion of the rotating shaft apparatus shown in FIG. 21.
Figure 25:
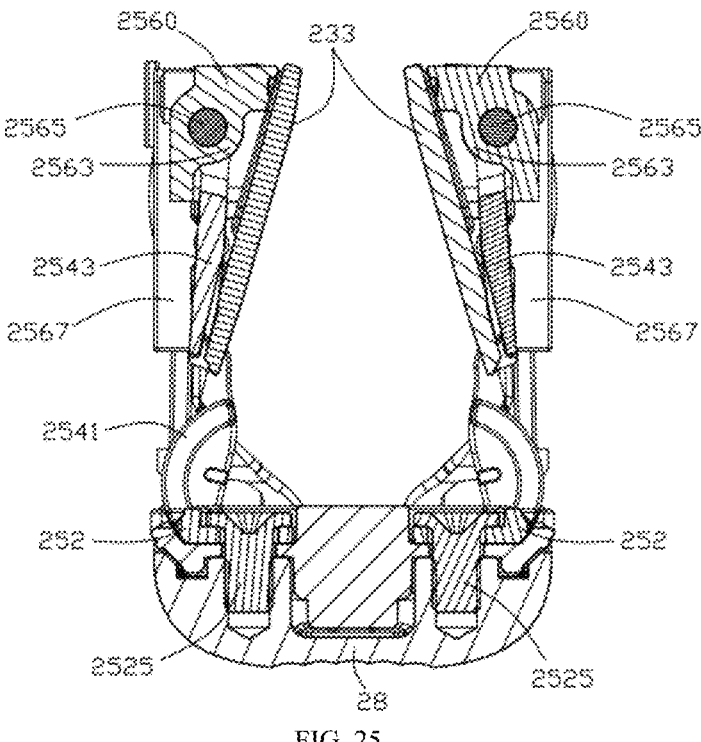
FIG. 25 is a perspective cross-section view of a portion of the rotating shaft apparatus shown in FIG. 21.
Figure 26:
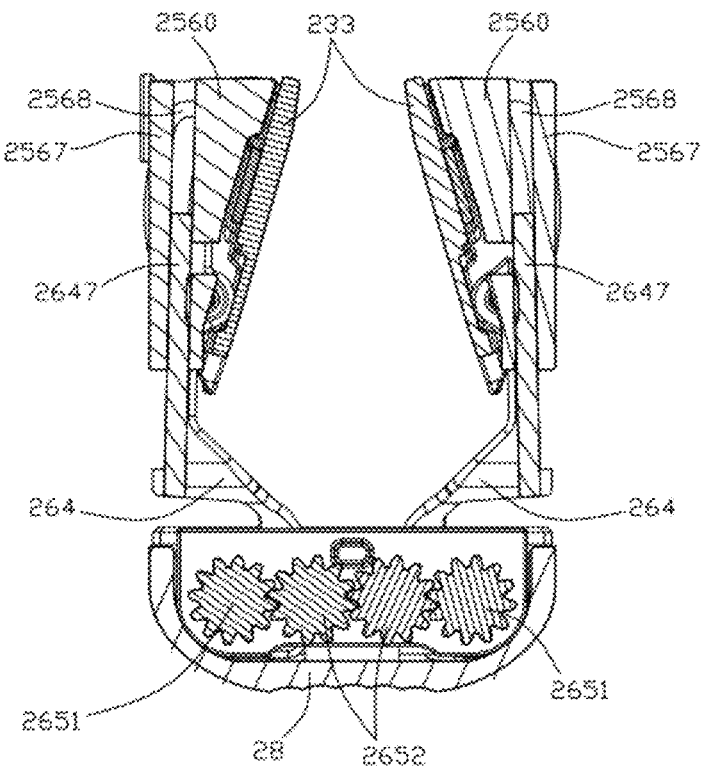
FIG. 26 is a perspective cross-section view of a portion of the rotating shaft apparatus shown in FIG. 21.
Figure 27:
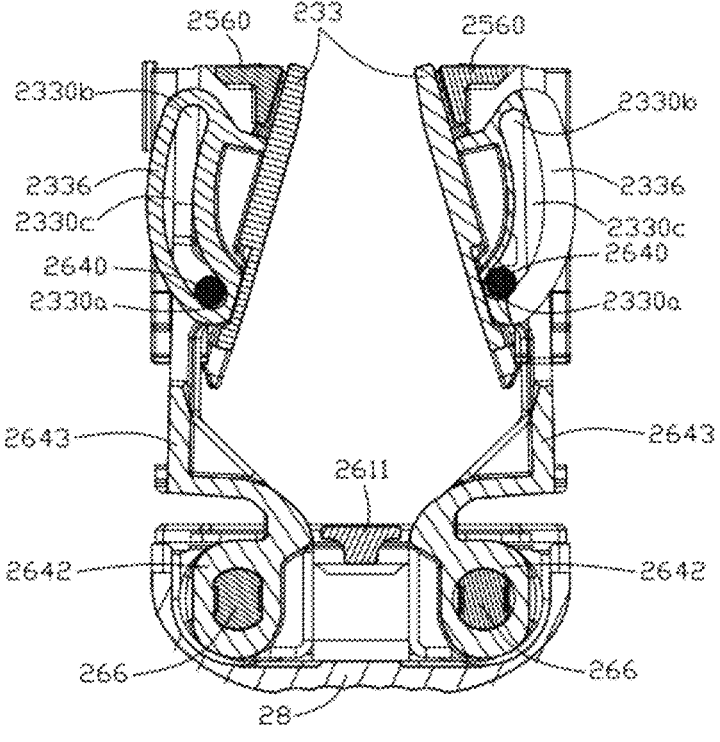
FIG. 27 is a perspective cross-section view of a portion of the rotating shaft apparatus shown in FIG. 21.
Figure 28:
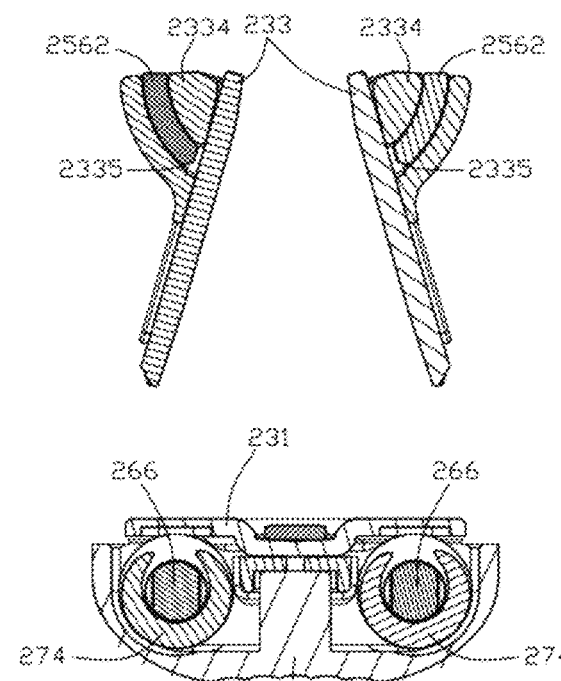
FIG. 28 is a perspective cross-section view of a portion of the rotating shaft apparatus shown in FIG. 21.
Figure 29:
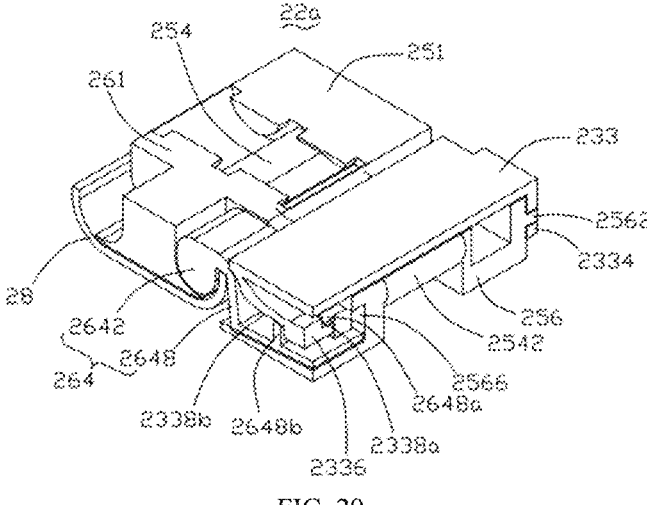
FIG. 29 is a schematic perspective structural view of a part of a rotating shaft apparatus according to some embodiments of the present disclosure.

In the aforesaid process, during the folding of the side support member 233 with respect to the middle support member 231, the first sliding-guiding portion 2640 slides from the end of the sliding-limiting groove 2330 away from the middle support member 231 (i.e., the second limiting section 2330b of the sliding-limiting groove 2330) to the end of the sliding-limiting groove 2330 close to the middle support member 231 (i.e., the first limiting section 2330a of the sliding-limiting groove 2330). The second sliding-guiding portion 2641 slides from the end of the sliding-guiding groove 2337 away from the middle support member 231 (i.e., the second stopping portion 2337b of the sliding-guiding groove 2337) to the end of the sliding-guiding groove 2337 close to the middle support member 231 (i.e., the first stopping portion 2337a of the sliding-guiding groove 2337. On each rotating shaft 266, the axial force between the first cam 2710 and the second cam 2730 is equal to the elastic force of the elastic member 274. On each rotating shaft 266, each of the axial force between the friction member 276 and the spacer 277 and the axial force between the friction member 276 and the positioning member 275 is equal to the elastic force of the elastic member 274. Under the friction resistance between the first cam 2710 and the second cam 2730, the friction resistance between the friction member 276 and the spacer 277, and the friction resistance between the friction member 276 and the positioning member 275, one of the two side support members 233 may be maintained at an angle from the other of the two side support members 233, and the angle is between 70 degrees and 130 degrees. As shown in FIG. 22, the rotating angle of each of the connecting member 256 and the rotating member 254 with respect to the positioning seat 251 is α. The rotating angle of the side support member 233 with respect to the positioning seat 251 is β. α is less than or equal to 90 degrees, and β is greater than 90 degrees. In some embodiments, α is equal to 90 degrees, and β is equal to 110 degrees.

In other implementations, the two connecting members 256 rotate synchronously in directions approaching each other. Each connecting member 256 rotates with respect to the other connecting member 256 through the second arc-shaped groove 2511 of the positioning seat 251 and the second arc-shaped rail 2541 of the corresponding rotating member 254, so as to drive the corresponding linkage member 264 and the corresponding rotating shaft 266 to rotate together with respect to the linkage seat 261. The two connecting members 256 synchronously drive the first arc-shaped rails 2562 thereof to be rotatably connected in the corresponding first arc-shaped grooves 2335 of the side support members 233, and the sliding-guiding bar 2647 of the corresponding linkage member 264 slides in the sliding-guiding groove 2568. The rotation of the linkage member 264 drives the corresponding first gear 2651 to rotate. The gear group 265 drives two first gears 2651 to rotate synchronously. The first gears 2651, which rotate synchronously, drive the two linkage members 264 to approach each other synchronously. The first sliding-guiding portion 2640 of the linkage member 264 slides from the second limiting section 2330b of the sliding-limiting groove 2330 to the first limiting section 2330a of the sliding-limiting groove 2330. The second sliding-guiding portion 2641 of the linkage member slides from the second stopping portion 2337b to the first stopping portion 2337a in the sliding-guiding groove 2337. The linkage members 264 on the two opposite sides of the linkage seat 261 rotate synchronously with respect to the linkage seat 261 and approach each other, so as to drive the two side support members 233 to synchronously approach each other, until the two side support members 233 and the middle support member 231 cooperatively form a structure having waterdrop-shaped cross section.

When the rotating shaft apparatus 22 is unfolded from the fully folded state, one connecting member 256 is unfolded with respect to the positioning seat 251 and moves away from the other connecting member 256. The one connecting member 256 drives the second arc-shaped rail 2541 of the rotating member 254 to rotate in the second arc-shaped groove 2511 of the positioning seat 251. The one connecting member 256 drives the linkage member 264 and the corresponding rotating shaft 266 to rotate with respect to the linkage seat 261 together. The sliding-guiding bar 2647 of the linkage member 264 slides in the sliding-guiding groove 2568. The first sliding-guiding portion 2640 of the linkage member 264 slides from the first limiting section 2330a of the sliding-limiting groove 2330 to the second limiting section 2330b of the sliding-limiting groove 2330. The second sliding-guiding portion 2641 of the linkage member 264 slides from the first stopping portion 2337a to the second stopping portion 2337b in the sliding-guiding groove 2337. Besides, the connecting member 256 drives each first arc-shaped rail 2562 to be rotatably connected in the corresponding first arc-shaped groove 2335. The rotation of the linkage member 264 drives the corresponding first gear 2651 to rotate through the rotating shaft 266. The gear group 265 drives the two first gears 2651 to rotate synchronously. The first gears 2651, which rotate synchronously, drive the two linkage members 264 to move away from each other synchronously. Besides, the two rotating mechanisms 253 rotate synchronously with respect to the positioning seat 251 to move away from each other, so as to drive the two side support members 233 to be synchronously unfolded with respect to each other, until the two side support members 233 and the middle support member 231 are in the flattened state.

In the aforesaid process, during the flattening of the side support members 233 with respect to the middle support member 231, the first sliding-guiding portion 2640 slides from the end of the sliding-limiting groove 2330 close to the middle support member 231 (i.e., the first limiting section 2330a of the sliding-limiting groove 2330) to the end of the sliding-limiting groove 2330 away from the middle support member 231 (i.e., the second limiting section 2330b of the sliding-limiting groove 2330). The second sliding-guiding portion 2641 slides from the end of the sliding-limiting groove 2337 close to the middle support member 231 (i.e., the first stopping portion 2337a of the sliding-guiding groove 2337) to the end of the sliding-limiting groove 2337 away from the middle support member 231 (i.e., the second stopping portion 2337b of the sliding-guiding groove 2337). On each rotating shaft 266, the axial force between the first cam 2710 and the corresponding second cam 2730 is equal to the elastic force of the elastic member 274. On each rotating shaft 266, each of the axial force between the friction member 276 and the spacer 277 and the axial force between the friction member 276 and the positioning member 275 is equal to the elastic force of the elastic member 274. Under the friction resistance between the first cam 2710 and the second cam 2730, the friction resistance between the friction member 276 and the spacer 277, and the friction resistance between the friction member 276 and the positioning member 275, one of the two side support members 233 may be maintained at an angle from the other of the two side support members 233, and the angle is between 70 degrees and 130 degrees.

In other implementations, the two connecting members 256 rotates synchronously in directions away from each other. Each connecting member 256 drives the second arc-shaped rail 2541 of the corresponding rotating member 254 to rotate with respect to the second arc-shaped groove 2511 of the positioning seat 251. The connecting member 256 drives the linkage member 264 and the corresponding rotating shaft 266 to rotate together with respect to the linkage seat 261, the sliding-guiding bar 2647 of the linkage member 264 slides in the sliding-guiding 256, and the first sliding-guiding portion 2640 of the linkage member 264 slides from the first limiting section 2330a of the sliding-limiting groove 2330 to the second limiting section 2330b of the sliding-limiting groove 2330. The second sliding-guiding portion 2641 of the linkage member slides from the first stopping portion 2337a to the second stopping portion 2337b in the sliding-guiding groove 2337. The connecting member 256 drives the first arc-shaped rail 2562 to be rotatably connected in the corresponding first arc-shaped groove 2335. The rotation of the linkage member 264 drives the corresponding first gear 2651 to rotate through the rotating shaft 266. The gear group 265 drives two first gears 2651 to rotate synchronously. The first gears 2651, which rotate synchronously, drive the two linkage members 264 to synchronously move away from each other. Two rotating mechanisms 253 rotate synchronously with respect to the positioning seat 251 and move away from each other, so as to drive the two side support members 233 to synchronously move away from each other, until the two side support members 233 are flush with the middle support member 231.

In some embodiments, the sliding-guiding groove 2337 on the side support member 233 may be omitted, and the corresponding second sliding-guiding portion 2641 on the linkage member 264 may also be omitted.

As shown in FIGS. 1 to 5, the assembled rotating shaft apparatus 22 is arranged between the two frames 21. The connecting member 256 on each of two opposite sides of the back cover 28 is received in the receiving groove 216 of the corresponding frame 21. Each connecting member 256 is fixedly connected to the corresponding frame 21. At this time, the front surface 211 of each frame 21, the front surface of each side support member 233, and the front surface of the middle support member 231 are coplanar with each other. The back surface of the flexible member 30 is connected to the front surface 211 of each frame 21 and the front surface of the rotating shaft apparatus 22. The foldable region 31 faces the front surface of the rotating shaft apparatus 22. The non-foldable region 33 on each of the two opposite sides of the foldable region 31 faces the front surface of the corresponding frame 21. When the flexible member 30 is in the flattened state, the middle support member 231 is flush with the two side support members 233, and the rotating shaft apparatus 22 is maintained in the flattened state. In addition, the first sliding-guiding portion 2640 of the linkage member 264 is slidably received in the sliding-limiting groove 2330 of the corresponding side support member 233. When the rotating shaft apparatus 22 is in the folded state, the first sliding-guiding portion 2640 is stopped by the first limiting section 2330a of the sliding-limiting groove 2330, so to prevent the rotating shaft apparatus 22 from being further folded and reduce the possibility that the flexible member 30 is damaged. When the rotating shaft apparatus 22 is in the flattened state, the first sliding-guiding portion 2640 is stopped by the second limiting section 2330b of the sliding-limiting groove 2330 to prevent the rotating shaft apparatus 22 from being further unfolded and reduce the possibility that the flexible member 30 is damaged.

As shown in FIGS. 19-28, when the electronic device 100 is folded, a folding force is applied to at least one of the two frames 21 of the electronic device 100, so that the rotating mechanisms 253 connected to the two frames 21 rotate in directions approaching each other. The folding of the rotating shaft apparatus 22 may be achieved by the linkage assembly 26. The foldable region 31 of the flexible member 30 is folded and bent along with the support assembly 23. In some embodiments, a folding force is applied to one frame 21. The one frame 21 drives the corresponding rotating member 254 to rotate with respect to the positioning seat 251 and approach the flexible member 30. The second arc-shaped rail 2541 of the rotating member 254 rotates with respect to the second arc-shaped groove 2511 of the positioning seat 251. The connecting member 256 drives the linkage member 264 and the corresponding rotating shaft 266 to rotate together with respect to the linkage seat 261. The sliding-guiding bar 2647 of the linkage member 264 slides in the sliding-guiding groove 2568. The first sliding-guiding portion 2640 of the linkage member 264 slides from the second limiting section 2330b of the sliding-limiting groove 2330 to the first limiting section 2330a of the sliding-limiting groove 2330. The second sliding-guiding portion 2641 of the linkage member 264 slides from the second stopping portion 2337b to the first stopping portion 2337a in the sliding-guiding groove 2337. In this way, the corresponding linkage member 264 and the corresponding rotating shaft 266 are driven to rotate together. The rotation of the linkage member 264 drives the corresponding first gear 2651 to rotate. The gear group 265 drives the two first gears 2651 to rotate synchronously. The first gears 2651, which rotate synchronously, drive the two linkage members 264 to approach each other synchronously. The connecting member 256 drives the first arc-shaped rail 2562 to be rotatably connected to the corresponding first arc-shaped groove 2335. The rotating member 254 drives the second arc-shaped rail 2541 to be rotatably connected to the corresponding second arc-shaped groove 2551. Besides, the two rotating mechanisms 253 rotate synchronously with respect to the positioning seat 251 and approach each other, so as to drive the two side support members 233 to synchronously approach each other. In this way, the rotating shaft apparatus 22 is in the folded state. The foldable region 31 of the flexible member 30 is folded along with the rotating shaft apparatus 22, until the front surfaces of the two non-foldable regions 33, of the flexible member 30, which are on the two opposite sides of the foldable region 31, abut against each other. The foldable region 31 is folded into a waterdrop shape; in this way, the seamless folding of the electronic device 100 may be achieved.

In the aforesaid process, on each rotating shaft 266, the sum of the friction torque force between the first cam 2710 and the second cam 2730, the friction torque force between the friction member 276 and the spacer 277, and the friction torque force between the friction member 276 and the positioning member 275 is greater than a rebound force of the flexible member 30. In this way, one of the two side support members 233 may be maintained at an angle from the other of the two side support members 233. One of the two frames 21 may be maintained at an angle from the other of the two frames 21, and the angle is between 70 degrees and 130 degrees. The foldable region 31 of the flexible member 30 is folded into a waterdrop shape, so as to reduce the space occupied by the folded foldable region 31, thereby reducing the overall thickness of the electronic device 100.

Figures 18, 19, 20, 21:
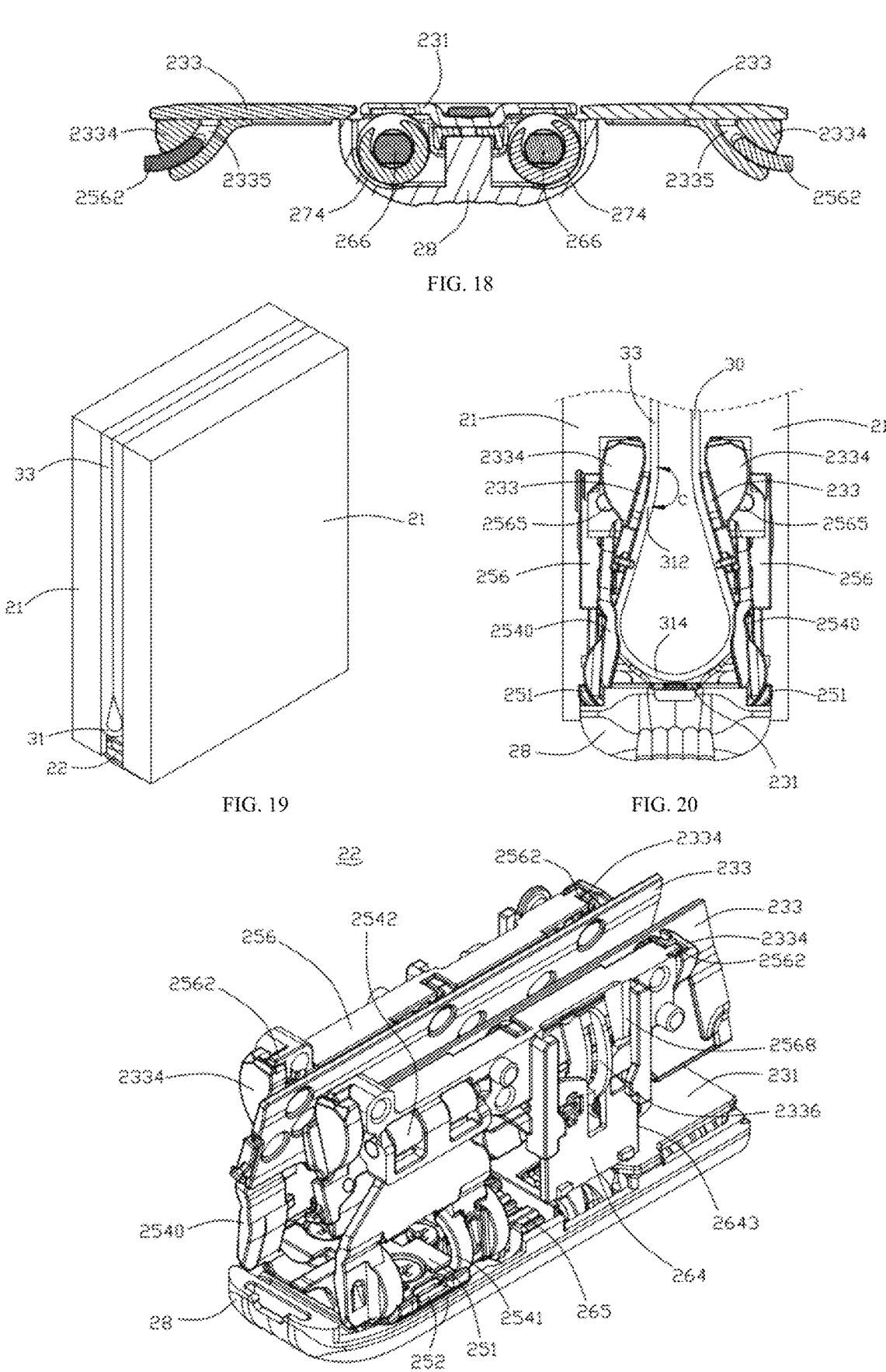
FIG. 18 is a perspective cross-section view of a portion of the rotating shaft apparatus shown in FIG. 4.
FIG. 19 is a schematic perspective structural view of the electronic device shown in FIG. 1, and the electronic device is in a folded state.
FIG. 20 is a schematic structural view illustrating a side of the electronic device shown in FIG. 19.
FIG. 21 is an enlarged perspective structural view of a part of the rotating shaft apparatus shown in FIG. 19.

As shown in FIG. 20, the angle C between each side support member 233 and the corresponding frame 21 is greater than 180°. Since the connecting member 256 is fixed to the frame 21, the angle between the connecting member 256 and the frame 21 is 180° when the electronic device 100 is in the folded state. Each non-foldable region 33 of the flexible member 30 is adhered to the front surface of the corresponding frame 21 through an adhesive. The front surface of the side support member 233 is adhered to the foldable region 33 of the flexible member 30 through an adhesive. The middle support member 231 is not adhered to the flexible member 30. When the flexible member 30 is in the folded state, the foldable region 31 of the flexible member 30 is divided into a first foldable region 312 and a second foldable region 314. That is, the flexible member 30 is divided into the non-foldable region 33 facing the frame 21, the first foldable region 312 facing the side support members 233, and the second foldable region 314 facing the middle support member 231. Since the non-foldable region 33 is adhered to the frame 21, the folding angle of the non-foldable region 33 is equal to the folding angle of the frame 21. The first foldable region 312 is adhered to the side support member 233. When the first foldable region 312 is folded, the section of the first foldable region 312 adhered to the side support member 233 may naturally expand outward.

The side support member 233 may limit an expanding shape of the first foldable region 312. Since the second foldable region 314 is not adhered to the middle support member 231 and the two side support members 233 limit two opposite sides of the second foldable region 314, the second foldable region 314 tends to move towards the middle support member 231 during the folding process. The middle support member 231 abuts against the second foldable region 314 to limit the shape of the second foldable region 314. Therefore, the foldable region 31 of the flexible member 30 may be formed into a waterdrop shape through the regions formed by the side support member 233, the middle support member 23, the frames 21, and an adhering condition. After the foldable region 31 is formed into the waterdrop shape, a portion of the flexible member 30 between each frame 21 and the corresponding side support member 233 form an outer folding region. That is, the outer folding region is formed between each non-foldable region 33 and the corresponding first foldable region 312 of the flexible member 30. Another portion of the flexible member 30 between the middle support member 231 and the two side support members 233 form an inner folding region. That is, the second foldable region 314 of the flexible member 30 forms the inner folding region. The stress direction and the stress magnitude of the outer folding region are different from those of the inner folding region.

In other folding modes of the electronic device 100, folding forces may be applied to the two frames 21 simultaneously. Each frame 21 drives the corresponding rotating mechanism 253 to rotate towards the flexible member 30, and the electronic device 100 may be folded through the rotating shaft apparatus 22.

When it is necessary to flatten the electronic device 100, one frame 21 is pulled outward, so that two rotating mechanisms 253 connected to the two frames 21 may rotate in directions away from each other. In some embodiments, an outward-pulling force may be applied to one frame 21 of the electronic device 100. The one frame 21 drives the corresponding rotating member 254 to rotate away from the flexible member 30 with respect to the positioning seat 251. The second arc-shaped rail 2541 of the rotating member 254 rotates with respect to the second arc-shaped groove 2511 of the positioning seat 251. The connecting member 256 drives the linkage member 264 and the corresponding rotating shaft 266 to rotate together with respect to the linkage seat 261. The sliding-guiding bar 2647 of the linkage member 264 slides in the sliding-guiding groove 2568. The first sliding-guiding portion 2640 of the linkage member 264 slides from the first limiting section 2330a of the sliding-limiting groove 2330 to the second limiting section 2330b of the sliding-guiding groove 2330. The second sliding-guiding portion 2641 of the linkage member 264 slides from the first stopping portion 2337a to the second stopping portion 2337b in the sliding-guiding groove 2337. In this way, the corresponding linkage member 264 and the corresponding rotating shaft 266 may rotate together. The connecting member 256 drives the first arc-shaped rail 2562 to be rotatably connected in the corresponding first arc-shaped groove 2335. The rotation of the linkage member 264 drives the corresponding first gear 2651 to rotate. The gear group 265 drives the two first gears 2651 to rotate synchronously. The first gears 2651, which rotate synchronously, drive the two linkage members 264 to move away from each other synchronously. Two rotating mechanisms 253 rotate synchronously with respect to the positioning seat 251 and move away from each other, so as to drive the two side support members 233 to synchronously move away from each other. In this way, the two side support members 233 may be flattened, the rotating shaft apparatus 22 is unfolded, and the foldable region 31 of the flexible member 30 is unfolded along with the rotating shaft apparatus 22, until the flexible member 30 is flattened.

In the aforesaid process, on each rotating shaft 266, the sum of the friction torque force between the first cam 2710 and the second cam 2730, the friction torque force between the friction member 276 and the spacer 277, and the friction torque force between the friction member 276 and the positioning member 275 is greater than a rebound force of the flexible member 30. In this way, one of the two side support members 233 may be maintained at an angle from the other of the two side support members 233. One of the two frames 21 may be maintained at an angle from the other of the two frames 21, and the angle is between 70 degrees and 130 degrees.

In other folding modes of the electronic device 100, outward-pulling forces may be applied to the two frames 21 simultaneously. Each frame 21 drives the corresponding rotating mechanism 253 to rotate away from the flexible member 30. The electronic device 100 may be unfolded through the rotating shaft apparatus 22.

In the embodiments of the present disclosure, the rotating shaft apparatus 22 of the electronic device 100 may be folded or unfolded through the rotating assembly 25 and the linkage assembly 26. When the rotating shaft apparatus 22 is in the folded state, the first sliding-guiding portion 2640 is stopped by the first limiting section 2330a of the sliding-limiting groove 2330, so as to prevent the rotating shaft apparatus 22 from being further folded and reduce the possibility that the flexible member 30 is damaged. When the rotating shaft apparatus 22 is in the flattened state, the first sliding-guiding portion 2640 is stopped by the first limiting section 2330b of the sliding-limiting groove 2330, so as to prevent the rotating shaft apparatus 22 from being further unfolded and reduce the possibility that the flexible member 30 is damaged. In addition, since the elastic member 274 of the limiting mechanism 27 may provide a large axial force, the friction torque force between the first cam 2710 and the second cam 2730 is large, the friction torque force between the friction member 276 and the spacer 277 is large, and the friction torque force between the friction member 276 and the positioning portion 275 is large. The friction torque force is large enough, so that the electronic device 100 may be maintained at a folded angle, and the folded angle is between 70 degrees and 130. The hovering function of the whole device may be achieved. In addition, the rotating shaft apparatus 22 has a stable structure, and the overall strength of the electronic device 100 may be improved.

As shown in FIGS. 29-32, the structure of the rotating shaft apparatus 22a in some embodiments of the present disclosure is similar to the structure of the rotating shaft apparatus 22 in any one of the aforesaid embodiments. The difference lies in that, in some embodiment, the linkage member 264 and the side support member 233 of the rotating shaft apparatus 22a are connected to each other through a cooperation of a sliding-stopping groove and a position-stopping portion, rather than the cooperation of the sliding-limiting groove 2330 and the sliding portion 2640. The linkage member 264 and the side support member 233 of the rotating shaft apparatus 22a are connected to each other through the cooperation of the sliding-stopping groove and the position-stopping portion, so as to prevent the side support members 231 from being overly folded or overly flattened and prevent the flexible screen from being damaged. In some embodiments, the sliding-stopping groove 2338 is defined on the side support member 233. The sliding-stopping groove 2338 includes a first sliding-stopping groove 2338*a* and a second sliding-stopping groove 2338*b* parallel to each other. The first sliding-stopping groove 2338*a* includes a first stopping section 2338*c*. The second sliding-stopping groove 2338*b* includes a second stopping section 2338*d*. A position-stopping portion 2648 is arranged on the linkage member 264 and faces the sliding-stopping groove 2338. When the two side support members 233 are in the fully folded state, the position-stopping portion 2648 is positioned at the first stopping section 2338*c*, so as to prevent the side support members 233 from being further folded and reduce the possibility that the flexible screen is damaged. When the two side support members 233 are in the flattened state, the position-stopping portion 2648 is positioned at the second stopping section 2338*d*, so as to prevent the side support members 233 from being further inversely folded after the two side support members 233 are flattened and reduce the possibility that the flexible screen is damaged.

In some embodiments, the limiting portion 2336 protrudes from the back surface of the side support member 233 and faces the linkage member 264. The limiting portion 2336 is an arc-shaped strip, and the arc-shaped strip is curved and extends from a side of the side support plate close to the positioning seat 251 to the other side of the side support plate away from the positioning seat 251. Each of the first sliding-stopping groove 2338*a* and the second sliding-stopping groove 2338*b* is defined on the limiting portion 2336 and extends along the lengthwise direction of the limiting portion 2336. At least one end of each of the first sliding-stopping groove 2338*a* and the second sliding-stopping groove 2338*b* is arranged in an opening state. That is, at least one end of each of the first sliding-stopping groove 2338*a* and the second sliding-stopping groove 2338*b* has no end wall. Since at least one end of each of the first sliding-stopping groove 2338*a* and the second sliding-stopping groove 2338*b* does not need to be arranged with an end wall, the extending length of the limiting portion 2336 may be reduced, thereby reducing the width of the side support member 233. The overall width of the rotating shaft apparatus 22*a* may be reduced, the internal space of the housing of the electronic device occupied by the rotating shaft apparatus 22*a* may be reduced, and the layout of other components, such as the main board, the battery, and so on, may be improved.

In some embodiments, each of the first sliding-stopping groove 2338*a* and the second sliding-stopping groove 2338*b* is an arc-shaped groove. Compared with a straight groove, the arc-shaped groove has a small length, so that the length of the limiting portion 2336 along the width direction of the side support member 233 may be reduced. In this way, the width of the side support member 233 may be reduced, the overall width of the rotating shaft apparatus 22*a* may be reduced, the internal space of the housing of the electronic device occupied by the rotating shaft apparatus 22*a* may be reduced, and the layout of other components, such as the main board, the battery, and so on, may be improved.

The first stopping section 2338*c* is disposed closer to the positioning seat than the second stopping section 2338*d*. That is, the first stopping section 2338*c* is disposed close to the positioning seat 251, and the second stopping section 2338*d* is disposed away from the positioning seat 251. The position-stopping portion 2648 includes a first position-stopping portion 2648*a* and a second position-stopping portion 2648*b* arranged on the connecting rod 2643 and spaced apart from each other. The first position-stopping portion 2648*a* is slidably received in the first sliding-stopping groove 2338*a*, and the second position-stopping portion 2648*b* is slidably received in the second sliding-stopping groove 2338*b*. When the first position-stopping portion 2648*a* is positioned at the first stopping section 2338*c*, the two side support members 233 are in the fully folded state. The first position-stopping portion 2648*a* is positioned at the first stopping section 2338*c*, so as to prevent the side support members 233 from being further folded and prevent the flexible screen from being damaged. When the second position-stopping portion 2648*b* is positioned at the second stopping section 2338*d*, the two side support members 233 are in the flattened state. The second position-stopping portion 2648*b* is positioned at the second stopping section 2338*d*, so as to prevent the side support members 233 from being further inversely folded after the two side support members 233 are flattened and prevent the flexible screen from being damaged.

The limiting portion 2336 includes two opposite side surfaces. The first sliding-stopping groove 2338*a* is defined on one side surface of the limiting portion 2336, and the second sliding-stopping groove 2338*b* is defined on the other side surface of the limiting portion 2336. An interval is defined between the first position-stopping portion 2648*a* and the second position-stopping portion 2648*b*. The limiting portion 2336 is slidably received in the interval. The first position-stopping portion 2648*a* is slidably received in the first sliding-stopping groove 2338*a*, and the second position-stopping portion 2648*b* is slidably received in the second sliding-stopping groove 2338*b*. In some embodiments, the first sliding-stopping groove 2338*a* is defined on a side of one side surface of the limiting portion 2336 close to the side support plate 2331. The first sliding-stopping groove 2338*a* is an arc-shaped groove bent away from the side support plate 2331. Each end of the first sliding-stopping groove 2338*a* passes through a corresponding one of two opposite end surfaces of the limiting portion 2336. The side support plate 2331 and an end of the first sliding-stopping groove 2338*a* close to the side support plate 2331 cooperatively form the first stopping section 2338*c*. The second sliding-stopping groove 2338*b* is defined on a side of the other side surface of the limiting portion 2336 away from the side support plate 2331. The second sliding-stopping groove 2338*b* is an arc-shaped groove bent away from the side support plate 2331. An end of the second sliding-stopping groove 2338*b* close to the positioning seat 251 passes through one of the two end surfaces of the limiting portion 2336. The other end of the second sliding-stopping groove 2338*b* away from the positioning seat 251 extends close to the other of the two end surfaces of the limiting portion 2336 to form the second stopping section 2338*d*.

Figure 30:
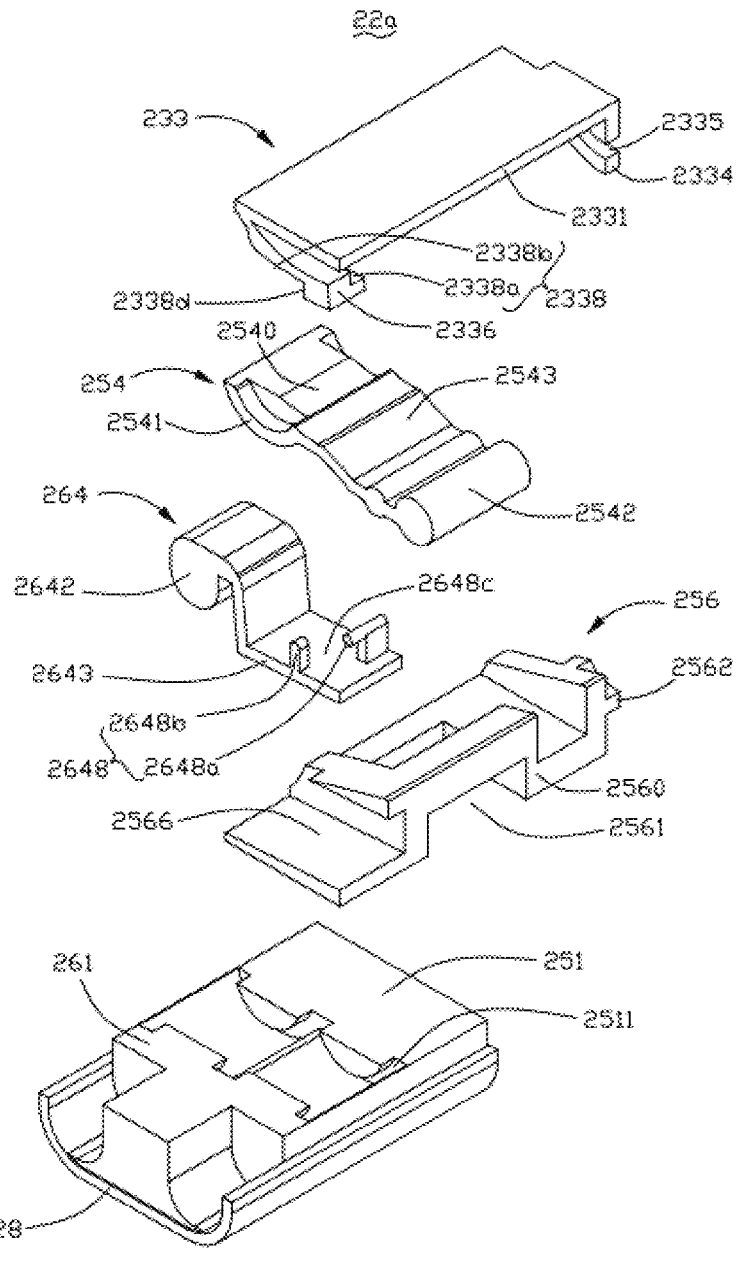
FIG. 30 is a schematic exploded perspective structural view of the rotating shaft apparatus shown in FIG. 29.
Figures 31, 32, 33, 34:
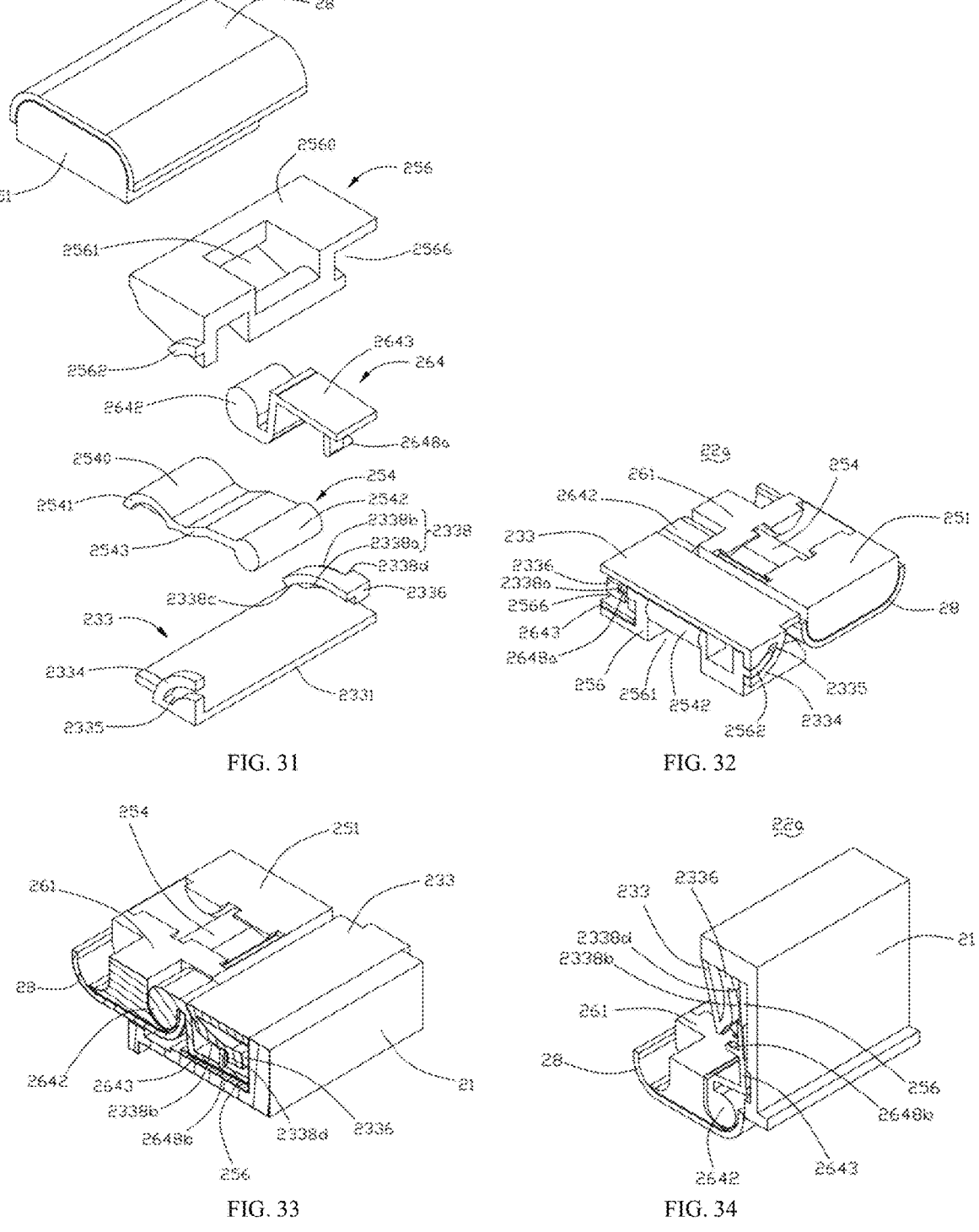
FIG. 31 is another schematic exploded perspective structural view of the rotating shaft apparatus shown in FIG. 30, when viewed from another viewing angle.
FIG. 32 is another schematic perspective structural view of the rotating shaft apparatus shown in FIG. 29, when viewed from another viewing angle.
FIG. 33 is a schematic perspective cross-section structural view of the rotating shaft apparatus shown in FIG. 29.
FIG. 34 is a schematic perspective structural view of the rotating shaft apparatus shown in FIG. 29, and the rotating shaft apparatus is in a folded state.
Figures 35, 36, 37, 38:
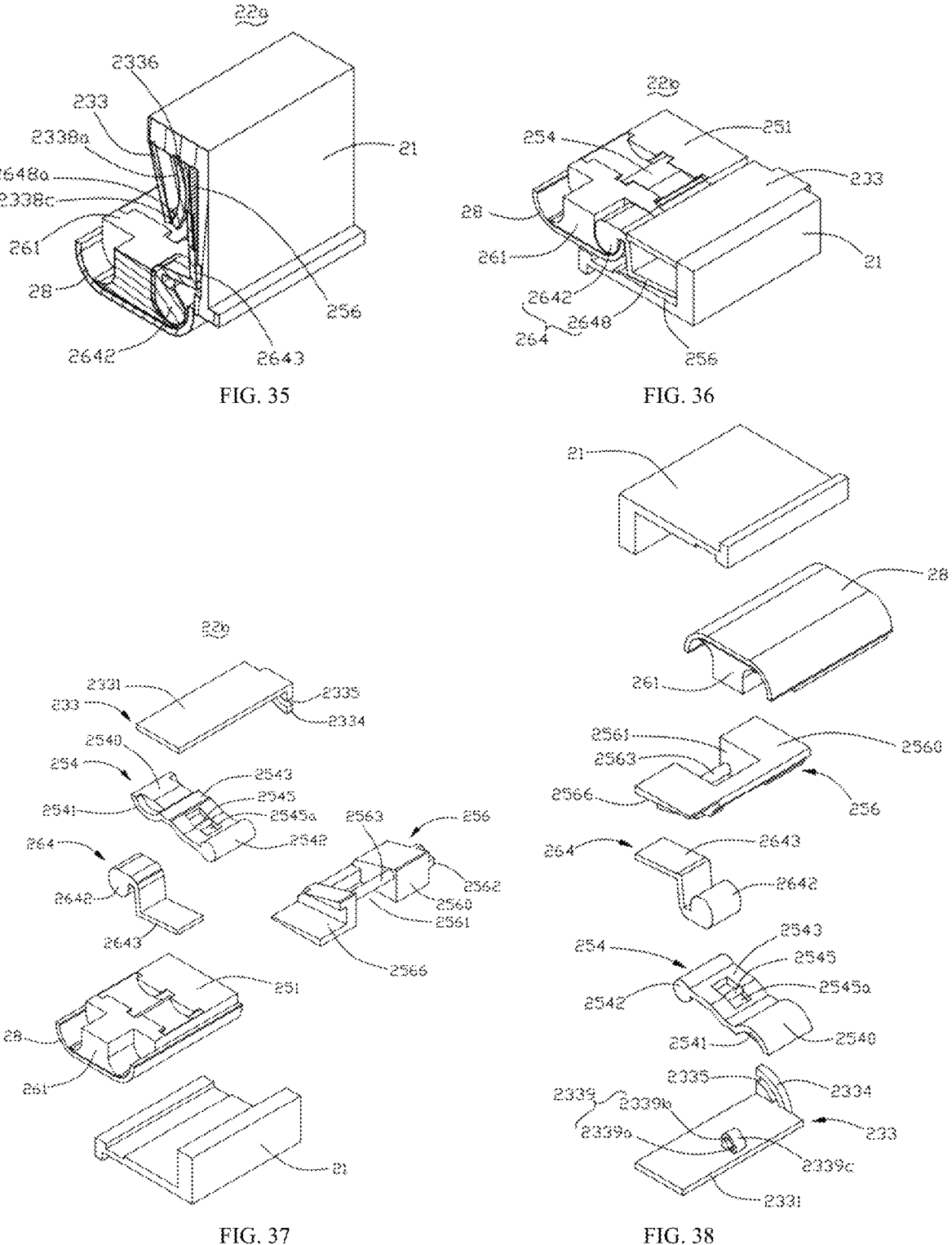
FIG. 35 is a schematic perspective cross-section structural view of the rotating shaft apparatus shown in FIG. 34.
FIG. 36 is a schematic perspective structural view of a rotating shaft apparatus according to some embodiments of the present disclosure.
FIG. 37 is a schematic exploded perspective structural view of the rotating shaft apparatus shown in FIG. 36.
FIG. 38 is another schematic perspective structural view of the rotating shaft apparatus in FIG. 37, when viewed from another viewing angle.

As shown in FIG. 30, the first position-stopping portion 2648*a* and the second position-stopping portion 2648*b* are both arranged on the side surface of the connecting rod 2643 facing the side support member 233. The first position-stopping portion 2648*a* is disposed farther away from the sleeve 2642 than the second position-stopping portion 2648*b*. That is, the first position-stopping portion 2648*a* is disposed farther away from the positioning seat 251 than the second position-stopping portion 2648*b*. An interval 2648*c* is defined between the first position-stopping portion 2648*a* and the second position-stopping portion 2648*b*. The limiting portion 2336 is slidably inserted in the interval 2648*c*. The first position-stopping portion 2648*a* is slidably received in the first sliding-stopping groove 2338*a*. The second position-stopping portion 2648*b* is slidably received in the second sliding-stopping groove 2338*b*. In some embodiments, the first position-stopping portion 2648*a* includes a support sheet protruding from the connecting rod 2643 and a first position-stopping block arranged on an end of the support sheet away from the connecting rod 2643. The first position-stopping block is configured to be slidably received in the first sliding-stopping groove 2338*a*. The first position-stopping block may be stopped by the first stopping section 2338*c*. The second position-stopping portion 2648*b* is a second position-stopping block protruding from the connecting rod 2643. The second position-stopping block is configured to be slidably received in the second sliding-stopping groove 2338*b*. The second position-stopping block may be stopped by the second stopping section 2338*d*. In some embodiments, the surface of the first position-stopping block in contact with the inner surface of the first sliding-stopping groove 2338*a* is arranged as an arc-shaped surface, so that the first position-stopping portion 2648*a* may slide in the first sliding-stopping groove 2338*a* smoothly. In some embodiments, the first position-stopping block is a cylinder, and an axis of the cylinder is parallel to the axis of the sleeve 2642. The end surface of the second position-stopping block away from the connecting rod 2643 is arranged as an arc-shaped surface, so that the second position-stopping portion 2648*b* may slide in the second sliding-stopping groove 2338*b* smoothly.

After the assembly of the rotating shaft apparatus 22*a* of some embodiments of the present disclosure is finished, the second arc-shaped rail 2541 of the rotating member 254 is rotatably received in the second arc-shaped groove 2511 of the positioning seat 251. The second rotating portion 2542 of the rotating member 254 is received in the receiving opening 2561 of the connecting member 256. The second rotating portion 2542 is rotatably connected to the connecting member 256. The sleeve 2642 of the linkage member 264 is connected to the linkage seat 261 through the rotating shaft. An end of the connecting rod 2643 of the linkage member 264 away from the sleeve 2642 is slidably inserted in the sliding-guiding space 2566 of the connecting member 256. The limiting portion 2336 of the side support member 233 is slidably inserted in the sliding-guiding space 2566 of the connecting member 256. The limiting portion 2336 is located in the interval 2648*c* between the first position-stopping portion 2648*a* and the second position-stopping portion 2648*b*. The first position-stopping portion 2648*a* is slidably received in the first sliding-stopping groove 2338*a*, and the second position-stopping portion 2648*b* is slidably received in the second sliding-stopping groove 2338*b*. The first arc-shaped rail 2562 of the connecting member 256 may be rotatably received in the first arc-shaped groove 2335 of the side support member 233.

It should be noted that, for the convenience of description, the rotating shaft apparatus 22*a* in FIGS. 28-35 in some embodiments of the present disclosure only shows schematic structures of the positioning seat 251, the linkage seat 261, one side support member 233, one rotating member 254, one connecting member 256, and one linkage member 264, and other components are omitted.

As shown in FIGS. 32-35, in the folding process of the rotating shaft apparatus 22*a*, a pair of rotating members 254 rotate synchronously with respect to the positioning seat 251 to approach each other, and a pair of connecting members 256 rotate synchronously with respect to the positioning seat 251 to approach each other. A pair of linkage members 264 rotate synchronously with respect to the linkage seat 261 to approach each other. A pair of side support members 233 are synchronously folded with respect to each other. In some embodiments, the rotating member 254 rotates with respect to the positioning seat 251 through the second arc-shaped rail 2541 and the second arc-shaped groove 2511, so as to drive the connecting member 256 to rotate with respect to the positioning seat 251. The rotation of the connecting member 256 drives the linkage member 264 and the corresponding rotating shaft 266 to rotate, so that the first gear on the rotating shaft rotates, and the corresponding second gear is driven to rotate. In this way, the two linkage members may rotate synchronously and approach each other. The connecting rod 2643 of each linkage member 264 slides in the corresponding sliding-guiding space 2566. The first position-stopping portion 2648*a* slides towards the first stopping section 2338*c* in the first sliding-stopping groove 2338*a*, until the first position-stopping portion 2648*a* is stopped by the first stopping section 2338*c*. The second position-stopping portion 2648*b* slides away from the second stopping section 2338*b* in the second sliding-stopping groove 2338*d*. In this way, the two side support members 233 may be folded with respect to each other.

In the flattening process of the rotating shaft apparatus 22*a*, a pair of rotating members 254 rotate synchronously with respect to the positioning seat 251 to move away from each other, and a pair of connecting members 256 rotate synchronously with respect to the positioning seat 251 to move away from each other. A pair of linkage members 264 rotate synchronously with respect to the linkage seat 261 to move away from each other. A pair of side support members 233 are synchronously flattened with respect to each other. In some embodiments, the rotating member 254 rotates with respect to the positioning seat 251 through the second arc-shaped rail 2541 and the second arc-shaped groove 2511, so as to drive the connecting member 256 to rotate with respect to the positioning seat 251. The rotation of the connecting member 256 drives the linkage member 264 and the corresponding rotating shaft 266 to rotate, the first gear on the rotating shaft rotates, so as to drive the corresponding second gear to rotate. In this way, the two linkage members may rotate synchronously and move away from each other. The connecting rod 2643 of each linkage member 264 slides in the corresponding sliding-guiding space 2566. The first position-stopping portion 2648*a* slides away from the first stopping section 2338*c* in the first sliding-stopping groove 2338*a*. The second position-stopping portion 2648*b* slides towards the second stopping section 2338*d* in the second sliding-stopping groove 2338*b*, until the second position-stopping portion 2648*b* is stopped by the second stopping section 2338*d*. In this way, the two side support members 233 may be flattened with respect to each other.

As shown in FIGS. 36-39, the structure of the rotating shaft apparatus 22*b* in some embodiments of the present disclosure is similar to the structure of the rotating shaft apparatus 22 in any one of the aforesaid embodiments. The difference lies in that, the side support member 233 and the rotating member 254 of the rotating shaft apparatus 22*b* are connected to each other through the cooperation of the sliding-limiting groove and the sliding-guiding portion, while the side support member 233 and the linkage member 264 of the rotating shaft apparatus 22 are connected to each other through the cooperation of the sliding-limiting groove 2330 and the first sliding-guiding portion 2640. The side support member 233 and the rotating member 254 of the rotating shaft apparatus 22*b* are connected to each other through the cooperation of the sliding-limiting groove and the sliding-guiding portion, so as to prevent the side support member 231 from being overly folded or overly flattened and prevent the flexible screen from being damaged. In some embodiments, the side of the side support member 233 away from the positioning seat 251 is rotatably connected to the connecting member 256. That is, the side support member 233 is rotatably connected to the connecting member 256 through the cooperation of the first arc-shaped rail 2562 and the first arc-shaped groove 2335. The side of the side support member 233 close to the positioning seat 251 defines a sliding-limiting groove 2339. The rotating member 254 is arranged with a sliding-guiding portion 2545 slidably passing through the sliding-limiting groove 2339. The sliding-limiting groove 2339 includes a first limiting section 2339*a* on one of two opposite ends thereof and a second limiting section 2339*b* on the other of the two opposite ends thereof. When the two side support members 233 are in the fully folded state, the sliding-guiding portion 2545 is positioned at the first limiting section 2339*a*, so to prevent the side support members 233 from being further folded and reduce the possibility that the flexible screen is damaged. When the two side support members 233 are in the flattened state, the sliding-guiding 2545 is positioned at the second limiting section 2339*b*, so as to prevent the side support members 233 from being further inversely folded after the side support members 233 are flattened and reduce the possibility that the flexible screen is damaged.

A side of the back surface of the side support plate 2331 of the side support member 233 close to the positioning seat 251 is arranged with a convex lug 2339*c*. The sliding-limiting groove 2339 is defined on the convex lug 2339*c*. The connecting portion 2543 of the rotating member 254 defines an accommodating groove 2545*a* facing the convex lug 2339*c*. The convex lug 2339*c* is movably received in the accommodating groove 2545*a*. In some embodiments, the convex lug 2339*c* is a triangular protrusion. The sliding-limiting groove 2339 passes through two opposite sides of the convex lug 2339*c*. The sliding-guiding portion 2545 is a sliding-guiding column passing through the sliding-limiting groove 2339. The sliding-guiding column is accommodated in the accommodating groove 2545*a*. Two opposite ends of the sliding-guiding column are connected to the connecting portion 2543.

In some embodiments, the sliding-limiting groove 2339 extends obliquely away from the positioning seat 251. The first limiting section 2339*a* is disposed closer to the positioning seat 251 and the side support plate 2331 than the second limiting section 2339*b*. The sliding-guiding column passes through the sliding-limiting groove 2339. The axis of the sliding-guiding column is parallel to the axis of rotation between the rotating member 254 and the positioning seat 251.

It should be noted that, for the convenience of description, the rotating shaft apparatus 22*b* in FIGS. 36-41 in some embodiments of the present disclosure only shows schematic structures of the positioning seat 251, the linkage seat 261, one side support member 233, one rotating member 254, one connecting member 256, and one linkage member 264, and other components are omitted.

Figure 39:
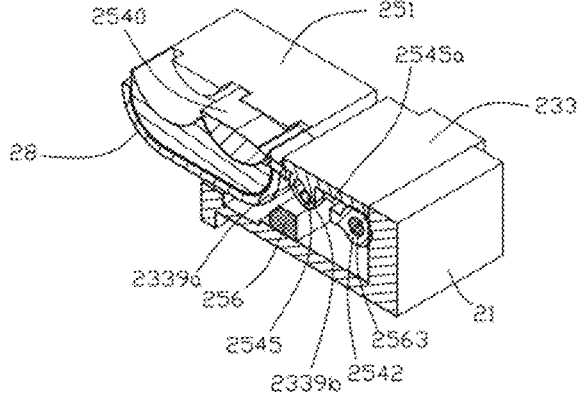
FIG. 39 is schematic perspective cross-section structural view of the rotating shaft apparatus shown in FIG. 36.
Figure 40:
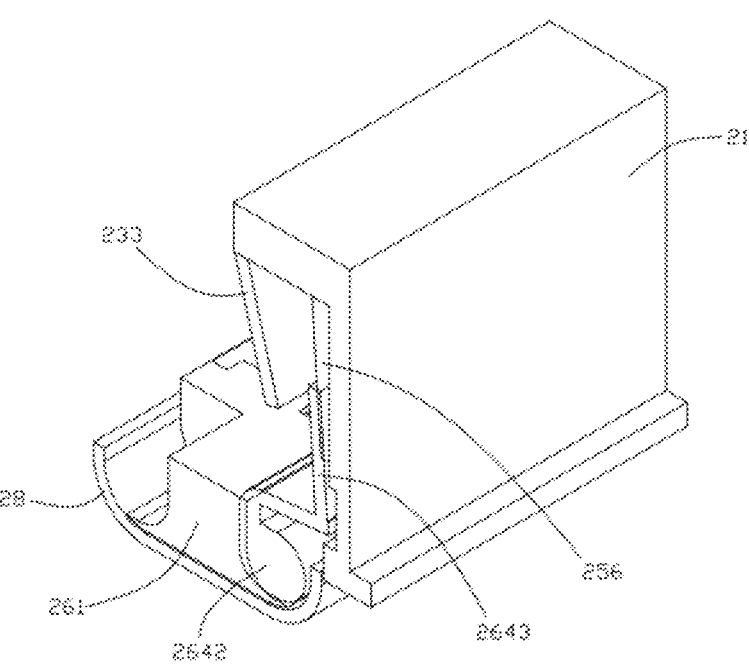
FIG. 40 is a schematic view of the rotating shaft apparatus shown in FIG. 36, and the rotating shaft apparatus is in a folded state.
Figure 41:
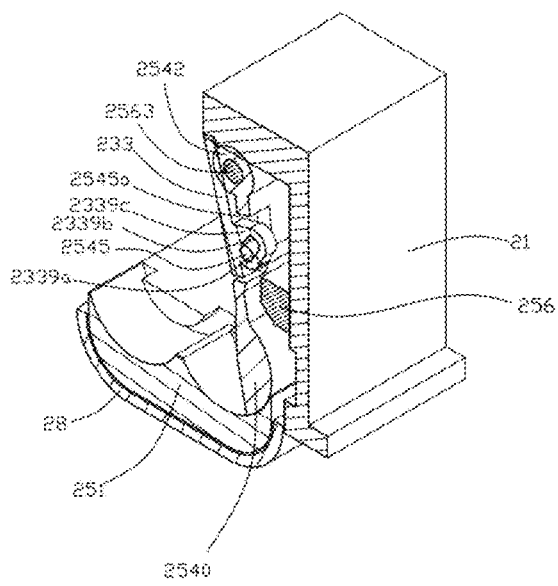
FIG. 41 is a schematic perspective cross-section structural view of the rotating shaft apparatus shown in FIG. 40.

As shown in FIG. 39-41, in the folding process of the rotating shaft apparatus 22*b*, a pair of rotating members 254 rotate synchronously with respect to the positioning seat 251 to approach each other, and a pair of connecting members 256 rotate synchronously with respect to the positioning seat 251 to approach each other. A pair of linkage members 264 rotate synchronously with respect to the linkage seat 261 to approach each other. A pair of side support members 233 are synchronously folded with respect to each other. In some embodiments, the rotating member 254 rotates with respect to the positioning seat 251 through the second arc-shaped rail 2541 and the second arc-shaped groove 2511, so as to drive the connecting member 256 to rotate with respect to the positioning seat 251. The rotation of the connecting member 256 drives the linkage member 264 and the corresponding rotating shaft 266 to rotate, the first gear on the rotating shaft rotates, so as to drive the corresponding second gear to rotate. In this way, the two linkage members rotate synchronously and approach each other. The connecting rod 2643 of each linkage member 264 slides in the corresponding sliding-guiding space 2566. The sliding-guiding portion 2545 of each rotating member 254 moves from the second limiting section 2339*b* to the first limiting section 2339*a* in the sliding-limiting groove 2339, until the sliding-guiding portion 2545 is stopped by the first limiting section 2339*a*. The two side support members 233 may be folded with respect to each other, in this way, the two side support members 233 and the middle support member are enclosed to from a waterdrop-shaped space.

In the flattening process of the rotating shaft apparatus 22*b*, a pair of rotating members 254 rotate synchronously with respect to the positioning seat 251 to move away from each other, and a pair of connecting members 256 rotate synchronously with respect to the positioning seat 251 to move away from each other. A pair of linkage members 264 rotate synchronously with respect to the linkage seat 261 to move away from each other. A pair of side support members 233 are synchronously flattened with respect to each other. In some embodiments, the rotating member 254 rotates with respect to the positioning seat 251 through the second arc-shaped rail 2541 and the second arc-shaped groove 2511, so as to drive the connecting member 256 to rotate with respect to the positioning seat 251. The rotation of the connecting member 256 drives the linkage member 264 and the corresponding rotating shaft 266 to rotate, the first gear on the rotating shaft rotates, so as to drive the corresponding second gear to rotate. The connecting rod 2643 of each linkage member 264 slides in the corresponding sliding-guiding space 2566. The sliding-guiding portion 2545 of each rotating member 254 moves from the first limiting section 2339*a* to the second limiting section 2339*b* in the sliding-limiting groove 2339, until the sliding-guiding portion 2545 is stopped by in the second limiting section 2339*b*. In this way, the two side support members 233 may be flattened with respect to each other.

In some embodiments, the sliding-limiting groove 2339 on the side support member 233 and the sliding-guiding 2545 on the rotating member 254 may be interchanged with each other. That is, the sliding-guiding portion may be provided on the side of the side support plate 233 close to the positioning seat 251, the sliding-limiting groove may be defined on the rotating member, and the sliding-guiding portion slidably passes through the sliding-limiting groove.

Figure 42:
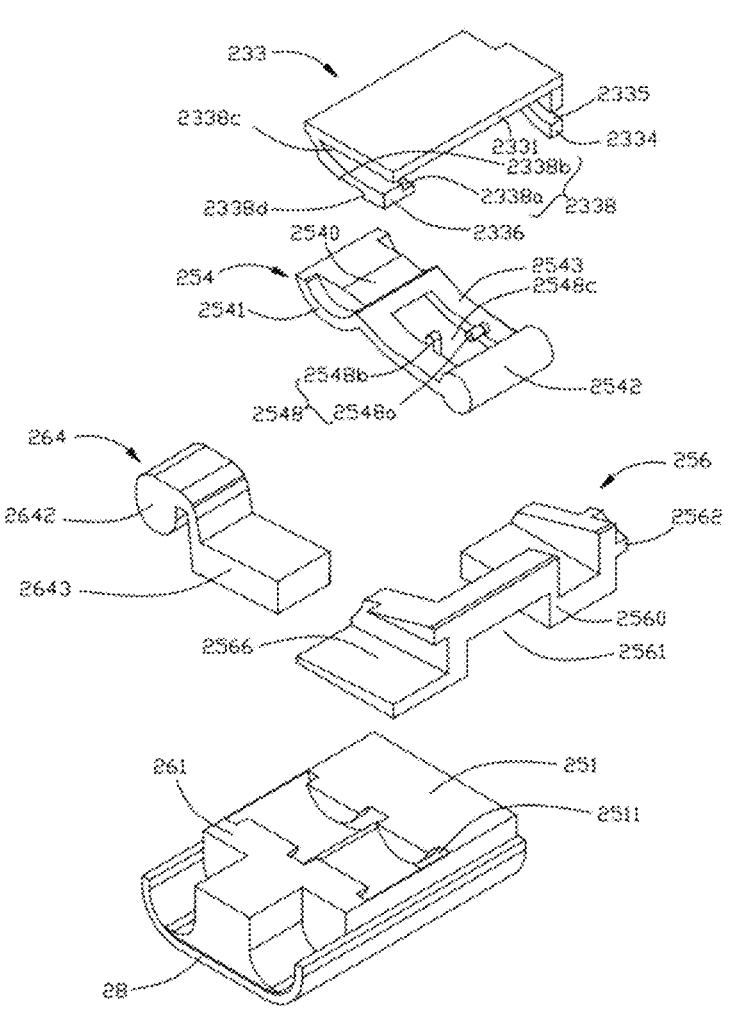
FIG. 42 is a schematic exploded perspective structural view of a rotating shaft apparatus according to some embodiments of the present disclosure.

As shown in FIG. 42, the structure of the rotating shaft apparatus 22*c* in some embodiments of the present disclosure is similar to the structure of the rotating shaft apparatus 22*a* in some embodiments of the present disclosure. The difference lies in that, the rotating member 254 and the side support member 233 of the rotating shaft apparatus 22*c* are connected to each other through the cooperation of the sliding-stopping groove and the position-stopping portion, rather than through the cooperation of the sliding-stopping groove and the position-stopping portion. That is, based on the rotating shaft apparatus 22*a* in the aforesaid embodiments, the connection between the linkage member 264 and the side support member 233 through the cooperation of the sliding-stopping groove and the position-stopping portion are omitted, while the rotating member 254 and the side support member 233 of the rotating shaft apparatus 22c are connected to each other through the cooperation of the sliding-stopping groove and the position-stopping portion. In some embodiments, the sliding-stopping groove 2338 is defined on the side support member 233. The sliding-stopping groove 2338 includes a first sliding-stopping groove 2338a and a second sliding-stopping groove 2338b that are parallel to each other. The first sliding-stopping groove 2338a includes a first stopping section 2338c, and the second sliding-stopping groove 2338b includes a second stopping section 2338d. The position-stopping portion 2548 is provided on the rotating member 254 and faces the sliding-stopping groove 2338. When the two side support members 233 are in the fully folded state, the position-stopping portion 2548 is positioned at the first stopping section 2338c, so as to prevent the side support members 233 from being further folded and reduce the possibility that the flexible screen is damaged. When the two side support members 233 are in the flattened state, the position-stopping portion 2548 is positioned at the second stopping section 2338d, so as to prevent the side support members 233 from being further inversely folded after the side support members 233 are flattened and reduce the possibility that the flexible screen is damaged.

In some embodiments, the limiting portion 2336 protrudes from the back surface of the side support member 233 and faces the rotating member 254. The limiting portion 2336 is an arc-shaped strip, and the arc-shaped strip extends from one side of the side support plate close to the positioning seat 251 to the other side of the side support plate away from the positioning seat 251. Each of the first sliding-stopping groove 2338a and the second sliding-stopping groove 2338b is defined on the limiting portion 2336 and is curved and extends along the lengthwise direction of the limiting portion 2336. At least one end of each of the first sliding-stopping groove 2338a and the second sliding-stopping groove 2338b is arranged in an opening state, that is, at least one end of each of the first sliding-stopping groove 2338a and the second sliding-stopping groove 2338b has no end wall. Since at least one end of each of the first sliding-stopping groove 2338a and the second sliding-stopping groove 2338b does not need to be arranged with an end wall, the extending length of the limiting portion 2336 may be reduced, thereby reducing the width of the side support member 233. The overall width of the rotating shaft apparatus 22c may be reduced, the internal space of the housing of the electronic device occupied by the rotating shaft apparatus 22c may be reduced, and the layout of other components, such as the main board, the battery, and so on, may be improved.

In some embodiments, each of the first sliding-stopping groove 2338a and the second sliding-stopping groove 2338b is an arc-shaped groove. Compared with a straight groove, the arc-shaped groove has a small length, so that the length of the limiting portion 2336 along the width direction of the side support member 233 may be reduced. In this way, the width of the side support member 233 may be reduced, the overall width of the rotating shaft apparatus 22c may be reduced, the internal space of the housing of the electronic device occupied by the rotating shaft apparatus 22c may be reduced, and the layout of other components, such as the main board, the battery, and so on, may be improved.

The first stopping section 2338c is disposed closer to the positioning seat 251 than the second stopping section 2338d. That is, the first stopping section 2338c is disposed close to the positioning seat 251, and the second stopping section 2338d is disposed away from the positioning seat 251. The position-stopping portion 2548 includes a first position-stopping portion 2548a and a second position-stopping portion 2548b arranged on the connecting portion 2543 and spaced apart from each other. The first position-stopping portion 2548a is slidably received in the first sliding-stopping groove 2338a, and the second position-stopping portion 2548b is slidably received in the second sliding-stopping groove 2338b. When the first position-stopping portion 2548a is positioned at the first stopping section 2338c, the two side support members 233 are in the fully folded state. The first position-stopping portion 2548a is positioned at the first stopping section 2338c, so as to prevent the side support members 233 from being further folded and prevent the flexible screen from being damaged. When the second position-stopping portion 2548b is positioned at the second stopping section 2338d, the two side support members 233 are in the flattened state. The second position-stopping portion 2548b is positioned at the second stopping section 2338d, so as to prevent the side support members 233 from being further inversely folded after the side support members 233 are flattened and prevent the flexible screen from being damaged.

The limiting portion 2336 includes two opposite side surfaces. The first sliding-stopping groove 2338a is defined on one side surface of the limiting portion 2336, and the second sliding-stopping groove 2338b is defined on the other side surface of the limiting portion 2336. An interval 2548c is defined between the first position-stopping portion 2548a and the second position-stopping portion 2548b. The limiting portion 2336 is slidably inserted in the interval 2548c. The first position-stopping portion 2548a is slidably received in the first sliding-stopping groove 2338a, and the second position-stopping portion 2548b is slidably received in the second sliding-stopping groove 2338b. In some embodiments, the first sliding-stopping groove 2338a is defined on a side of one side surface of the limiting portion 2336 close to the side support plate 2331. The first sliding-stopping groove 2338a is an arc-shaped groove bent away from the side support plate 2331. Each end of the first sliding-stopping groove 2338a passes through a corresponding one of two end surfaces of the limiting portion 2336. The side support plate 2331 and an end of the first sliding-stopping groove 2338a close to the side support plate 2331 cooperatively form the first stopping section 2338c. The second sliding-stopping groove 2338b is defined on a side of the other side surface of the limiting portion 2336 away from the side support plate 2331. The second sliding-stopping groove 2338b is an arc-shaped groove bent away from the side support plate 2331. An end of the second sliding-stopping groove 2338b close to the positioning seat 251 passes through one of the two end surfaces of the limiting portion 2336. The other end of the second sliding-stopping groove 2338b away from the positioning seat 251 extends close to the other of the two end surfaces of the limiting portion 2336, to form the second stopping section 2338.

As shown in FIG. 42, the first position-stopping portion 2548a and the second position-stopping portion 2548b are both arranged on the side surface of the connecting portion 2543 facing the side support member 233. The first position-stopping portion 2548a is disposed farther away from the first rotating portion 2540 than the second position-stopping portion 2548b. That is, the first position-stopping portion 2548a is disposed farther away from the positioning seat 251 than the second position-stopping portion 2548b. The interval 2548c is defined between the first position-stopping portion 2548a and the second position-stopping portion 2548b. The limiting portion 2336 is slidably inserted in the interval 2548c. The first position-stopping portion 2548a is slidably received in the first sliding-stopping groove 2338a. The second position-stopping portion 2548b is slidably received in the second sliding-stopping groove 2338b. In some embodiments, the first position-stopping portion 2548a includes a first position-stopping block protruding from the connecting portion 2543. The first position-stopping block is configured to be slidably received in the first sliding-stopping groove 2338a. The first position-stopping block may be stopped by the first stopping section 2338c. The second position-stopping portion 2548b is a second position-stopping block protruding from the connecting portion 2543. The second position-stopping block is configured to be slidably received in the second sliding-stopping groove 2338b. The second position-stopping block may be stopped by the second stopping section 2338d. In some embodiments, the surface of the first position-stopping block in contact with the inner surface of the first sliding-stopping groove 2338a is arranged as an arc-shaped surface, so that the first position-stopping portion 2548a may slide in the first sliding-stopping groove 2338a smoothly. The surface of the second position-stopping block in contact with the inner surface of the second sliding-stopping groove 2338b is arranged as an arc-shaped surface, so that the second position-stopping portion 2548b may slide in the second sliding-stopping groove 2338b smoothly.

After the assembly of the rotating shaft apparatus 22c of some embodiments of the present disclosure is finished, the second arc-shaped rail 2541 of the rotating member 254 is rotatably received in the second arc-shaped groove 2511 of the positioning seat 251. The second rotating portion 2542 of the rotating member 254 is received in the receiving opening 2561 of the connecting member 256. The second rotating portion 2542 is rotatably connected to the connecting member 256. The limiting portion 2336 of the side support member 233 is slidably inserted in the interval 2548c of the rotating member 254. The first position-stopping portion 2548a is slidably received in the first sliding-stopping groove 2338a, and the second position-stopping portion 2548b is slidably received in the second sliding-stopping groove 2338b. The first arc-shaped rail 2562 of the connecting member 256 is rotatably received in the first arc-shaped groove 2335 of the side support member 233. The sleeve 2642 of the linkage member 264 is connected to the linkage seat 261 through the rotating shaft. The connecting rod 2643 of the linkage member 264 is slidably inserted in the sliding-guiding space 2566 of the connecting member 256.

It should be noted that, for the convenience of description, the rotating shaft apparatus 22c in FIG. 42 in some embodiments of the present disclosure only shows schematic structures of the positioning seat 251, the linkage seat 261, one side support member 233, one rotating member 254, one connecting member 256, and one linkage member 264, and other components are omitted.

In the folding process of the rotating shaft apparatus 22c, a pair of rotating members 254 rotate synchronously with respect to the positioning seat 251 to approach each other, and a pair of connecting members 256 rotate synchronously with respect to the positioning seat 251 to approach each other. A pair of linkage members 264 rotate synchronously with respect to the linkage seat 261 to approach each other. A pair of side support members 233 are synchronously folded with respect to each other. In some embodiments, the rotating member 254 rotates with respect to the positioning seat 251 through the second arc-shaped rail 2541 and the second arc-shaped groove 2511, so as to drive the connecting member 256 to rotate with respect to the positioning seat 251. The rotation of the connecting member 256 drives the linkage member 264 and the corresponding rotating shaft 266 to rotate, the first gear on the rotating shaft rotates, so as to drive the corresponding second gear to rotate. In this way, the two linkage members rotate synchronously and approach each other. The connecting rod 2643 of each linkage member 264 slides in the corresponding sliding-guiding space 2566. The first position-stopping portion 2548a slides towards the first stopping section 2338c in the first sliding-stopping groove 2338a, until the first position-stopping portion 2548a is stopped by the first stopping section 2338c. The second position-stopping portion 2548b slides away from the second stopping section 2338b in the second sliding-stopping groove 2338d. In this way, the two side support members 233 may be folded with respect to each other.

In the flattening process of the rotating shaft apparatus 22c, a pair of rotating members 254 rotate synchronously with respect to the positioning seat 251 to move away from each other, and a pair of connecting members 256 rotate synchronously with respect to the positioning seat 251 to move away from each other. A pair of linkage members 264 rotate synchronously with respect to the linkage seat 261 to move away from each other. A pair of side support members 233 are synchronously flattened with respect to each other. In some embodiments, the rotating member 254 rotates with respect to the positioning seat 251 through the second arc-shaped rail 2541 and the second arc-shaped groove 2511, so as to drive the connecting member 256 to rotate with respect to the positioning seat 251. The rotation of the connecting member 256 drives the linkage member 264 and the corresponding rotating shaft 266 to rotate, the first gear on the rotating shaft rotates, so as to drive the corresponding second gear to rotate. In this way, the two linkage members may rotate synchronously and move away from each other. The connecting rod 2643 of each linkage member 264 slides in the corresponding sliding-guiding space 2566. The first position-stopping portion 2548a slides away from the first stopping section 2338c in the first sliding-stopping groove 2338a. The second position-stopping portion 2548b slides towards the second stopping section 2338d in the second sliding-stopping groove 2338b, until the second position-stopping portion 2548b is stopped by the second stopping section 2338d. In this way, the two side support members 233 may be flattened with respect to each other.

In some embodiments, in the rotating shaft apparatus 22c provided by the aforesaid embodiments, the position-stopping portion 2548 of the rotating member 254 and the sliding-stopping groove 2338 of the side support member 233 may be interchanged with each other. That is, the rotating member 254 defines a sliding-stopping groove, and the side support member 233 is arranged with a position-stopping portion facing the sliding-stopping groove.

The above are implementations of the embodiments of the present disclosure. It should be pointed out that, improvements and refinements, which do not depart from principles of the embodiments of the present disclosure, may be made by those skilled in the art, and these improvements and refinements shall be regarded as the protection scope of the present disclosure.

What is claimed is:
1. A rotating shaft apparatus, comprising:
a support assembly, comprising a side support member on each of two opposite sides of the rotating shaft apparatus;
a rotating assembly, comprising a rotating member on each of the two opposite sides of the rotating shaft apparatus and a connecting member on each of the two opposite sides of the rotating shaft apparatus, wherein the rotating member is rotatably connected to the connecting member, and the side support member is rotatably connected to the connecting member; and a linkage assembly, comprising a linkage member on each of the two opposite sides of the rotating shaft apparatus, wherein the linkage member is slidably connected to the connecting member; the side support member and the linkage member are connected to each other through a cooperation of a sliding-stopping groove and a position-stopping portion, or the side support member and the rotating member are connected to each other through the cooperation of the sliding-stopping groove and the position-stopping portion;

wherein a rotation of the connecting member is able to drive the rotating member and the linkage member to rotate, rotations of the rotating member and the linkage member are able to drive the side support member to move, and the side support members on the two opposite sides of the rotating shaft apparatus are configured to be synchronously folded or synchronously unfolded with respect to each other;

wherein the sliding-stopping groove is defined on the side support member, the sliding-stopping groove comprises a first sliding-stopping groove and a second sliding-stopping groove parallel to each other, the first sliding-stopping groove comprises a first stopping section, and the second sliding-stopping groove comprises a second stopping section;

the position-stopping portion comprises a first position-stopping portion and a second position-stopping portion, the first position-stopping portion is slidably received in the first sliding-stopping groove, and the second position-stopping portion is slidably received in the second sliding-stopping groove; and in response to the first position-stopping portion being positioned at the first stopping section, the side support members on the two opposite sides of the rotating shaft apparatus are in the fully folded state, and in response to the second position-stopping portion being positioned at the second stopping section, the side support members on the two opposite sides of the rotating shaft apparatus are in the flattened state.

2. The rotating shaft apparatus as claimed in claim 1, wherein the position-stopping portion is arranged on the linkage member or the rotating member; the rotating assembly comprises a positioning seat, an end of the rotating member away from the connecting member is rotatably connected to the positioning seat, and the first stopping section is disposed closer to the positioning seat than the second stopping section.

3. The rotating shaft apparatus as claimed in claim 2, wherein the side support member comprises a side support plate, a limiting portion protrudes from a back surface of the side support plate, an interval is defined between the first position-stopping portion and the second position-stopping portion, the limiting portion is slidably inserted in the interval, the first sliding-stopping groove is defined on one of two opposite sides of the limiting portion, and the second sliding-stopping groove is defined on the other of the two opposite sides of the limiting portion.

4. The rotating shaft apparatus as claimed in claim 3, wherein the first sliding-stopping groove and the second sliding-stopping groove are arc-shaped grooves, each of two opposite ends of the first sliding-stopping groove passes through a corresponding one of two opposite end surfaces of the limiting portion, and the side support plate and an end of the first sliding-stopping groove close to the side support plate cooperatively form the first stopping section; and an end of the second sliding-stopping groove close to the positioning seat passes through one of the two end surfaces of the limiting portion, and the other end of the second sliding-stopping groove away from the positioning seat extends close to the other of the two end surfaces of the limiting portion to form the second stopping section.

5. The rotating shaft apparatus as claimed in claim 1, wherein the linkage member comprises a sleeve and a connecting rod connected to an outer peripheral wall of the sleeve, the position-stopping portion comprises a first position-stopping portion and a second position-stopping portion, and the first position-stopping portion and the second position-stopping portion are arranged on a side surface of the connecting rod facing the side support member.

6. The rotating shaft apparatus as claimed in claim 5, wherein the connecting member defines a sliding-guiding space facing the linkage member, the sliding-guiding space extends along a direction perpendicular to an axis of rotation of the linkage member, an end of the connecting rod away from the sleeve is inserted in the sliding-guiding space, and the first position-stopping portion and the second position-stopping portion are received in the sliding-guiding space.

7. The rotating shaft apparatus as claimed in claim 1, wherein the rotating member comprises a positioning seat, an end of the rotating member away from the connecting member is rotatably connected to the positioning seat, and an end of the side support member away from the positioning seat is rotatably connected to the connecting member; and wherein a side of the side support member close to the positioning seat defines the sliding-limiting groove, the rotating member is arranged with the sliding-guiding portion slidably passing through the sliding-limiting groove, and the side support member and the rotating member are connected to each other through a cooperation of the sliding-guiding portion and the sliding-limiting groove; or the sliding-guiding portion is provided on the side of the side support plate close to the positioning seat, the sliding-limiting groove is defined on the rotating member, and the sliding-guiding portion slidably passes through the sliding-limiting groove.

8. The rotating shaft apparatus as claimed in claim 7, wherein the sliding-limiting groove extends obliquely away from the positioning seat, the sliding-guiding portion is a sliding-guiding column passing through the sliding-limiting groove, an axis of the sliding-guiding column is parallel to an axis of rotation between the rotating member and the positioning seat;

the sliding-limiting groove comprises a first limiting section and a second limiting section, the first limiting section is located on an end of the sliding-limiting groove, and the second limiting section is located on the other end of the sliding-limiting groove, the first limiting section is disposed farther away from the side support plate and the positioning seat than the second limiting section; and in response to the side support members on the two opposite sides of the rotating shaft apparatus being in a fully folded state, the sliding-guiding portion is positioned at the first limiting section, and in response to the side support members on the two opposite sides of the rotating shaft apparatus being in a flattened state, the sliding-guiding portion is positioned at the second limiting section.

9. The rotating shaft apparatus as claimed in claim 1, wherein the rotating assembly comprises a positioning seat, a side of the side support member away from the positioning seat is connected to the connecting member through a cooperation of a first arc-shaped groove and a first arc-shaped rail, and an axis of the first arc-shaped groove is collinear with an axis of rotation between the rotating member and the positioning seat.

10. The rotating shaft apparatus as claimed in claim 1, wherein the rotating assembly comprises a positioning seat, the positioning seat and the rotating member are connected to each other through a cooperation of a second arc-shaped groove and a second arc-shaped rail, and an axis of the second arc-shaped rail is collinear with an axis of rotation between the rotating member and the positioning seat.

11. The rotating shaft apparatus as claimed in claim 1, wherein the rotating assembly comprises a positioning seat, the linkage assembly comprises a linkage seat, the linkage seat is detachably connected to the positioning seat, and an axis of rotation between the rotating member and the positioning seat is parallel to an axis of rotation between the linkage member and the linkage seat.

12. The rotating shaft apparatus as claimed in claim 1, wherein the rotating assembly comprises two rotating shafts and a gear group arranged on the two rotating shafts, the linkage member on each of the two opposite sides of the rotating shaft apparatus is fixedly sleeved on a corresponding one of the two rotating shafts, the linkage member is configured to rotate around an axis of the corresponding rotating shaft and drive the corresponding rotating shaft to rotate, and the linkage members sleeved on the two rotating shafts are configured to be synchronously folded or synchronously flattened through the gear group.

13. The rotating shaft apparatus as claimed in claim 12, wherein the rotating shaft apparatus comprises a limiting mechanism, the limiting mechanism comprises a pushing member arranged on the linkage member, an abutting member, and an elastic member, the elastic member is configured to provide an elastic force that enables the abutting member and the pushing member to abut against each other, in response to the connecting members on the two opposite sides of the rotating shaft apparatus rotating synchronously through the linkage assembly, the pushing member rotates with respect to the abutting member, the elastic member is elastically deformed by being squeezed by the abutting member, the linkage member is maintained at a position by a friction resistance between the pushing member and the abutting member, and the side support member on one of the two opposite sides of the rotating shaft apparatus is maintained at an angle from the side support member on the other of the two opposite sides of the rotating shaft apparatus.

14. The rotating shaft apparatus as claimed in claim 13, wherein the pushing member comprises a first cam, the abutting member comprises a second cam, the first cam and the second cam rotatably abut against each other, and the elastic member elastically abuts against the abutting member.

15. The rotating shaft apparatus as claimed in claim 13, wherein the abutting member and the elastic member are sleeved on each of the two rotating shafts, the limiting mechanism comprises a positioning member sleeved on an end of each of the two rotating shafts away from the abutting member and a friction member sleeved on each of the two rotating shafts, the friction member is located between the positioning member and the elastic member, an end of the elastic member away from the abutting member elastically abuts against the friction member, the friction member abuts against the positioning member, and a rotation of each of the two rotating shafts is able to drive the corresponding friction member to rotate with respect to the positioning member.

16. A foldable housing, comprising:

two frames; and a rotating shaft apparatus, disposed between the two frames and comprising:

a support assembly, comprising a side support member on each of two opposite sides of the rotating shaft apparatus;

a rotating assembly, comprising a rotating member on each of the two opposite sides of the rotating shaft apparatus and a connecting member on each of the two opposite sides of the rotating shaft apparatus, wherein the rotating member is rotatably connected to the connecting member, and the side support member is rotatably connected to the connecting member; and a linkage assembly, comprising a linkage member on each of the two opposite sides of the rotating shaft apparatus, wherein the linkage member is slidably connected to the connecting member; the side support member and the linkage member are connected to each other through a cooperation of a sliding-stopping groove and a position-stopping portion, or the side support member and the rotating member are connected to each other through the cooperation of the sliding-stopping groove and the position-stopping portion;

wherein a rotation of the connecting member is able to drive the rotating member and the linkage member to rotate, rotations of the rotating member and the linkage member are able to drive the side support member to move, and the side support members on the two opposite sides of the rotating shaft apparatus are configured to be synchronously folded or synchronously unfolded with respect to each other;

wherein the sliding-stopping groove is defined on the side support member, the sliding-stopping groove comprises a first sliding-stopping groove and a second sliding-stopping groove parallel to each other, the first sliding-stopping groove comprises a first stopping section, and the second sliding-stopping groove comprises a second stopping section;

the position-stopping portion comprises a first position-stopping portion and a second position-stopping portion, the first position-stopping portion is slidably received in the first sliding-stopping groove, and the second position-stopping portion is slidably received in the second sliding-stopping groove; and in response to the first position-stopping portion being positioned at the first stopping section, the side support members on the two opposite sides of the rotating shaft apparatus are in the fully folded state, and in response to the second position-stopping portion being positioned at the second stopping section, the side support members on the two opposite sides of the rotating shaft apparatus are in the flattened state; and wherein each of the two frames is connected to the connecting member on a corresponding one of the two opposite sides of the rotating shaft apparatus.

17. An electronic device, comprising:

a flexible member; and a foldable housing, wherein the flexible member is arranged on the foldable housing and the foldable housing comprising:

two frames; and a rotating shaft apparatus, disposed between the two frames and comprising:

a support assembly, comprising a side support member on each of two opposite sides of the rotating shaft apparatus;

a rotating assembly, comprising a rotating member on each of the two opposite sides of the rotating shaft apparatus and a connecting member on each of the two opposite sides of the rotating shaft apparatus, wherein the rotating member is rotatably connected to the connecting member, and the side support member is rotatably connected to the connecting member; and a linkage assembly, comprising a linkage member on each of the two opposite sides of the rotating shaft apparatus, wherein the linkage member is slidably connected to the connecting member; the side support member and the linkage member are connected to each other through a cooperation of a sliding-stopping groove and a position-stopping portion, or the side support member and the rotating member are connected to each other through the cooperation of the sliding-stopping groove and the position-stopping portion;

wherein a rotation of the connecting member is able to drive the rotating member and the linkage member to rotate, rotations of the rotating member and the linkage member are able to drive the side support member to move, and the side support members on the two opposite sides of the rotating shaft apparatus are configured to be synchronously folded or synchronously unfolded with respect to each other;

wherein the sliding-stopping groove is defined on the side support member, the sliding-stopping groove comprises a first sliding-stopping groove and a second sliding-stopping groove parallel to each other, the first sliding-stopping groove comprises a first stopping section, and the second sliding-stopping groove comprises a second stopping section;

the position-stopping portion comprises a first position-stopping portion and a second position-stopping portion, the first position-stopping portion is slidably received in the first sliding-stopping groove, and the second position-stopping portion is slidably received in the second sliding-stopping groove; and in response to the first position-stopping portion being positioned at the first stopping section, the side support members on the two opposite sides of the rotating shaft apparatus are in the fully folded state, and in response to the second position-stopping portion being positioned at the second stopping section, the side support members on the two opposite sides of the rotating shaft apparatus are in the flattened state; and wherein each of the two frames is connected to the connecting member on a corresponding one of the two opposite sides of the rotating shaft apparatus.

* * * * *